US012664738B2

(12) United States Patent
Sun et al.

(10) Patent No.: US 12,664,738 B2
(45) Date of Patent: Jun. 23, 2026

(54) ARRANGEMENTS OF ILLUMINATION SOURCES WITHIN AND OUTSIDE OF A DIGIT-OCCLUDED REGION OF A TOP COVER OF A HANDHELD CONTROLLER TO ASSIST WITH POSITIONAL TRACKING OF THE CONTROLLER BY AN ARTIFICIAL-REALITY SYSTEM, AND SYSTEMS AND METHODS OF USE THEREOF

(71) Applicant: Meta Platforms Technologies, LLC, Menlo Park, CA (US)

(72) Inventors: Howard Sun, Seattle, WA (US); Dustin Tiffany, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 257 days.

(21) Appl. No.: 18/480,836

(22) Filed: Oct. 4, 2023

(65) Prior Publication Data

US 2024/0169681 A1 May 23, 2024

Related U.S. Application Data

(60) Provisional application No. 63/497,176, filed on Apr. 19, 2023, provisional application No. 63/384,944, filed on Nov. 23, 2022.

(51) Int. Cl.
*G06T 19/00* (2011.01)
*G06V 10/141* (2022.01)

(52) U.S. Cl.
CPC .......... *G06T 19/006* (2013.01); *G06V 10/141* (2022.01)

(58) Field of Classification Search
None
See application file for complete search history.

(56) References Cited

U.S. PATENT DOCUMENTS

2016/0357261 A1 12/2016 Bristol et al.
2017/0131767 A1 5/2017 Long
(Continued)

FOREIGN PATENT DOCUMENTS

EP 3954443 A1 2/2022

OTHER PUBLICATIONS

EPO—International Search Report and Written Opinion for International Application No. PCT/US2023/080948, mailed Apr. 8, 2024, 15 pages.

*Primary Examiner* — Tapas Mazumder
(74) *Attorney, Agent, or Firm* — McDermott Will & Schulte LLP

(57) ABSTRACT

A handheld controller for an artificial-reality system may include a top cover having a surface surrounded by a perimeter. The surface has a digit-occluded region on which a digit of a user of the handheld controller can be placed and a different region separated from the digit-occluded region. A first illumination source is disposed within the digit-occluded region at a first position along the perimeter of the top cover. The first position is visible to a camera of the artificial-reality system while the handheld controller has one of a first set of orientations. A second illumination source is disposed within the digit-occluded region at a second position along the perimeter of the top cover while the handheld controller has one of a second set of orientations. A third illumination source is disposed within the different region at a third position away and distinct from the perimeter on the surface.

18 Claims, 22 Drawing Sheets

(56)     References Cited

U.S. PATENT DOCUMENTS

| | | |
|---|---|---|
| 2017/0266551 A1 | 9/2017 | Baba |
| 2018/0311571 A1 | 11/2018 | Huang |
| 2018/0314416 A1 | 11/2018 | Powderly et al. |
| 2018/0330521 A1 | 11/2018 | Samples et al. |
| 2022/0143495 A1* | 5/2022 | Nishikawa ............ A63F 13/213 |
| 2022/0358663 A1 | 11/2022 | Wu |

* cited by examiner

AR system 600d

AR system 600d

VR device 810

1062-5

1000

1004

1062-1
1062-2
1062-3

ARRANGEMENTS OF ILLUMINATION SOURCES WITHIN AND OUTSIDE OF A DIGIT-OCCLUDED REGION OF A TOP COVER OF A HANDHELD CONTROLLER TO ASSIST WITH POSITIONAL TRACKING OF THE CONTROLLER BY AN ARTIFICIAL-REALITY SYSTEM, AND SYSTEMS AND METHODS OF USE THEREOF

RELATED APPLICATIONS

This application claims priority to U.S. Prov. App. No. 63/384,944, filed on Nov. 23, 2022, and entitled "Arrangements of Illumination Sources Within and Outside of a Digit-Occluded Region of a Top Cover of a Handheld Controller to Assist with Positional Tracking of the Controller by an Artificial-Reality System, and Systems and Methods of Use thereof"; and U.S. Prov. App. No. 63/497, 176, filed on Apr. 19, 2023, and entitled "Arrangements of Illumination Sources Within and Outside of a Digit-Occluded Region of a Top Cover of a Handheld Controller to Assist with Positional Tracking of the Controller by an Artificial-Reality System, and Systems and Methods of Use thereof." each of which is incorporated herein by reference.

TECHNICAL FIELD

The present disclosure relates generally to positional tracking, including but not limited to arrangements of illumination sources at a handheld controller to assist with positional tracking of the controller by an artificial-reality system.

BACKGROUND

Artificial-reality systems, including virtual-reality headsets and associated controllers, can include a handheld controller, game controller, or other controller. A user manipulates the controller to send commands or other instructions to the gaming entertainment system to control a video game or other simulation. A typical handheld controller may include several buttons or knobs such as, for example, a joystick, which one can manipulate using one's fingers while holding the handheld controller. A user's interactions with the handheld controller can result in occluding regions of the handheld controller that might be used in conjunction with positional tracking of the handheld controller. It is important to maintain accurate positional tracking of controllers to ensure an enjoyable user experience and to also avoid potential injuries or property damage if the controller is determined to be in a position that is too close to a physical object.

SUMMARY

Arrangements of illumination sources (e.g., light-emitting diodes or other types of illumination sources) are described herein that address one or more of the problems identified above. An example handheld controller for a virtual-reality system in accordance some embodiments includes a top cover, at least one button and at least one thumbstick which can be manipulated by a user holding the handheld controller using the user's fingers. In this example, the top cover includes a perimeter, a flat surface adjacent to a portion of the perimeter of the top cover, and an angled surface extending at an angle and away from the flat surface to a different portion of the perimeter of the top cover. A first illumination source may be positioned at a portion of the perimeter of the top cover or at the different portion of the perimeter of the top cover. The first illumination source may be positioned to be visible to a camera of the virtual-reality system. A second illumination source may be positioned at the flat surface of the top cover and such that it is visible to the camera of the virtual-reality system. A third illumination source may be positioned at the angled surface of the top cover such that it is visible to the camera of the virtual-reality system. A fourth illumination source may be positioned at a handle of the controller such that it is visible to the camera of the virtual-reality system.

In another aspect, an example handheld controller for a virtual-reality system in accordance some embodiments include a top cover having a surface surrounded by a perimeter. In this example, the surface has a digit-occluded region on which a digit of a user who is holding the handheld controller can be placed when operating the handheld controller. The surface further has a different region separated from the digit-occluded region. A first illumination source may be disposed within the digit-occluded region at a first position along the perimeter of the top cover. The first position is visible to a camera of the virtual-reality system while the handheld controller is in one of a first set of orientations. A second illumination source may be disposed within the digit-occluded region at a second position, different from the first position, along the perimeter of the top cover. The second position is visible to the camera of the virtual-reality system while the handheld controller is in one of a second set of orientations. A third illumination source may be disposed within the different region at a third position on the surface. The third position is away and distinct from the perimeter. A fourth illumination source may be disposed within a lower region of the controller. The first position may be located to be visible to the camera of the virtual-reality system while the digit of the user is at least partially occluding the second position from the camera. The second position may be located to be visible to the camera of the virtual-reality system while the digit of the user is at least partially occluding the first position from the camera.

Thus, in accordance with the embodiments, illumination sources are provided on a top surface, lower surface, and/or a perimeter of the handheld controller of a virtual-reality system. The illumination sources transmit data that is received by a camera of the virtual-reality system. The data received by the camera enables the virtual-reality system to make positional determinations for the handheld controller. Advantageously, the positioning of the illumination sources maximizes the number of orientations in which the illumination sources are viewable by the camera without having too many of the illumination sources be occluded by the digits of the user while the user manipulates buttons and/or knobs on the handheld controller.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the inventions are described below with reference to the drawings.

The illustrated embodiments are intended to illustrate, but not to limit, the inventions. The drawings contain the following figures:

FIGS. 8A, 8B-1, 8B-2, and 8C illustrate example head-wearable devices, in accordance with some embodiments.

Figure 1A:
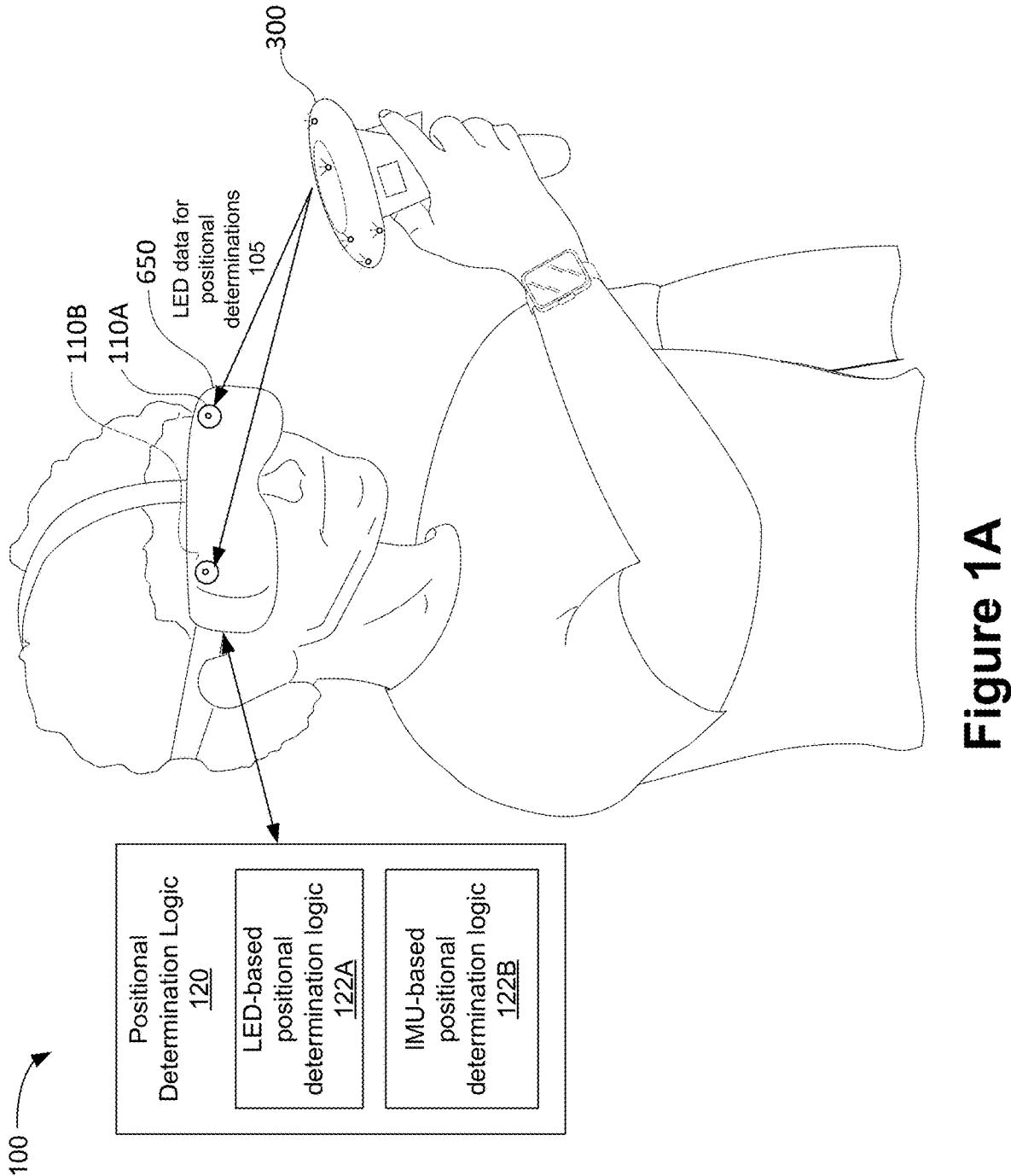
FIG. 1A is an illustration showing a scenario in which a user of an artificial-reality system is holding a controller that includes a desirable arrangement of illumination sources to assist with positional determinations for the controller in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all components of a given system, method, or device. Finally, like reference numerals may be used to denote like features throughout the specification and figures.

DETAILED DESCRIPTION

Reference will now be made to embodiments, examples of which are illustrated in the accompanying drawings. In the following description, numerous specific details are set forth to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is an illustration showing a scenario in which a user of an artificial-reality system 100 is holding a controller that includes a desirable arrangement of illumination sources to assist with positional determinations for the controller in accordance with some embodiments. The virtual-reality system 100 includes cameras 110A and 110B of a virtual-reality headset 650, a handheld controller 300 with desirably-positioned illumination sources (e.g., depicted as LEDs in this example and represented with the three lines extending from each LED to represent transmission of light), and positional determination logic 120 (which also includes LED-based positional determination logic 122A and/or IMU-based positional determination logic 122B). In some examples, an algorithm/method is utilized to combine the IMU or motion-based positional determinations with the LED or vision-based positional determinations and an example of this is shown and described in conjunction with FIG. 5). Positional determination logic 120 can be executed by a processor or microcontroller of the virtual-reality headset 650 (or a processor or microcontroller that is at least in communication with the virtual-reality headset 650, such as one of the processors shown in FIG. 7). The positional determination logic 120 can include an LED-based positional determination logic 122A and/or an IMU-based positional determination logic 122B. Positional determination logic 120 can be just one aspect and other modules can be associated with the virtual-reality headset 650, and the other modules can include, for example, camera controller logic, display rendering logic, audio processing logic, and logic for processing other signals received directly from the handheld controller 300 (e.g., signals generated by operation of buttons 435 (shown in FIG. 1B) or the thumbstick 430 (shown in FIG. 1B) of the handheld controller).

Figure 1B:
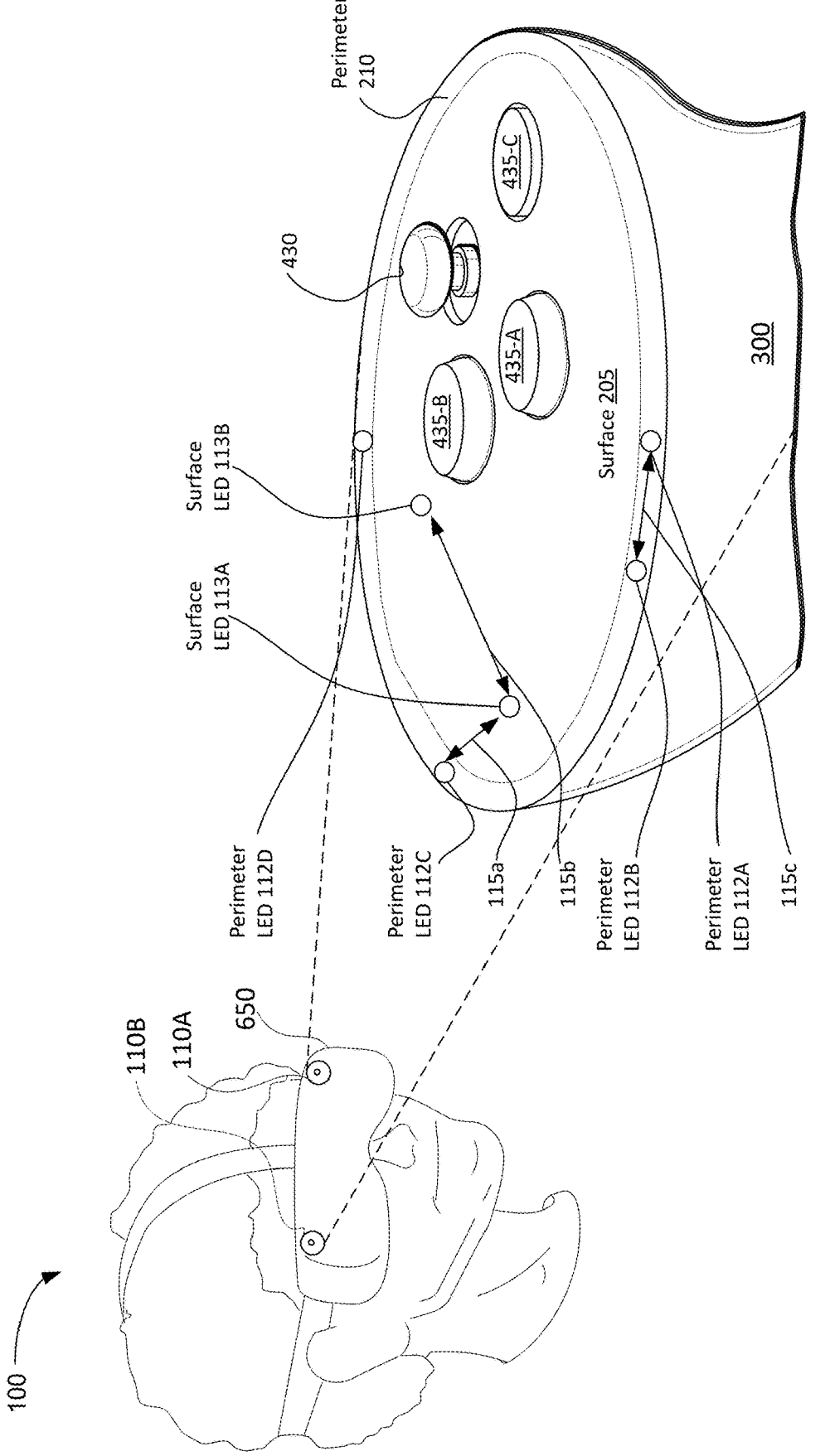
FIG. 1B illustrates a close-up view of the controller of FIG. 1A that has the desirable arrangement of illumination sources to assist with positional determinations for the controller in accordance with some embodiments.

FIG. 1B illustrates a close-up view of the controller of FIG. 1A that has the desirable arrangement of illumination sources to assist with positional determinations for the controller, in accordance with some embodiments. As shown in FIG. 1B by the dashed lines extending from the cameras on the virtual-reality headset, the cameras 110A and 110B have a field of view (FOV) that enables them to view the controller and collect data from each of the illumination sources (e.g., the perimeter LEDs 112 and the surface LEDs 113 in the depicted example). The desirable arrangement of illuminations sources (e.g., LEDs) can be selected such that the greatest number of illumination sources is viewable at the greatest number of orientations of the handheld controller within the FOV of the cameras 110. As shown in FIG. 1B, certain of the illumination sources can be disposed at positions within a perimeter 210 of a top cover of the controller 300, while others of the illumination sources can be disposed at positions within a surface 502 of the top cover of the controller 300. Each of these respective positions, as well as how many illumination sources to position (e.g., dispose) at the perimeter and surface can be selected to achieve the goal of having the greatest number of illumination sources viewable at the greatest number of orientations of the handheld controller within the FOV of the cameras 110. As explained in more detail below, it can also be desirable to select the respective positions by accounting for a digit-occluded region of the top cover of the controller 300 and ensuring that certain illumination sources are positioned such that they are visible even while a digit is present within the digit-occluded region of the top cover and might be occluding some of the illumination sources. While the LEDs 112 and 113 are labelled as LEDs in FIG. 1B, it should be appreciated that the LEDs might not be externally exposed, but instead that each of the depicted circular LEDs is a position on the top cover at which light from a respective LED would be transmitted through, e.g., a light-transparent top cover to be viewable by a camera of an artificial-reality system (e.g., viewable to cameras 110 of virtual-reality headset 650).

FIG. 1B also depicts examples of blur-reducing separation distances between adjacent illumination sources. These are shown as blur-reducing separation distances 115, including examples showing blur-reducing separation distances between two perimeter-located illumination sources (e.g., blur-reducing separation distance 115c between illumination sources 112A and 112B), blur-reducing separation distances between two surface-located illumination sources (e.g., blur-reducing separation distance 115b between illumination sources 113A and 113B), and blur-reducing separation distances between one perimeter-location illumination source and a surface-located illumination source (e.g., blur-reducing separation distances 115a between illumination source 112C and illumination sources 113A). In some embodiments, in addition to selecting appropriate positions at which to dispose the illumination sources, the blur-reducing separation distances can also be selected to further help to optimize the transmission of the light-based data from the illumination sources to cameras of an artificial-reality system, such that a blurring effect that can occur when two illumination sources are positioned too close together is reduced and/or eliminated (e.g., a reduction of at least 80% of a blurring effect).

Figure 2A:
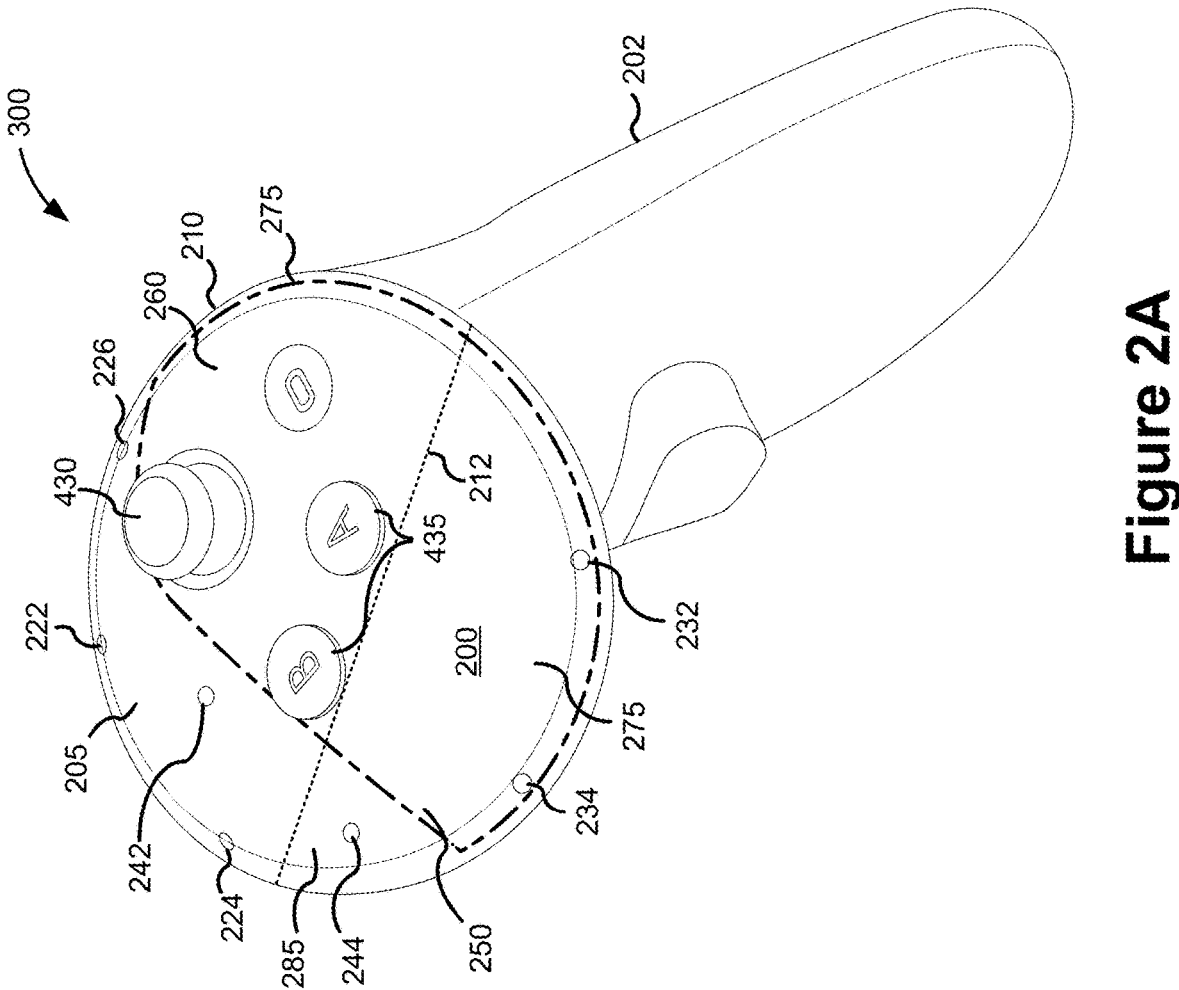
FIGS. 2A-2E illustrate example handheld controllers with arrangements of illumination sources in accordance with some embodiments.

FIG. 2A illustrates an example handheld controller 300, in accordance with some embodiments. The handheld controller 300 includes a handle 202, a top cover 200, a thumbstick 430, and buttons 435. The handheld controller 300 can be the same handheld controller shown and described with reference to FIGS. 1A and 1B, as well as the handheld controller described below in connection with the other figures.

The top cover 200 has a surface 205 surrounded by a perimeter 210. The surface 205 has a digit-occluded region 275 and a different region 285 separated from the digit-occluded region. In some embodiments, the perimeter 210 is chamfered or rounded downward from the surface 205. In some embodiments, perimeter-positioned LEDs disposed within the perimeter are positioned at an angle that aligns with the rounded or chamfered perimeter to help improve visibility of light from the illumination sources by cameras of the virtual-reality headset 650. FIG. 2A further shows an example flat-to-slant transition line 212.

During operation (e.g., the operation scenarios shown in FIGS. 1A-1B), a user can hold the handheld controller 300 at the handle 202 such that handle 202 is grasped in the user's palm, leaving one or more of the user's fingers and thumb (also referred to herein as "digits") available to operate the controls on the handheld controller 300 (e.g., buttons 435 or thumbstick 430). Typically, the user may operate the thumbstick 430 using a thumb (hence, the name thumbstick), but other digits may also be used depending on the user's preference.

During operation, the user holding the handheld controller 300 by its handle 202, may place a digit on the surface 205 (this surface can be a region of the top cover of the controller that is outside of the perimeter 210 shown in FIG. 1B) of the top cover 200, e.g., when not operating the controls of the handheld controller 300. Consequently, a portion of the top surface 205 of the top cover 200 can be at least partially occluded from the camera 110 of the virtual-reality system 100 when a digit is present in this fashion or while otherwise interacting with buttons or the thumbstick. Similarly, when operating the controls of the handheld controller 300, a portion of the top surface 205 of the top cover 200 can be at least partially occluded from the camera 110 of the virtual-reality system 100. The entire region of the top surface 205 that is potentially at least partially occluded from the camera 110 of the virtual-reality system when the user holding the handheld controller 300 is using the handheld controller 300 using a digit is referred to as the digit-occluded region. The digit-occluded region 275 is within a reachable distance of a digit of the user at a time when the handheld controller is held by the user. An example digit-occluded region 275 is depicted in FIG. 2A.

In contrast, the different region 285 is a region of the top cover that is not occluded from the camera by a digit of the user when the user is operating the controls of the controller. The different region can be a region that is not within a reachable distance of any digit of the user while the handheld controller is held by the user at the handle 202. An example different region 285 is depicted in FIG. 2A.

The handheld controller 300 further includes illumination sources (also referred to herein as light sources) located at various positions 222, 224, 226, 232, 242, 244 on the surface 205 or along the perimeter 210 of the top cover 200. Additional examples of respective positions for illumination sources are shown and described in the context of FIGS. 1A-1B and 2B-2E. In some embodiments, the top cover 200 of the handheld controller 300 is transparent to light (e.g., transparent to infrared light) at the various positions where the illumination sources are located to enable the illumination sources to transmit light-based data to the camera 110. For example, the top cover 200 is opaque to a user (e.g., is not transparent to visible light) and transparent in a non-visible range of wavelengths (e.g., infrared, near infrared, and/or ultraviolet).

The illumination sources may be light emitting diodes (LEDs) and may have same or different colors. In some embodiments, a single light source, e.g., an LED or a laser, may provide light to one or more illumination sources (e.g., simultaneously or sequentially). For example, a single LED may provide light to more than one illumination sources using. e.g., a light guide or an optic fiber connected to the LED and guiding the light from the LED to corresponding illumination sources.

The illumination sources are disposed at various positions throughout the surface 205 of the top cover 200 to be viewable by the camera 110 in a (maximum) number of orientations of the handheld controller 300 when a user is using the handheld controller 300. For example, a first position 222 is located on the perimeter 210 in the different region 285, a second position 232 is disposed on the perimeter 210 in the digit-occluded region 275, a third position 226 is disposed on the perimeter 210 in the different region 285, and a fourth position 242 disposed on the surface 205 in the different region 285. Other illumination sources located at various other positions, e.g., 244, 224, etc. may also be present on the handheld controller 300. The illumination sources provide data from the handheld controller 300 which is used by the camera 110 to make determinations of the position and orientation of the handheld controller 300 relative to the camera when the user is operating the handheld controller 300.

The illumination sources are disposed such that adjacent illumination sources are separated from one another by at least a blur-reducing separation distance (e.g., as was described for the example of FIG. 1B). For example, the adjacent illumination sources at positions 232 and 234 disposed within the digit-occluded region 275 are separated from one another by at least a first blur-reducing separation distance. Similarly, adjacent illumination sources at positions 222 and 224 disposed within the different region 285 are separated from one another by at least a second blur-reducing separation distance. In some embodiments, the first blur-reducing separation distance is different from the second blur-reducing separation distance.

Likewise, adjacent illumination sources at positions 222, 224, 226, and/or 232, 234 disposed along the perimeter 210 of the top cover 200 are separated from one another by at least a third blur-reducing separation distance, and the adjacent illumination sources at positions 242 and 244 disposed on the surface 205 of the top cover 200 are separated from one another by at least a fourth blur-reducing separation distance. In some embodiments, the third blur-reducing separation distance and fourth blur-reducing separation distance are different.

In some embodiments, at least one illumination source is disposed at a position (e.g., 242) closer to one of the buttons 435. In some embodiments, at least one illumination source is disposed between the thumbstick 430 and one of the buttons 435. In embodiments in which the perimeter 210 is chamfered, the illumination sources disposed along the perimeter 210 may be disposed at an angle that aligns with the rounded portion of the perimeter 210, e.g., tangential to the curve of the perimeter 210.

In some embodiments, a first illumination source is disposed within the digit-occluded region at a first position (e.g., 232) along the perimeter 210. The first position is selected such that it is visible to the camera 110 while the handheld controller is in one of a first set of orientations, e.g., when the user is tilting the handheld controller 300 rightward while operating the thumbstick 430 such that the illumination source at position 232 is not occluded by the digit of the user.

In some embodiments, a second illumination source is disposed within the digit-occluded region at a second position (e.g., 234) along the perimeter 210. The second position is selected such that it is visible to the camera 110 while the handheld controller is in one of a second set of orientations, e.g., when the user is holding the handheld controller 300 flat while operating the thumbstick 430 such that the illumination source at position 234 is not occluded by the digit of the user.

In some embodiments, the first position 232 is located to be visible to the camera 110 while the digit of the user is at least partially occluding the second position 234 from the camera 110; and the second position 234 is located to be visible to the camera 110 while the digit of the user is at least partially occluding the first position 232 from the camera 110.

In some embodiments, a third illumination source is disposed within the different region at a third position (e.g., 244) on the surface 205 of the top cover 200 such that the third position is away from the perimeter. In some embodiments, the second position 234 and the third position 244 are visible to the camera 110 while the digit of the user is within the digit-occluded region.

In some embodiments, the surface 205 of the top cover 200 includes a flat surface 260 adjacent a first portion of the perimeter 210 of the top cover 200, and an angled surface 250 extending at an angle away from the flat surface 260 to a second portion of the perimeter 210 of the top cover 200 (e.g., the angled surface can begin at a transition point of a flat or planar surface of the top cover, e.g., the transition line 212 in FIG. 2A). For example, the angle at which the angled surface 250 extends away from the flat surface 260 is designed to enable ergonomic comfort for the user when operating the controls of the handheld controller. In addition, the angle at which the angled surface 250 extends away from the flat surface 260 may be designed such that the surface 205 of the handheld controller 300 is viewable by the camera 110 in a (maximum) number of orientations of the handheld controller 300 when the user is operating the controls of the handheld controller 300. Thus, the angle between the flat surface 260 and the angled surface 250 may be in a range from 90° to 179°. For example, the angle between the flat surface 260 and the angled surface 250 may be 95°, 100°, 105°, 110°, 115°, 120°, 125°, 130°, 135°, 140°, 145°, 150°, 155°, 160°, 165°, 170°, 175°, or any value between any two of these values.

In such embodiments, the handheld controller 300 may include a first illumination source positioned at a first portion of the perimeter 210 (e.g., position 224) or at a second portion of the perimeter 210 (e.g., position 232) to be visible to a camera (e.g., camera 110) of the virtual-reality system. A second illumination source is positioned at the flat surface 260 of the top cover (e.g., position 242) to be visible to the camera (e.g., camera 110). A third illumination source is positioned at the angled surface 250 (e.g., position 244) to be visible to the camera (e.g., camera 110). In some embodiments, the third illumination source is positioned away from the digit-occluded region.

The angled surface 250 includes a digit-occluded region 275 that is occluded from the camera when a digit of a user who is holding the handheld controller 300 is at or near the digit-occluded region 275, and the different region 285 that is not occluded from the camera by a digit of a user who is holding the handheld controller when the user is operating the controls of the handheld controller 300. In some embodiments, an additional illumination source is positioned along the perimeter 210 of the top cover 200 in the digit-occluded region (e.g., position 234).

In accordance with some embodiments, two or more of the various illumination sources are configured to provide data to a camera (e.g., camera 110) of the virtual-reality system. For example, the camera is a position-tracking camera 110 configured to monitor the data to allow the artificial-reality system to determine, in part, a current position of the handheld controller in a three-dimensional space. In some embodiments, data from the position-tracking camera is combined with motion data (e.g., from an IMU sensor) to track the controller.

In some embodiments, the positions of the various illumination sources are selected such that at least two of the positions are visible to the camera at a greatest number of orientations of the handheld controller relative to the camera in a three-dimensional space. In some embodiments, respective gains (e.g., brightness levels) of the illumination sources are configured/adjusted to reduce (or prevent) illumination/blob merging. In some embodiments, an exposure time and/or gain of the camera is adjusted to reduce (or prevent) illumination/blob merging. In some embodiments, a resolution of the camera is adjusted to reduce (or prevent) illumination/blob merging. For example, a 1280×1080 resolution is used (without downsampling) to identifying the illumination sources. In some embodiments, illumination timing (e.g., a duty cycle) of the illumination sources is configured/adjusted to reduce (or prevent) illumination/blob merging. For example, the illumination sources are configured to have an on time of less than 20 microseconds, less than 15 microseconds, or less than 10 microseconds.

Figure 2B:
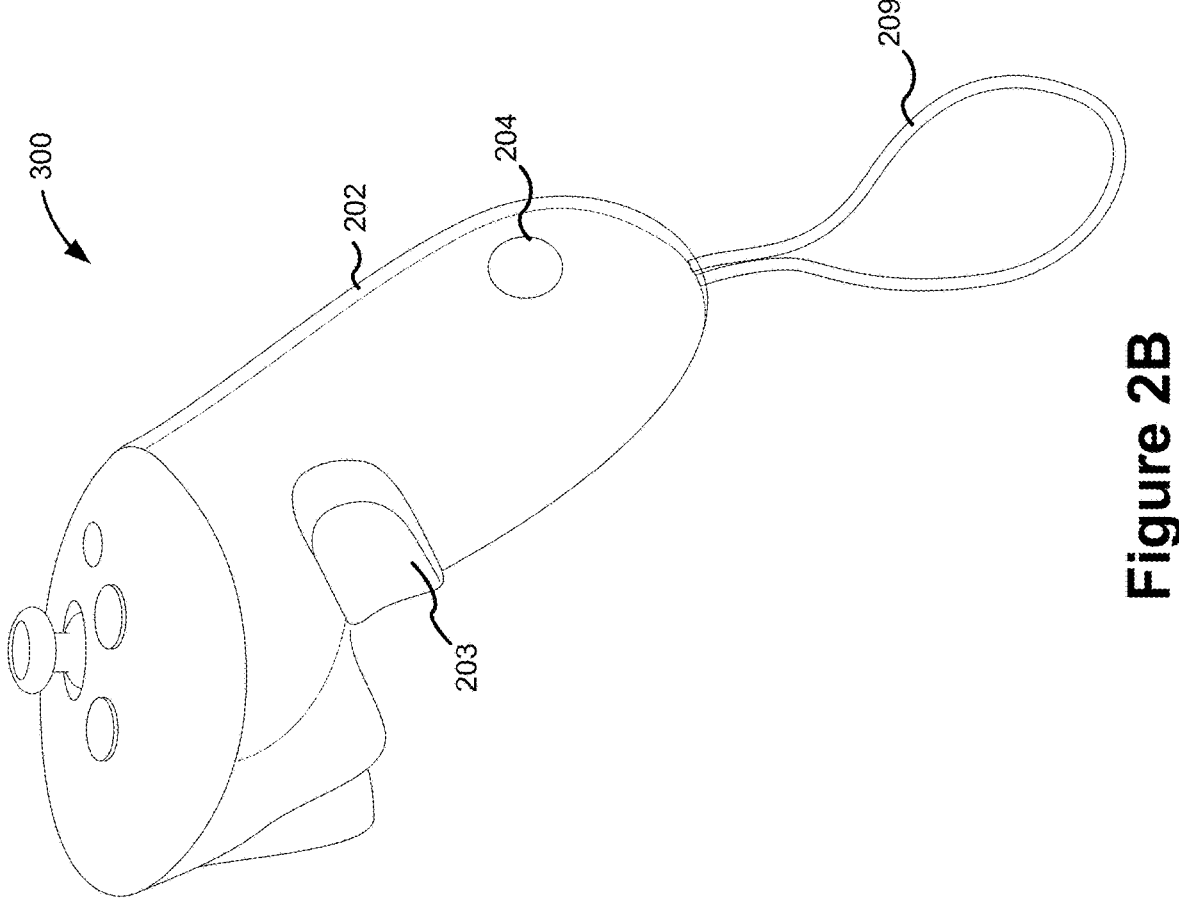
Figure 2D:
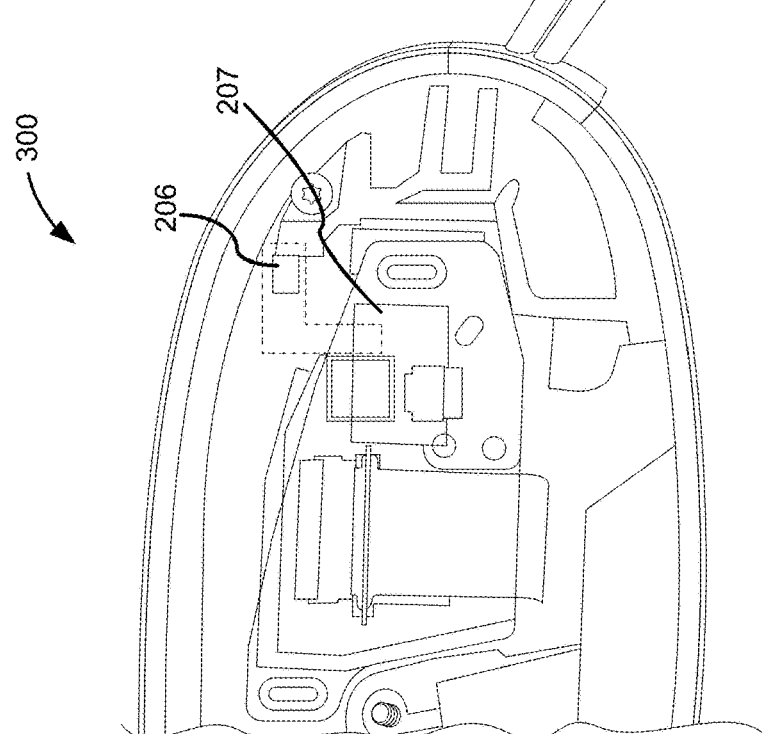
Figure 2C:
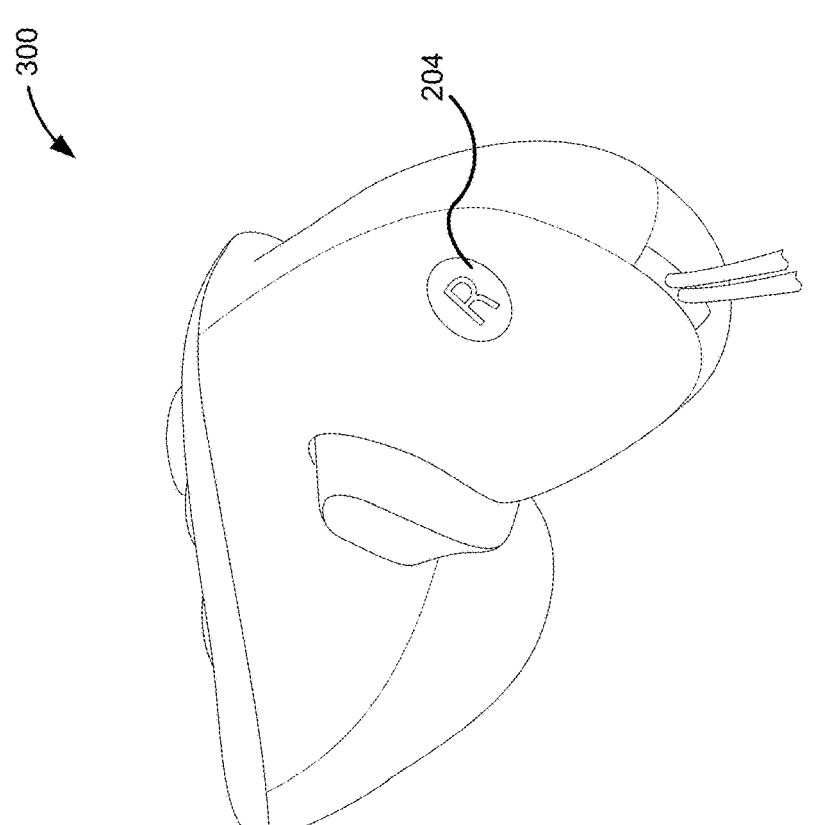

FIGS. 2B-2C illustrate the handheld controller 300 including an illumination source 204 at a position on the handle 202 in accordance with some embodiments. In some embodiments, the illumination source 204 is positioned at a location on the handle 202 that is unlikely to be covered by a user's hand while the user is using the handheld controller 300 (e.g., a bottom portion of the handle). In accordance with some embodiments, the controller 300 in FIG. 2B includes a lanyard 209. In some circumstances, the addition of the illumination source 204 in the handle 202 improves tracking (and reacquisition of) the controller 300. The illumination source 204 may also improve pose stability for the controller 300 and constellation tracking. In some embodiments, more than one illumination source is positioned in the handle 202. In some embodiments, two illumination sources in the handle 202 are separated by a predefined distance (e.g., to reduce illumination merging and/or occlusion risks). In some embodiments, the handle 202 has a cover composed of a transparent (e.g., an IR transparent) material. In some embodiments, the handle 202 includes a transparent window (e.g., an IR transparent window) for the illumination source 204.

The handheld controller 300 in FIGS. 2B-2C is configured to be gripped by a right hand of the user and the illumination source 204 is located on a side of the handle 202 that faces to the user's left while the user is using the handheld controller 300. The handheld controller 300 includes a button 203 on the handle 202 in accordance with some embodiments. In some embodiments, an artificial-reality system includes the handheld controller 300 and a second handheld controller configured to be held in the user's left hand while the user is using it. In some embodiments, the second handheld controller has a mirrored arrangement to the handheld controller 300. For example, the second handheld controller has an illumination source at a position on its handle that faces to the user's right while the user is using the second controller.

FIG. 2D illustrates an interior view of the handheld controller 300 in accordance with some embodiments. FIG. 2D shows an illumination source 206 corresponding to the illumination source 204 and coupled to an interface board 207 of the handheld controller 300. In some embodiments, the illumination source 206 is communicatively coupled to the interface board 207 via a flex cable or flexible printed circuit board. In some embodiments, a cover of the handle 202 includes a transparent window for a particular band of light (e.g., IR transparent) to allow illumination from the illumination source 206 to leave the handle 202. In some embodiments, the transparent window is coupled to a lanyard mount (e.g., for the lanyard 209).

Figure 2E:
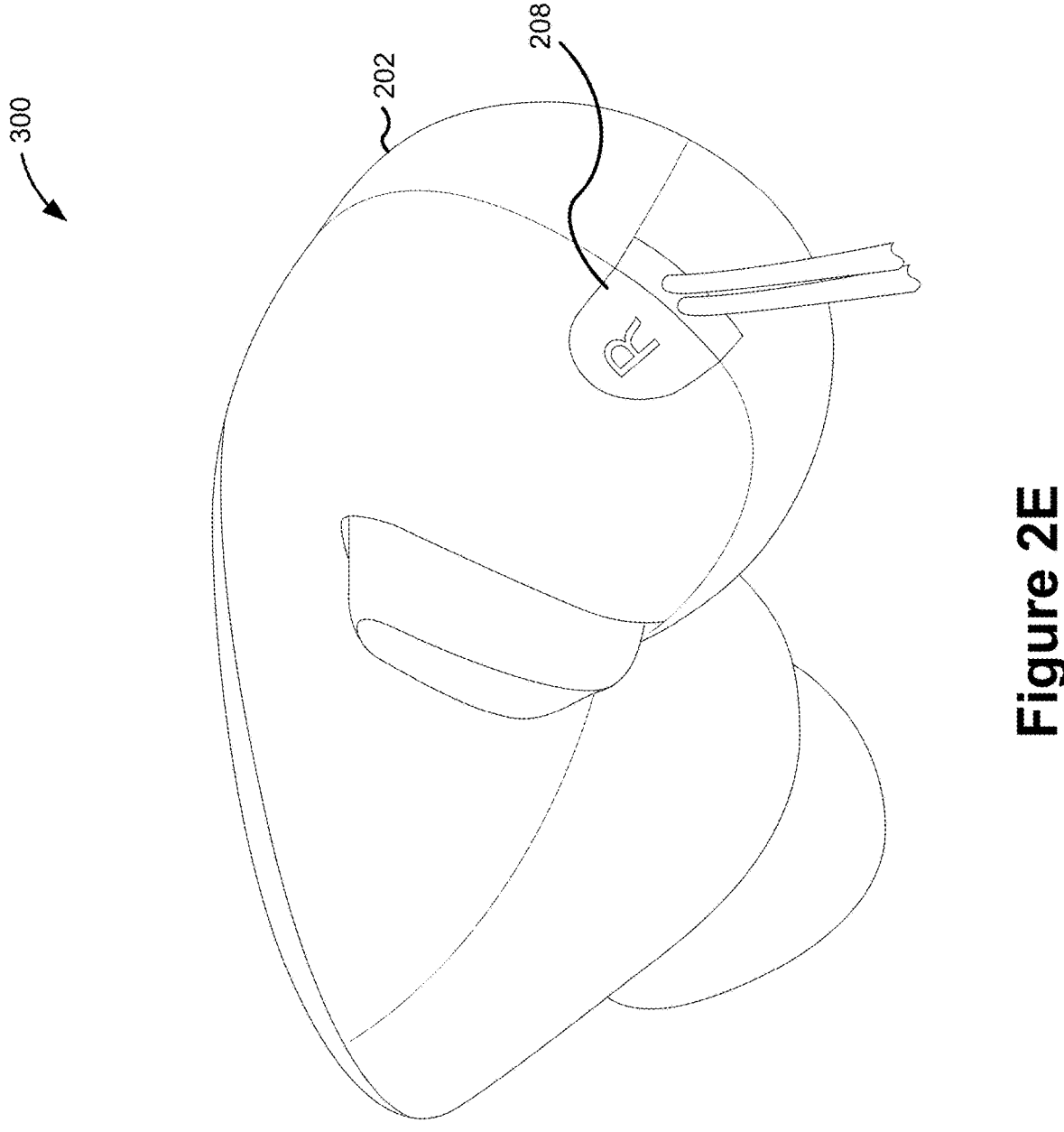

FIG. 2E illustrates an example of the handheld controller 300 with an illumination source 208 in accordance with some embodiments. The illumination source 208 is located at a bottom of the handle 202. In some embodiments, the handheld controller 300 includes two or more illumination sources on the handle (e.g., at the locations shown in FIGS. 2B and 2E). The illumination source 208 may have more occlusion issues (e.g., due to the lanyard 209) as compared to the illumination source 204.

In some circumstances, the addition of an illumination source on the handle reduces jitter in controller tracking and/or improves reacquisition time after the controller leaves a field of view (FOV) of a camera of the system. As an example, the controller 300 may be used for fencing poses and/or boxing poses that cause the controller to leave the FOV then reenter (requiring reacquisition by the tracking system). In some embodiments and circumstances, the addition of an illumination source on the handle (e.g., the illumination source 204 or 208) improves vision tracking by 10-15%. In some embodiments and circumstances, the addition of an illumination source on the handle improves fusion tracking (e.g., combining vision-based tracking data with motion-based tracking data) by 3-7%. In some embodiments and circumstances, the addition of an illumination source on the handle improves the average number of blobs matched per frame by 1-2 blobs. In some embodiments and circumstances, the addition of an illumination source on the handle improves the average number of illumination sources matched per frame by 1-2 illumination sources.

Figure 3:
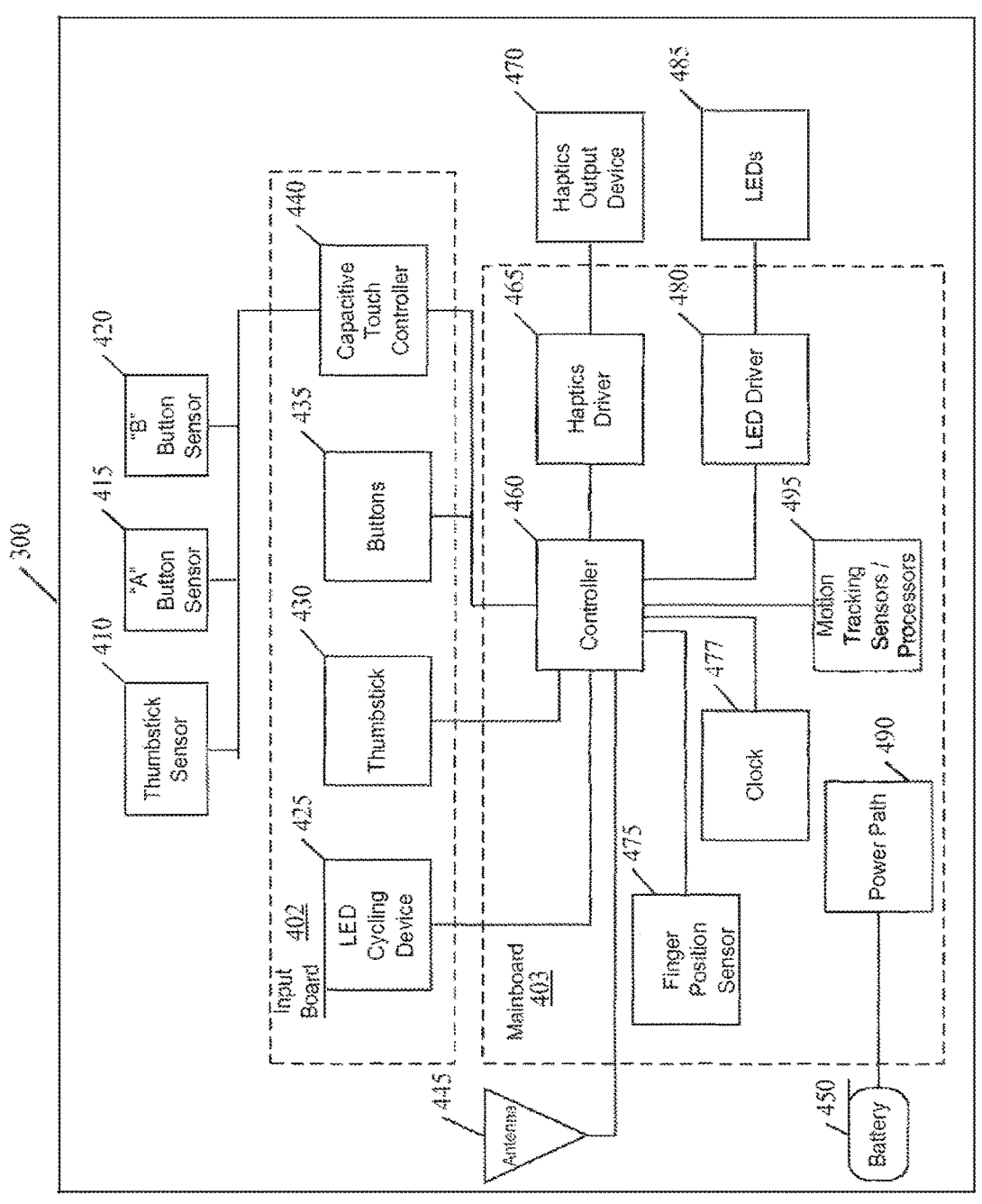
FIG. 3 is a block diagram illustrating an electrical configuration of an example handheld controller according to some embodiments.

FIG. 3 is a block diagram illustrating an example electrical configuration of the handheld controller 300 in accordance with some embodiments. In the example of FIG. 3 the handheld controller 300 includes an input board 402 and a main board 403 coupled to the input board 402. The input board 402 includes a thumbstick 430 and buttons 435. In some embodiments, the input board also includes a capacitive touch controller 440. In other examples, the input board 402 includes additional or alternative user-input keys.

The capacitive touch controller 440 is coupled to multiple sensors such that the input board 402 receives sensed signals from capacitive sensors resulting from a user's touch. For example, the capacitive sensors include a thumbstick sensor 410, an "A" button sensor 415, and/or a "B" button sensor 420. For example, the thumbstick sensor 410 senses a signal resulting from the user touching the thumbstick 410. Further, the button sensors 415 and 420 sense signals resulting from the user touching the buttons 415 and 420. Other capacitive sensors may be included for other user-input keys (e.g., a directional pad).

In some embodiments, the mainboard 403 includes a controller 460, a haptics driver 465, a finger position sensor 475, a clock 477, a power path 490, and an LED driver 480. The haptics driver 465 drives a haptics output device 470 that provides haptic effects. An example of the haptics output device 470 includes a short vibration feedback device that, when activated, causes the handheld controller 300 to vibrate.

The mainboard 403 may be coupled to an antenna 445 to wirelessly receive and transmit signals. The handheld controller (e.g., the controller 300) thus may be wireless. The mainboard 403 may also be coupled to a power source (e.g., a battery 450) to provide power supply to the handheld controller. The power may be supplied to the mainboard 403 and to the input board 402 through a power path 490.

The LED driver 480 drives light sources 485 (e.g., the light sources at the positions 222, 224, 226, 232, 242, 244, etc. disposed on the surface of the handheld controller 300) under the control of the controller 460, and thus turns the light sources 485 on or off.

The finger position sensor 475 senses a position of the finger (e.g., when a user activates the one of the buttons) and this information is processed by the controller 460.

The camera 110, includes at least one sensor for sensing light emitted by the light sources 485 and a controller for processing the light images received for the light sources 485 to detect positions of the controller over time (e.g., as was described above in conjunction with the illumination sources of the controllers 300 shown in FIGS. 1A-2E).

Figure 4:
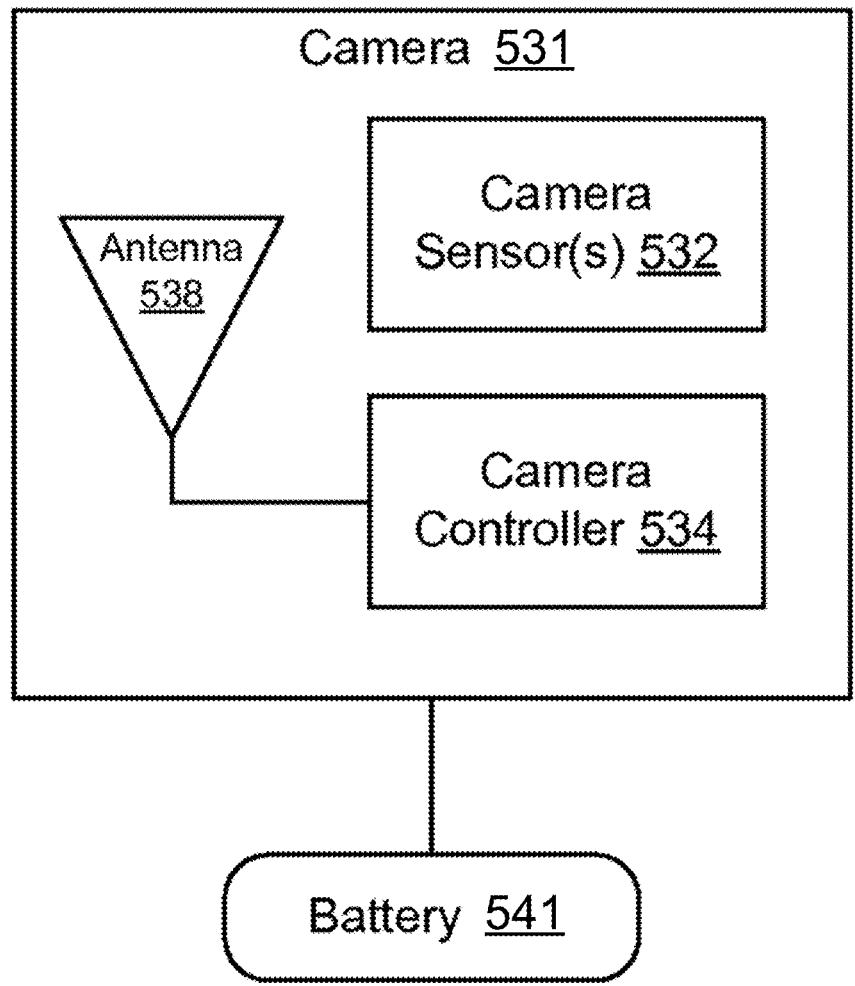
FIG. 4 is a block diagram of an example camera in accordance with some embodiments.

FIG. 4 is a block diagram of an example camera 531 in accordance with some embodiments. The camera 531 is an example of the camera 110 described previously with regards to FIGS. 1A-1B. The camera 531 includes sensor(s) 532 and a controller 534. The controller 534 is coupled to an antenna 538 for wireless communication (e.g., with a virtual-reality system 100 and/or handheld controllers 300). The camera 531 is powered by a battery 541.

Figure 5:
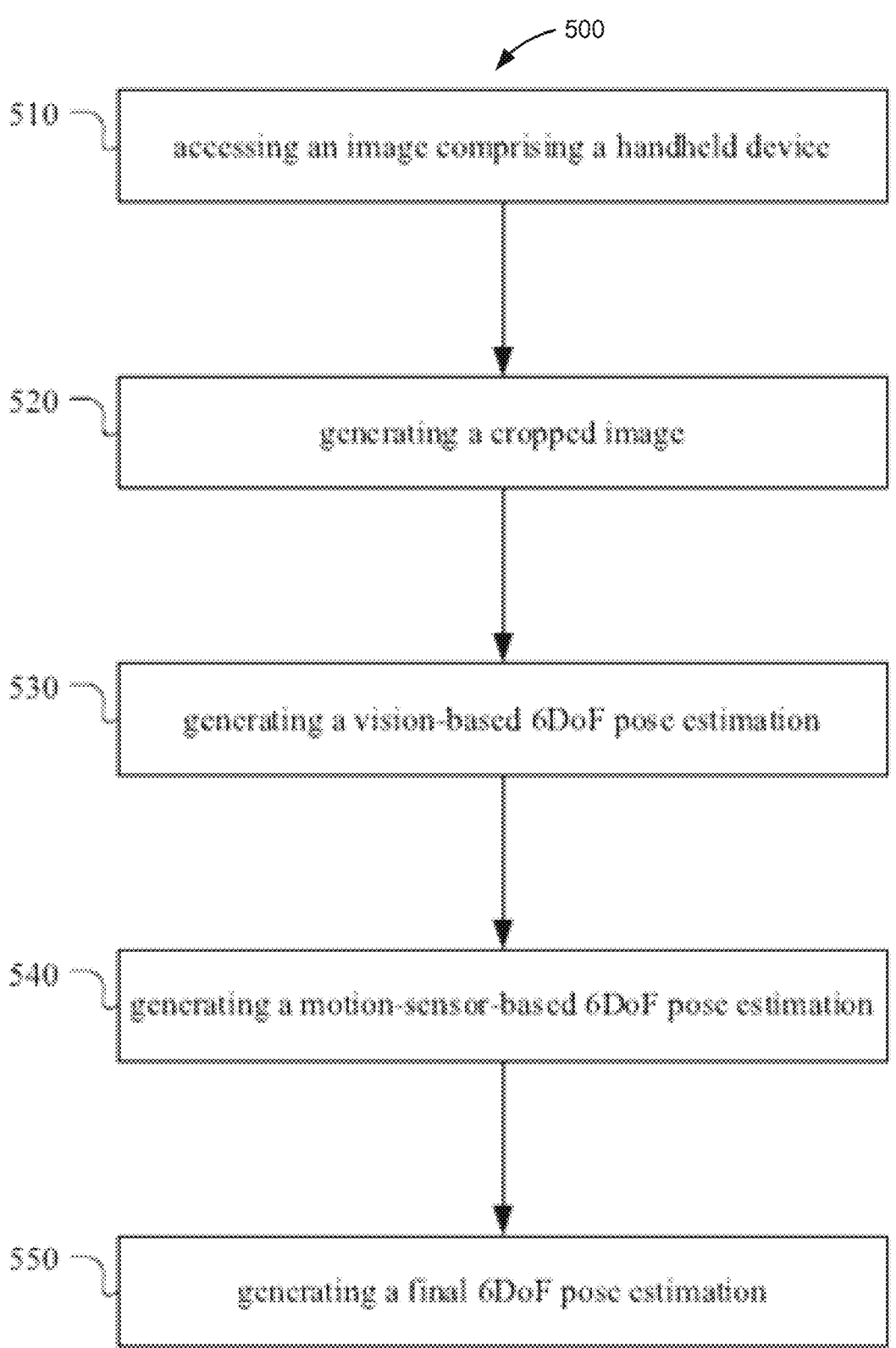
FIG. 5 illustrates an example method for tracking a handheld device in accordance with some embodiments.

FIG. 5 illustrates an example method 500 for tracking a handheld device's 6DoF pose using an image and sensor data. The method begins at step 510, where the computing system (e.g., the artificial-reality system 100 or the computer system 600) accesses an image comprising a handheld device (e.g., the handheld controller 300). The image may be captured by one or more cameras associated with the computing system (e.g., the cameras 110A and 110B). At step 520, the computing system generates a cropped image that comprises a hand of a user or the handheld device from the image by processing the image using a first machine-learning model. At step 530, the computing system generates a vision-based 6DoF pose estimation for the handheld device by processing the cropped image, metadata associated with the image, and first sensor data from one or more sensors associated with the handheld device using a second machine-learning model. At step 540, the computing system generates a motion-sensor-based 6DoF pose estimation for the handheld device by integrating second sensor data from the one or more sensors associated with the handheld device. At step 550, the computing system generates a final 6DoF pose estimation for the handheld device based on the vision-based 6DoF pose estimation and the motion-sensor-based 6DoF pose estimation. Particular embodiments may repeat one or more steps of the method 500, where appropriate. Although this disclosure describes and illustrates particular steps of the method 500 as occurring in a particular order, this disclosure contemplates any suitable steps of the method 500 occurring in any suitable order. Moreover, although this disclosure describes and illustrates an example method for tracking a handheld device's 6DoF pose using an image and sensor data including the particular steps of the method 500, this disclosure contemplates any suitable method for tracking a handheld device's 6DoF pose using an image and sensor data including any suitable steps, which may include all, some, or none of the steps of the method 500, where appropriate. Furthermore, although this disclosure describes and illustrates particular components, devices, or systems carrying out particular steps of the method 500, this disclosure contemplates any suitable combination of any suitable components, devices, or systems carrying out any suitable steps of the method 500.

In some embodiments, the computing system accesses an image comprising a hand of a user and/or a handheld device. In some embodiments, the handheld device is a controller for an artificial reality system (e.g., the handheld controller 300). The image may be captured by one or more cameras associated with the computing system. In some embodiments, the one or more cameras may be attached to a head-wearable device (e.g., the head-wearable device 711). As an example and not by way of limitation, a handheld device tracking component may comprise a vision-based pose estimation unit, a motion-sensor-based pose estimation unit, and a pose fusion unit. A first machine-learning model may receive images at a pre-determined interval from one or more cameras. The first machine learning model may be a detection network. In some embodiments, the one or more cameras may take pictures of a hand of a user or a handheld device at a pre-determined interval and provide the images to the first machine-learning model. For example, the one or more cameras may provide images to the first machine-learning model 30 times per second. In some embodiments, the one or more cameras may be attached to a headset. In some embodiments, the handheld device may be a controller. In some embodiments, the computing system generates a cropped image that comprises a hand of a user and/or the handheld device from the image by processing the image using a first machine-learning model. As an example, the first machine-learning model may process the received image along with additional information to generate a cropped image. The cropped image may comprise a hand of a user holding the handheld device and/or a handheld device. The cropped image may be provided to a second machine-learning model. The second machine-learning model may be a direct pose regression network.

In some embodiments, the computing system generates a vision-based 6DoF pose estimation for the handheld device by processing the cropped image, metadata associated with the image, and first sensor data from one or more sensors associated with the handheld device using a second machine-learning model. The second machine-learning model may be referred to as a direct pose regression network. The second machine-learning model may also generate a vision-based-estimation confidence score corresponding to the generated vision based 6DoF pose estimation. As an example, the second machine-learning model of the vision-based pose estimation unit may receive a cropped image from the first machine-learning model. The second machine-learning model may also access metadata associated with the image and first sensor data from the one or more IMU sensor associated with the handheld device. In some embodiments, the metadata associated with the image comprises intrinsic and extrinsic parameters associated with a camera that takes the image and canonical extrinsic and intrinsic parameters associated with an imaginary camera with a field-of-view that captures only the cropped image. Intrinsic parameters of a camera may be internal and fixed parameters to the camera. Intrinsic parameters may allow a mapping between camera coordinates and pixel coordinates in the image. Extrinsic parameters of a camera may be external parameters that may change with respect to the world frame. Extrinsic parameters may define a location and orientation of the camera with respect to the world. In some embodiments, the first sensor data comprises a gravity vector estimate generated from a gyroscope. The metadata and the first sensor data may be optional input to the second machine-learning model. The second machine-learning model may generate a vision-based 6DoF pose estimation 316 and a vision-based-estimation confidence score corresponding to the generated vision-based 6DoF pose estimation by processing the cropped image. In particular embodiments, the second machine-learning model also processes the metadata and the first sensor data to generate the vision-based 6DoF pose estimation and the vision-based-estimation confidence score.

In some embodiments, the second machine-learning model comprises a ResNet backbone, a feature transform layer, and a pose regression layer. The feature transform layer may generate a feature map based on the cropped image. The pose regression layer may generate a number of three-dimensional keypoints of the handheld device and the vision-based 6DoF pose estimation 316. The pose regression layer may also generate a vision-based-estimation confidence score corresponding to the vision-based 6DoF pose estimation.

In some embodiments, the computing system generates a motion-sensor-based 6DoF pose estimation for the handheld device by integrating second sensor data from the one or more sensors associated with the handheld device. The motion-sensor-based 6DoF pose estimation may be generated by integrating N recently sampled IMU data. The computing system also generates a motion-sensor-based-estimation confidence score corresponding to the motion-sensor-based 6DoF pose estimation. As an example, the handheld device tracking component may receive second sensor data from each of the one or more handheld devices. The second sensor data may be captured by the one or more IMU sensors associated with the handheld device at a pre-determined interval. For example, the handheld device may send the second sensor data 500 times per second to the handheld device tracking component. An IMU integrator module in the motion-sensor-based pose estimation unit may access the second sensor data. The IMU integrator module may integrate N recently received second sensor data to generate a motion-sensor-based 6DoF pose estimation for the handheld device. The IMU integrator module may also generate a motion-sensor-based-estimation confidence score corresponding to the generated motion-sensor-based 6DoF pose estimation.

In some embodiments, the computing system generates a final 6DoF pose estimation for the handheld device based on the vision-based 6DoF pose estimation and the motion-sensor-based 6DoF pose estimation. The computing system generates the final 6DoF pose estimation using an EKF. As an example, the pose fusion unit may generate a final 6DoF pose estimation for the handheld device based on the vision-based 6DoF pose estimation and the motion-sensor-based 6DoF pose estimation. The pose fusion unit may comprise an EKF.

In some embodiments, the EKF takes a constrained 6DoF pose estimation as input when a combined confidence score calculated based on the vision-based-estimation confidence score and the motion-sensor-based-estimation confidence score is lower than a pre-determined threshold. In some embodiments, the combined confidence score is based only on the vision-based-estimation confidence score. In some embodiments, the combined confidence score is based only on the motion-sensor-based-estimation confidence score. The constrained 6DoF pose estimation may be inferred using heuristics based on the IMU data, human motion models, and context information associated with an application the handheld device is used for. As an example, one or more motion models may be used to infer a constrained 6DoF pose estimation. In some embodiments, the one or more motion models comprise a context-information-based motion model. An application the user is currently engaged with may be associated with a particular set of movements of the user. Based on the particular set of movements, a constrained 6DoF pose estimation of the handheld device may be inferred based on recent k estimations. In some embodiments, the one or more motion models comprise a human motion model. A motion of the user may be predicted based on the user's previous movements. Based on the prediction along with other information, a constrained 6DoF pose estimation may be generated. In some embodiments, the one or more motion models comprise an IMU-data-based motion model. The IMU-data-based motion model may generate a constrained 6DoF pose estimation based on the motion-sensor-based 6DoF pose estimation generated by the IMU integrator module. The IMU-data-based motion model may generate the constrained 6DoF pose estimation further based on IMU sensor data. The pose fusion unit may take the constrained 6DoF pose estimation as input when a combined confidence score calculated based on the vision-based-estimation confidence score and the motion-sensor-based-estimation confidence score is lower than a pre-determined threshold. In some embodiments, the combined confidence score is determined based only on the vision-based-estimation confidence score. In some embodiments, the combined confidence score is determined based only on the motion-sensor-based-estimation confidence score.

In some embodiments, the computing system determines a fusion ratio between the vision-based 6DoF pose estimation and the motion-sensor-based 6DoF pose estimation based on the vision-based-estimation confidence score and the motion-sensor-based-estimation confidence score. As an example, the pose fusion unit may generate a final 6DoF pose estimation for the handheld device by fusing the vision-based 6DoF pose estimation and the motion-sensor-based 6DoF pose estimation. The pose fusion unit may determine a fusion ratio between the vision-based 6DoF pose estimation and the motion-sensor-based 6DoF pose estimation based on the vision-based-estimation confidence score and the motion-sensor-based-estimation confidence score. In some embodiments, the vision-based-estimation confidence score may be high while the motion-sensor-based-estimation confidence score may be low. In such a case, the pose fusion unit may determine a fusion ratio such that the final 6DoF pose estimation may rely on the vision-based 6DoF pose estimation more than the motion-sensor-based 6DoF pose estimation. In some embodiments, the motion-sensor-based-estimation confidence score may be high while the vision-based-estimation confidence score may be low. In such a case, the pose fusion unit may determine a fusion ratio such that the final 6DoF pose estimation may rely on the motion-sensor-based 6DoF pose estimation more than the vision-based 6DoF pose estimation.

In some embodiments, a predicted pose from the EKF is provided to the first machine-learning model as input. In some embodiments, an estimated attitude from the EKF may be provided to the second machine-learning model as input. As an example, the pose fusion unit may provide a predicted pose of the handheld device to the first machine-learning model. The first machine-learning model may use the predicted pose to determine a location of the handheld device in the following image. In some embodiments, the pose fusion unit provides an estimated attitude to the second machine-learning model. The second machine-learning model may use the estimated attitude to estimate the following vision-based 6DoF pose estimation.

In some embodiments, the first machine-learning model and the second machine-learning model are trained with annotated training data. The annotated training data may be created by a second artificial reality system with LED-equipped handheld devices. The second artificial reality system may utilize SLAM techniques for creating the annotated training data. As an example, a second artificial reality system with LED-equipped handheld devices may be used for generating annotated training data. The LEDs on the handheld devices may be turned on at a pre-determined interval. One or more cameras associated with the second artificial reality system may capture images of the handheld devices at exact time when the LEDs are turned on with a special exposure level such that the LEDs standout in the images. In some embodiments, the special exposure level may be lower than a normal exposure level such that the captured images are darker than normal images. Based on the visible LEDs in the images, the second artificial reality system may be able to compute a 6DoF pose estimation for each of the handheld devices using SLAM techniques. The computed 6DoF pose estimation for each captured image may be used as an annotation for the image while the first machine-learning model and the second machine-learning model are being trained. Generating annotated training data may significantly reduce a need for manual annotations.

In some embodiments, the handheld device comprises one or more illumination sources that illuminate at a pre-determined interval (e.g., as described previously with respect to FIGS. 1A-2A). In some embodiments, the one or more illumination sources comprise LEDs, light pipes, or any suitable illumination sources. The pre-determined interval may be synchronized with an image taking interval at the one or more cameras. Thus, the one or more cameras may capture images of the handheld device exactly at the same time when the one or more illumination sources illuminate. A blob detection module may detect one or more illuminations in the image. The blob detection module may determine a tentative location of the handheld device based on the detected one or more illuminations in the image. The blob detection module may provide the tentative location of the handheld device to the first machine-learning model as input. In some embodiments, the blob detection module provides an initial crop image comprising the handheld device to the first machine-learning model as input.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 700, a head-wearable device, an HIPD 900, a smart textile-based garment 1000, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IOT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., time-of-flight sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogramar EKG sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 6A-6D-2

Figure 6A:
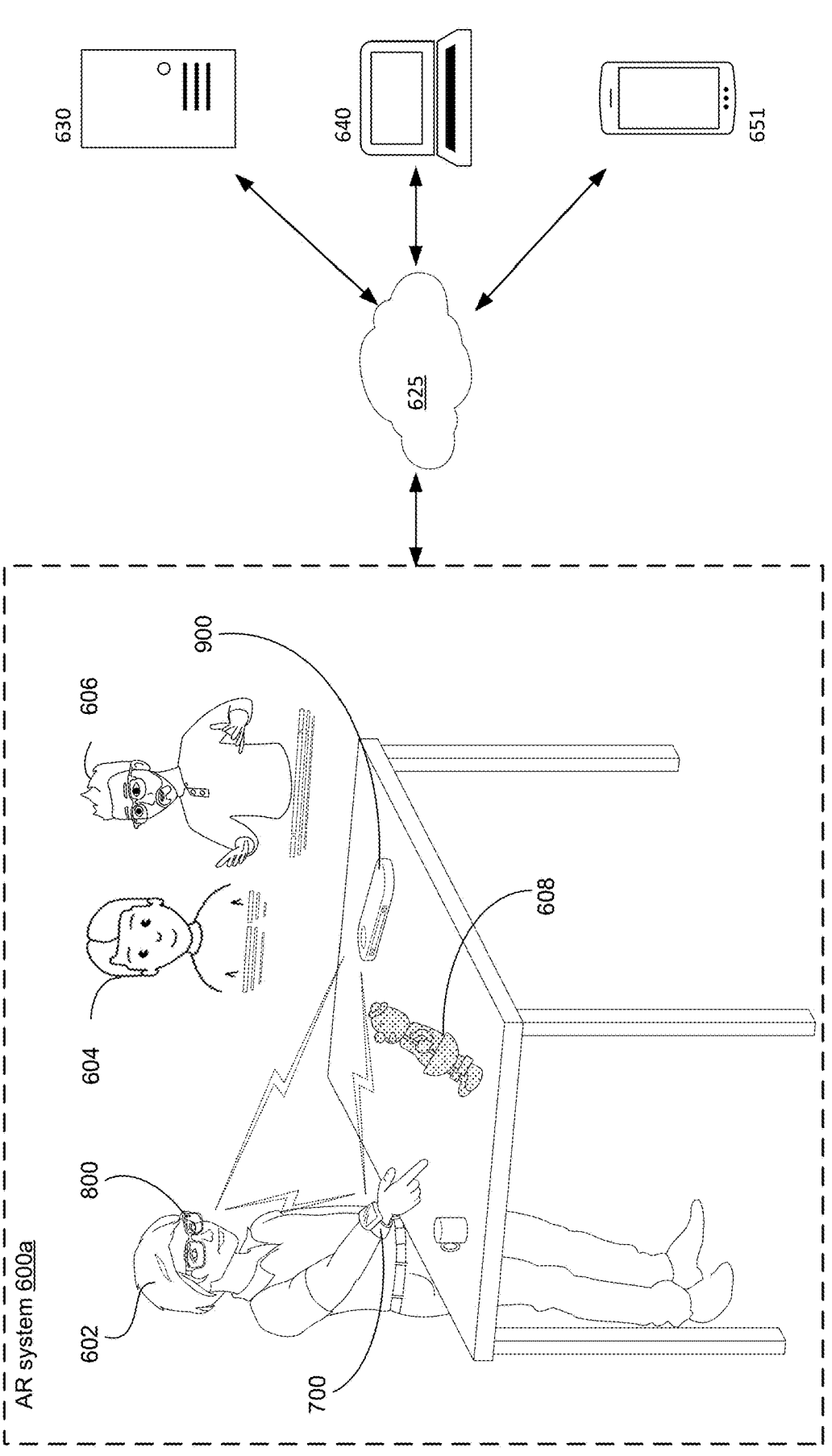
FIGS. 6A, 6B, 6C-1, 6C-2, 6D-1, and 6D-2 illustrate example artificial-reality systems, in accordance with some embodiments.
Figure 6B:
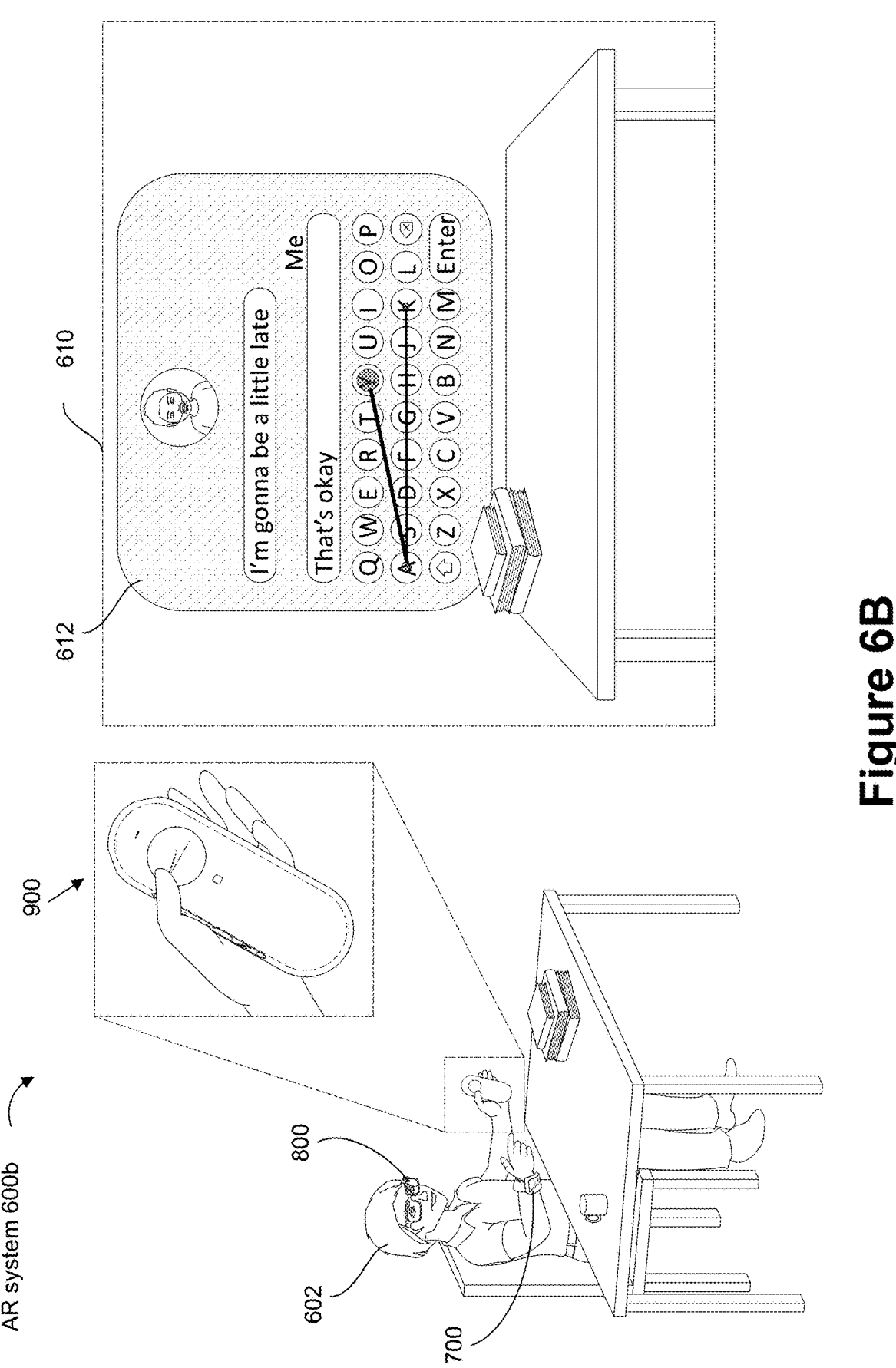
Figures 1, 6C:
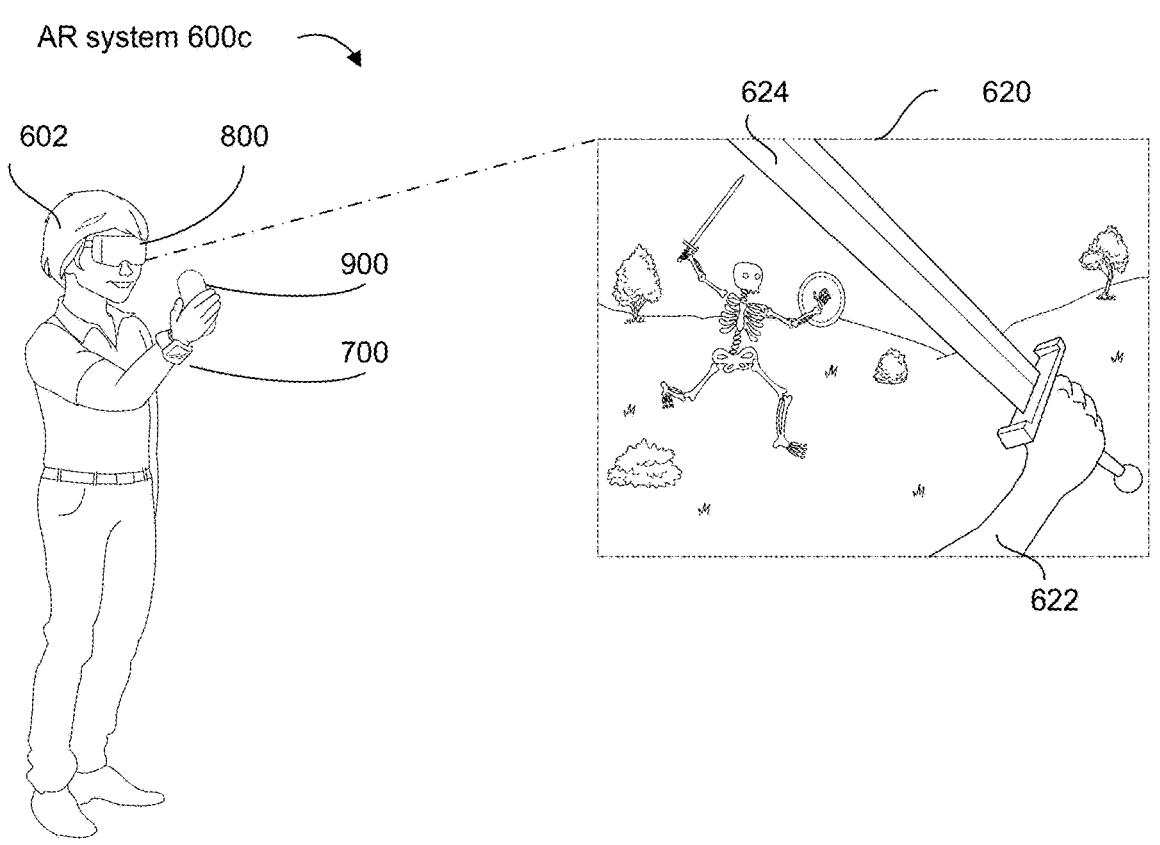
Figures 2, 6C:
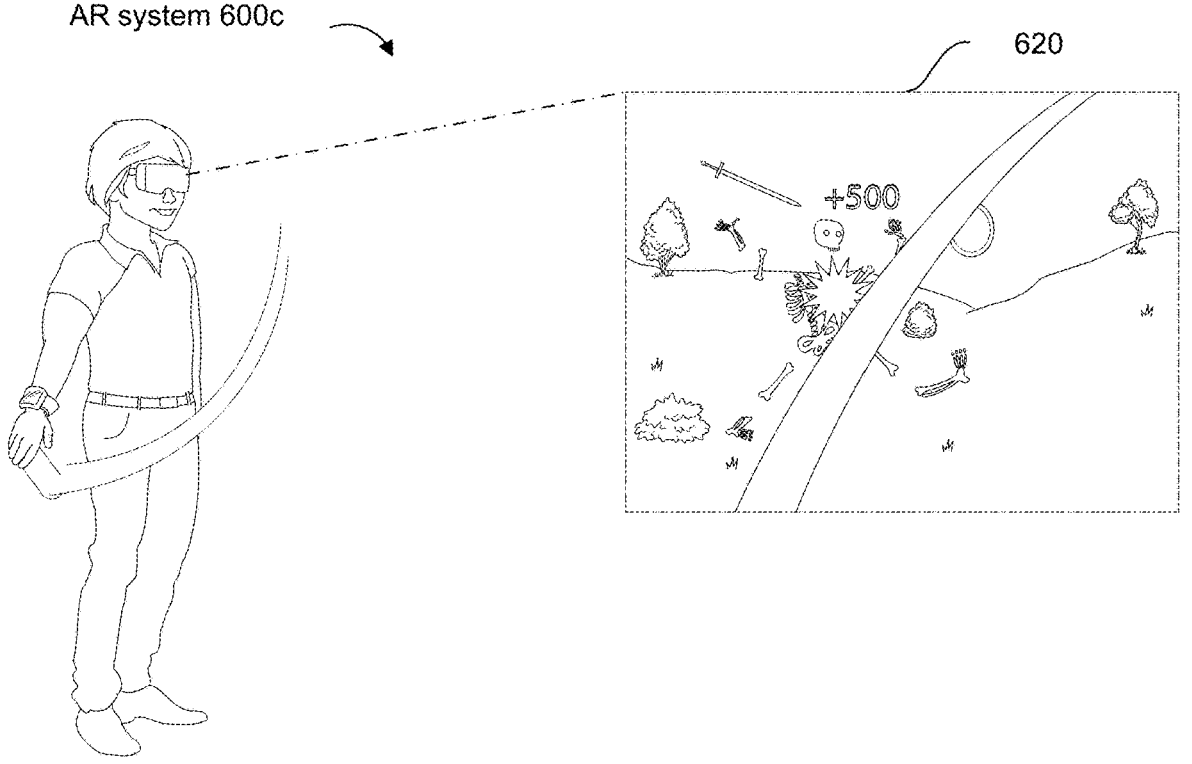
Figures 1, 6D:
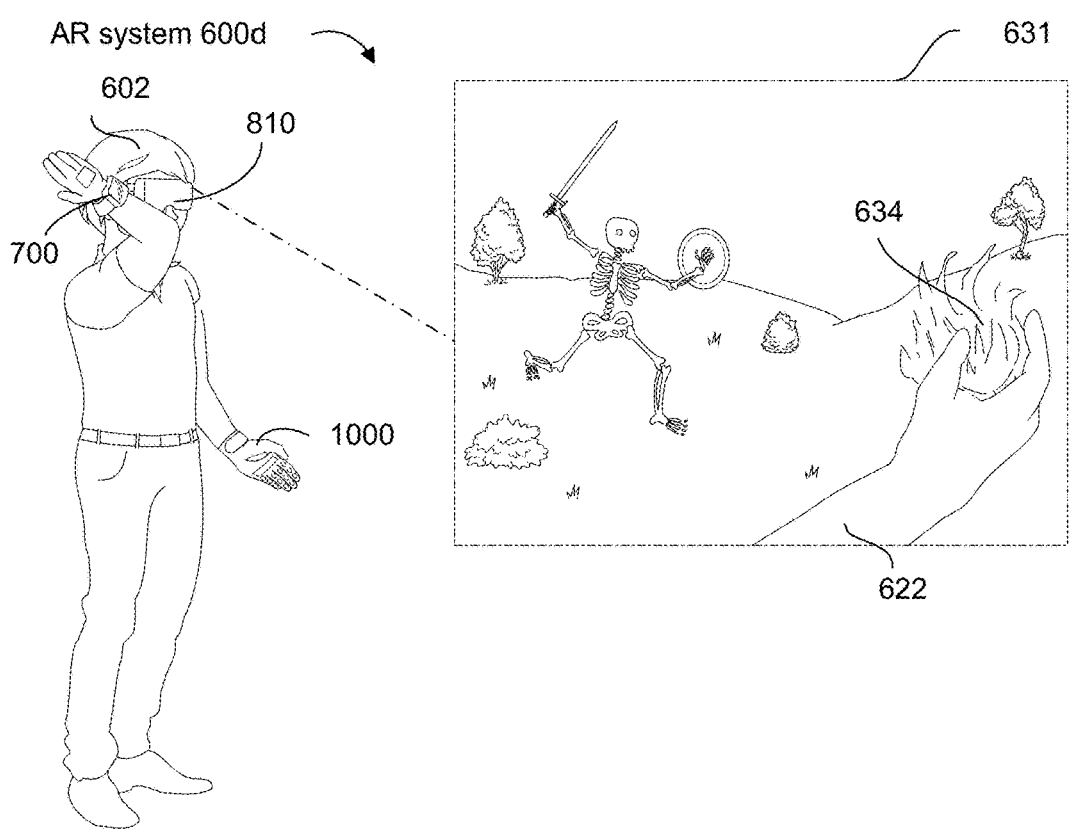
Figures 2, 6D:
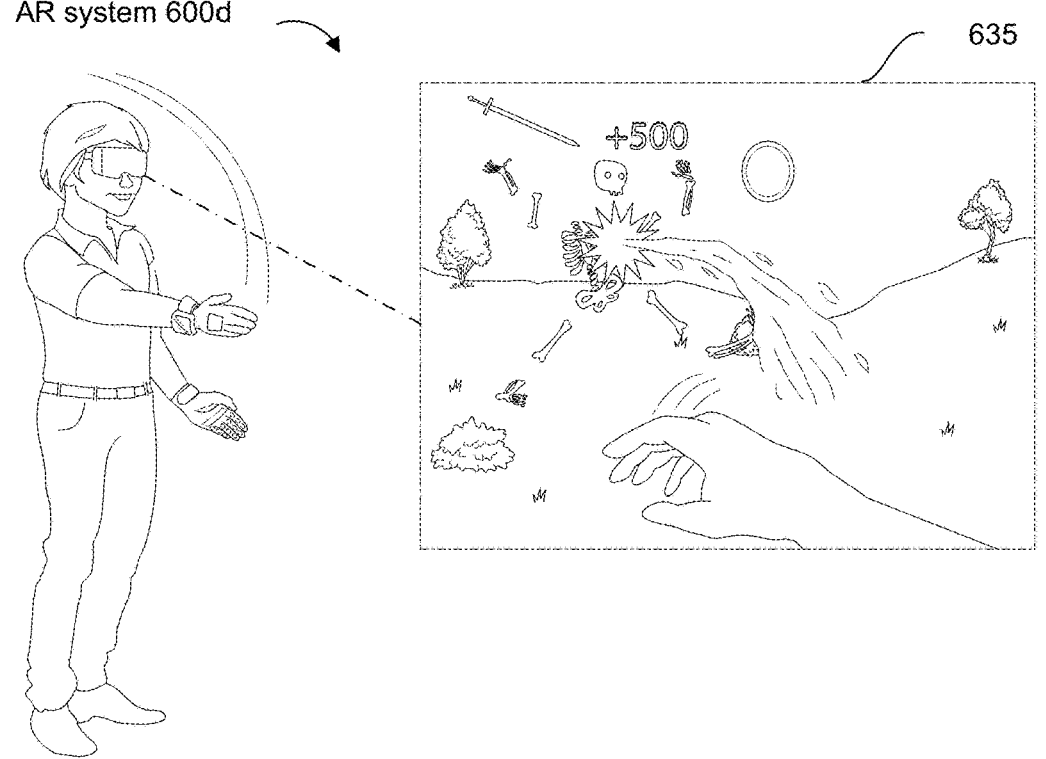

FIGS. 6A, 6B, 6C-1, 6C-2, 6D-1, and 6D-2 illustrate example AR systems, in accordance with some embodiments. FIG. 6A shows a first AR system 600a and first example user interactions using a wrist-wearable device 700, a head-wearable device (e.g., AR device 800), and/or a handheld intermediary processing device (HIPD) 900. FIG. 6B shows a second AR system 600b and second example user interactions using a wrist-wearable device 700, AR device 800, and/or an HIPD 900. FIGS. 6C-1 and 6C-2 show a third AR system 600c and third example user interactions using a wrist-wearable device 700, a head-wearable device (e.g., virtual-reality (VR) device 810), and/or an HIPD 900. FIGS. 6D-1 and 6D-2 show a fourth AR system 600d and fourth example user interactions using a wrist-wearable device 700, VR device 810, and/or a smart textile-based garment 1000 (e.g., wearable gloves, haptic gloves). As the skilled artisan will appreciate upon reading the descriptions provided herein, the above-example AR systems (described in detail below) can perform various functions and/or operations described above with reference to FIGS. 1A to 5.

The wrist-wearable device 700 and its constituent components are described below in reference to FIGS. 7A-7B, the head-wearable devices and their constituent components are described below in reference to FIGS. 8A-8D, and the HIPD 900 and its constituent components are described below in reference to FIGS. 9A-9B. The smart textile-based garment 1000 and its one or more components are described below in reference to FIGS. 10A-10C. The wrist-wearable device 700, the head-wearable devices, and/or the HIPD 900 can communicatively couple via a network 625 (e.g., cellular, near field, Wi-Fi, personal area network, or wireless LAN). Additionally, the wrist-wearable device 700, the head-wearable devices, and/or the HIPD 900 can also communicatively couple with one or more servers 630, computers 640 (e.g., laptops or computers), mobile devices 651 (e.g., smartphones or tablets), and/or other electronic devices via the network 625 (e.g., cellular, near field, Wi-Fi, personal area network, or wireless LAN). Similarly, the smart textile-based garment 1000, when used, can also communicatively couple with the wrist-wearable device 700, the head-wearable devices, the HIPD 900, the one or more servers 630, the computers 640, the mobile devices 651, and/or other electronic devices via the network 625.

Turning to FIG. 6A, a user 602 is shown wearing the wrist-wearable device 700 and the AR device 800, and having the HIPD 900 on their desk. The wrist-wearable device 700, the AR device 800, and the HIPD 900 facilitate user interaction with an AR environment. In particular, as shown by the first AR system 600a, the wrist-wearable device 700, the AR device 800, and/or the HIPD 900 cause presentation of one or more avatars 604, digital representations of contacts 606, and virtual objects 608. As discussed below, the user 602 can interact with the one or more avatars 604, digital representations of the contacts 606, and virtual objects 608 via the wrist-wearable device 700, the AR device 800, and/or the HIPD 900.

The user 602 can use any of the wrist-wearable device 700, the AR device 800, and/or the HIPD 900 to provide user inputs. For example, the user 602 can perform one or more hand gestures that are detected by the wrist-wearable device 700 (e.g., using one or more EMG sensors and/or IMUs, described below in reference to FIGS. 7A-7B) and/or AR device 800 (e.g., using one or more image sensors or cameras, described below in reference to FIGS. 8A-8B) to provide a user input. Alternatively, or additionally, the user 602 can provide a user input via one or more touch surfaces of the wrist-wearable device 700, the AR device 800, and/or the HIPD 900, and/or voice commands captured by a microphone of the wrist-wearable device 700, the AR device 800, and/or the HIPD 900. In some embodiments, the wrist-wearable device 700, the AR device 800, and/or the HIPD 900 include a digital assistant to help the user in providing a user input (e.g., completing a sequence of operations, suggesting different operations or commands, providing reminders, or confirming a command). In some embodiments, the user 602 can provide a user input via one or more facial gestures and/or facial expressions. For example, cameras of the wrist-wearable device 700, the AR device 800, and/or the HIPD 900 can track the user 602's eyes for navigating a user interface.

The wrist-wearable device 700, the AR device 800, and/or the HIPD 900 can operate alone or in conjunction to allow the user 602 to interact with the AR environment. In some embodiments, the HIPD 900 is configured to operate as a central hub or control center for the wrist-wearable device 700, the AR device 800, and/or another communicatively coupled device. For example, the user 602 can provide an input to interact with the AR environment at any of the wrist-wearable device 700, the AR device 800, and/or the HIPD 900, and the HIPD 900 can identify one or more back-end and front-end tasks to cause the performance of the requested interaction and distribute instructions to cause the performance of the one or more back-end and front-end tasks at the wrist-wearable device 700, the AR device 800, and/or the HIPD 900. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 9A-9B, the HIPD 900 can perform the back-end tasks and provide the wrist-wearable device 700 and/or the AR device 800 operational data corresponding to the performed back-end tasks such that the wrist-wearable device 700 and/or the AR device 800 can perform the front-end tasks. In this way, the HIPD 900, which has more computational resources and greater thermal headroom than the wrist-wearable device 700 and/or the AR device 800, performs computationally intensive tasks and reduces the computer resource utilization and/or power usage of the wrist-wearable device 700 and/or the AR device 800.

In the example shown by the first AR system 600a, the HIPD 900 identifies one or more back-end tasks and front-end tasks associated with a user request to initiate an AR video call with one or more other users (represented by the avatar 604 and the digital representation of the contact 606) and distributes instructions to cause the performance of the one or more back-end tasks and front-end tasks. In particular, the HIPD 900 performs back-end tasks for processing and/or rendering image data (and other data) associated with the AR video call and provides operational data associated with the performed back-end tasks to the AR device 800 such that the AR device 800 performs front-end tasks for presenting the AR video call (e.g., presenting the avatar 604 and the digital representation of the contact 606).

In some embodiments, the HIPD 900 can operate as a focal or anchor point for causing the presentation of information. This allows the user 602 to be generally aware of where information is presented. For example, as shown in the first AR system 600a, the avatar 604 and the digital representation of the contact 606 are presented above the HIPD 900. In particular, the HIPD 900 and the AR device 800 operate in conjunction to determine a location for presenting the avatar 604 and the digital representation of the contact 606. In some embodiments, information can be presented within a predetermined distance from the HIPD 900 (e.g., within five meters). For example, as shown in the first AR system 600a, virtual object 608 is presented on the desk some distance from the HIPD 900. Similar to the above example, the HIPD 900 and the AR device 800 can operate in conjunction to determine a location for presenting the virtual object 608. Alternatively, in some embodiments, presentation of information is not bound by the HIPD 900. More specifically, the avatar 604, the digital representation of the contact 606, and the virtual object 608 do not have to be presented within a predetermined distance of the HIPD 900.

User inputs provided at the wrist-wearable device 700, the AR device 800, and/or the HIPD 900 are coordinated such that the user can use any device to initiate, continue, and/or complete an operation. For example, the user 602 can provide a user input to the AR device 800 to cause the AR device 800 to present the virtual object 608 and, while the virtual object 608 is presented by the AR device 800, the user 602 can provide one or more hand gestures via the wrist-wearable device 700 to interact and/or manipulate the virtual object 608.

FIG. 6B shows the user 602 wearing the wrist-wearable device 700 and the AR device 800, and holding the HIPD 900. In the second AR system 600b, the wrist-wearable device 700, the AR device 800, and/or the HIPD 900 are used to receive and/or provide one or more messages to a contact of the user 602. In particular, the wrist-wearable device 700, the AR device 800, and/or the HIPD 900 detect and coordinate one or more user inputs to initiate a messaging application and prepare a response to a received message via the messaging application.

In some embodiments, the user 602 initiates, via a user input, an application on the wrist-wearable device 700, the AR device 800, and/or the HIPD 900 that causes the application to initiate on at least one device. For example, in the second AR system 600b, the user 602 performs a hand gesture associated with a command for initiating a messaging application (represented by messaging user interface 612), the wrist-wearable device 700 detects the hand gesture, and, based on a determination that the user 602 is wearing AR device 800, causes the AR device 800 to present a messaging user interface 612 of the messaging application. The AR device 800 can present the messaging user interface 612 to the user 602 via its display (e.g., as shown by user 602's field of view 610). In some embodiments, the application is initiated and can be run on the device (e.g., the wrist-wearable device 700, the AR device 800, and/or the HIPD 900) that detects the user input to initiate the application, and the device provides another device operational data to cause the presentation of the messaging application. For example, the wrist-wearable device 700 can detect the user input to initiate a messaging application, initiate and run the messaging application, and provide operational data to the AR device 800 and/or the HIPD 900 to cause presentation of the messaging application. Alternatively, the application can be initiated and run at a device other than the device that detected the user input. For example, the wrist-wearable device 700 can detect the hand gesture associated with initiating the messaging application and cause the HIPD 900 to run the messaging application and coordinate the presentation of the messaging application.

Further, the user 602 can provide a user input provided at the wrist-wearable device 700, the AR device 800, and/or the HIPD 900 to continue and/or complete an operation initiated at another device. For example, after initiating the messaging application via the wrist-wearable device 700 and while the AR device 800 presents the messaging user interface 612, the user 602 can provide an input at the HIPD 900 to prepare a response (e.g., shown by the swipe gesture performed on the HIPD 900). The user 602's gestures performed on the HIPD 900 can be provided and/or displayed on another device. For example, the user 602's swipe gestures performed on the HIPD 900 are displayed on a virtual keyboard of the messaging user interface 612 displayed by the AR device 800.

In some embodiments, the wrist-wearable device 700, the AR device 800, the HIPD 900, and/or other communicatively coupled devices can present one or more notifications to the user 602. The notification can be an indication of a new message, an incoming call, an application update, a status update, etc. The user 602 can select the notification via the wrist-wearable device 700, the AR device 800, or the HIPD 900 and cause presentation of an application or operation associated with the notification on at least one device. For example, the user 602 can receive a notification that a message was received at the wrist-wearable device 700, the AR device 800, the HIPD 900, and/or other communicatively coupled device and provide a user input at the wrist-wearable device 700, the AR device 800, and/or the HIPD 900 to review the notification, and the device detecting the user input can cause an application associated with the notification to be initiated and/or presented at the wrist-wearable device 700, the AR device 800, and/or the HIPD 900.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 800 can present to the user 602 game application data and the HIPD 900 can use a controller to provide inputs to the game. Similarly, the user 602 can use the wrist-wearable device 700 to initiate a camera of the AR device 800, and the user can use the wrist-wearable device 700, the AR device 800, and/or the HIPD 900 to manipulate the image capture (e.g., zoom in or out or apply filters) and capture image data.

Turning to FIGS. 6C-1 and 6C-2, the user 602 is shown wearing the wrist-wearable device 700 and a VR device 810, and holding the HIPD 900. In the third AR system 600*c*, the wrist-wearable device 700, the VR device 810, and/or the HIPD 900 are used to interact within an AR environment, such as a VR game or other AR application. While the VR device 810 presents a representation of a VR game (e.g., first AR game environment 620) to the user 602, the wrist-wearable device 700, the VR device 810, and/or the HIPD 900 detect and coordinate one or more user inputs to allow the user 602 to interact with the VR game.

In some embodiments, the user 602 can provide a user input via the wrist-wearable device 700, the VR device 810, and/or the HIPD 900 that causes an action in a corresponding AR environment. For example, the user 602 in the third AR system 600*c* (shown in FIG. 6C-1) raises the HIPD 900 to prepare for a swing in the first AR game environment 620. The VR device 810, responsive to the user 602 raising the HIPD 900, causes the AR representation of the user 622 to perform a similar action (e.g., raise a virtual object, such as a virtual sword 624). In some embodiments, each device uses respective sensor data and/or image data to detect the user input and provide an accurate representation of the user

602's motion. For example, image sensors 958 (e.g., SLAM cameras or other cameras discussed below in FIGS. 9A and 9B) of the HIPD 900 can be used to detect a position of the 900 relative to the user 602's body such that the virtual object can be positioned appropriately within the first AR game environment 620; sensor data from the wrist-wearable device 700 can be used to detect a velocity at which the user 602 raises the HIPD 900 such that the AR representation of the user 622 and the virtual sword 624 are synchronized with the user 602's movements; and image sensors 826 (FIGS. 8A-8C) of the VR device 810 can be used to represent the user 602's body, boundary conditions, or real-world objects within the first AR game environment 620.

In FIG. 6C-2, the user 602 performs a downward swing while holding the HIPD 900. The user 602's downward swing is detected by the wrist-wearable device 700, the VR device 810, and/or the HIPD 900 and a corresponding action is performed in the first AR game environment 620. In some embodiments, the data captured by each device is used to improve the user's experience within the AR environment. For example, sensor data of the wrist-wearable device 700 can be used to determine a speed and/or force at which the downward swing is performed and image sensors of the HIPD 900 and/or the VR device 810 can be used to determine a location of the swing and how it should be represented in the first AR game environment 620, which, in turn, can be used as inputs for the AR environment (e.g., game mechanics, which can use detected speed, force, locations, and/or aspects of the user 602's actions to classify a user's inputs (e.g., user performs a light strike, hard strike, critical strike, glancing strike, miss) or calculate an output (e.g., amount of damage)).

While the wrist-wearable device 700, the VR device 810, and/or the HIPD 900 are described as detecting user inputs, in some embodiments, user inputs are detected at a single device (with the single device being responsible for distributing signals to the other devices for performing the user input). For example, the HIPD 900 can operate an application for generating the first AR game environment 620 and provide the VR device 810 with corresponding data for causing the presentation of the first AR game environment 620, as well as detect the 602's movements (while holding the HIPD 900) to cause the performance of corresponding actions within the first AR game environment 620. Additionally or alternatively, in some embodiments, operational data (e.g., sensor data, image data, application data, device data, and/or other data) of one or more devices is provide to a single device (e.g., the HIPD 900) to process the operational data and cause respective devices to perform an action associated with processed operational data.

In FIGS. 6D-1 and 6D-2, the user 602 is shown wearing the wrist-wearable device 700, the VR device 810, and smart textile-based garments 1000. In the fourth AR system 600*d*, the wrist-wearable device 700, the VR device 810, and/or the smart textile-based garments 1000 are used to interact within an AR environment (e.g., any AR system described above in reference to FIGS. 6A-6C-2, as well as 1A to 5). While the VR device 810 presents a representation of a VR game (e.g., second AR game environment 631) to the user 602, the wrist-wearable device 700, the VR device 810, and/or the smart textile-based garments 1000 detect and coordinate one or more user inputs to allow the user 602 to interact with the AR environment.

In some embodiments, the user 602 can provide a user input via the wrist-wearable device 700, the VR device 810, and/or the smart textile-based garments 1000 that causes an action in a corresponding AR environment. For example, the user 602 in the fourth AR system 600d (shown in FIG. 6D-1) raises a hand wearing the smart textile-based garments 1000 to prepare to cast a spell or throw an object within the second AR game environment 631. The VR device 810, responsive to the user 602 holding up their hand (wearing smart textile-based garments 1000), causes the AR representation of the user 622 to perform a similar action (e.g., hold a virtual object or throw a fireball 634). In some embodiments, each device uses respective sensor data and/or image data to detect the user input and provides an accurate representation of the user 602's motion.

In FIG. 6D-2, the user 602 performs a throwing motion while wearing the smart textile-based garment 1000. The user 602's throwing motion is detected by the wrist-wearable device 700, the VR device 810, and/or the smart textile-based garments 1000, and a corresponding action is performed in the second AR game environment 631. As described above, the data captured by each device is used to improve the user's experience within the AR environment. Although not shown, the smart textile-based garments 1000 can be used in conjunction with an VR device 810 and/or an HIPD 900.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 7A:
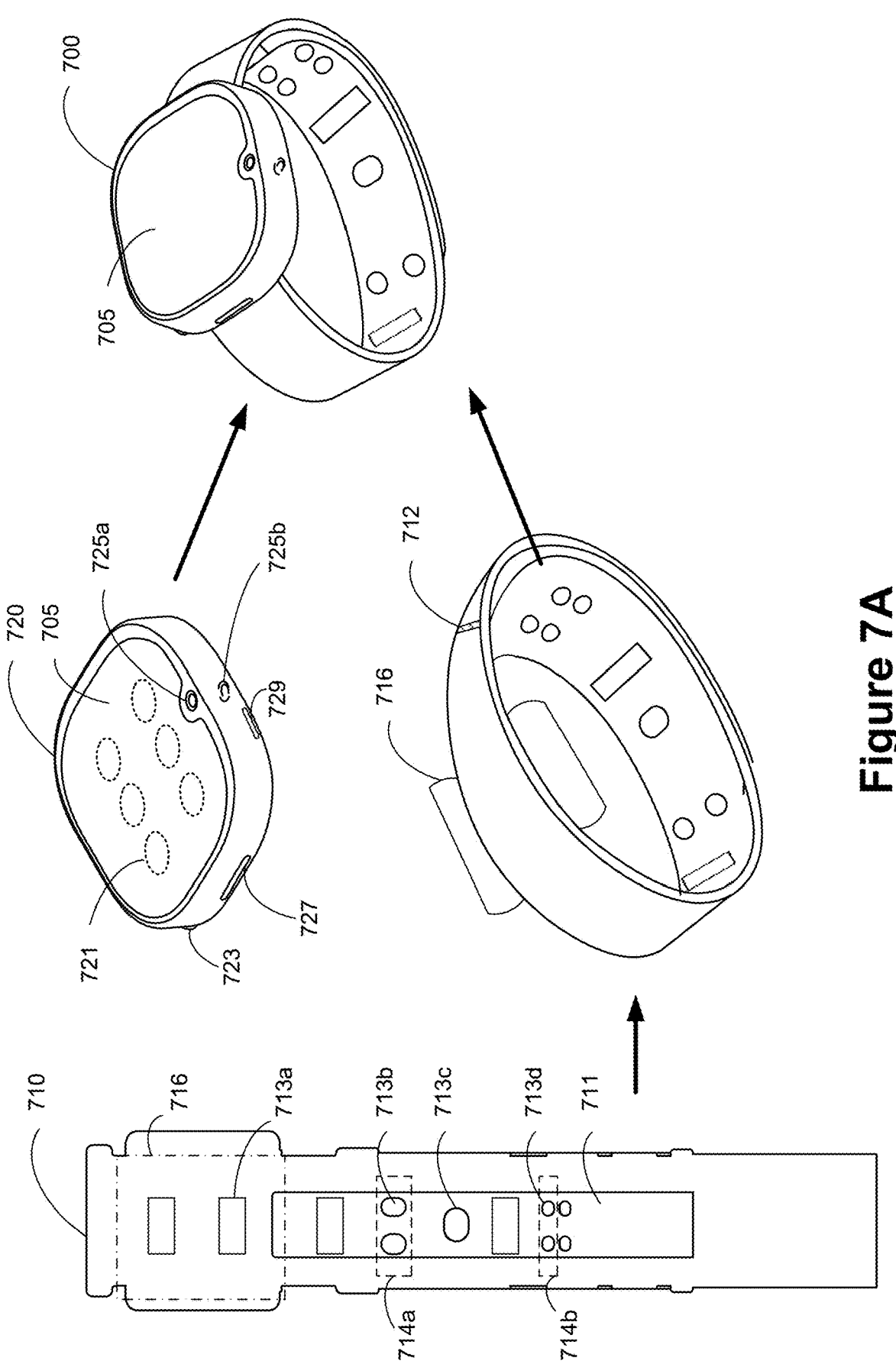
FIGS. 7A-7B illustrate an example wrist-wearable device, in accordance with some embodiments.
Figure 7B:
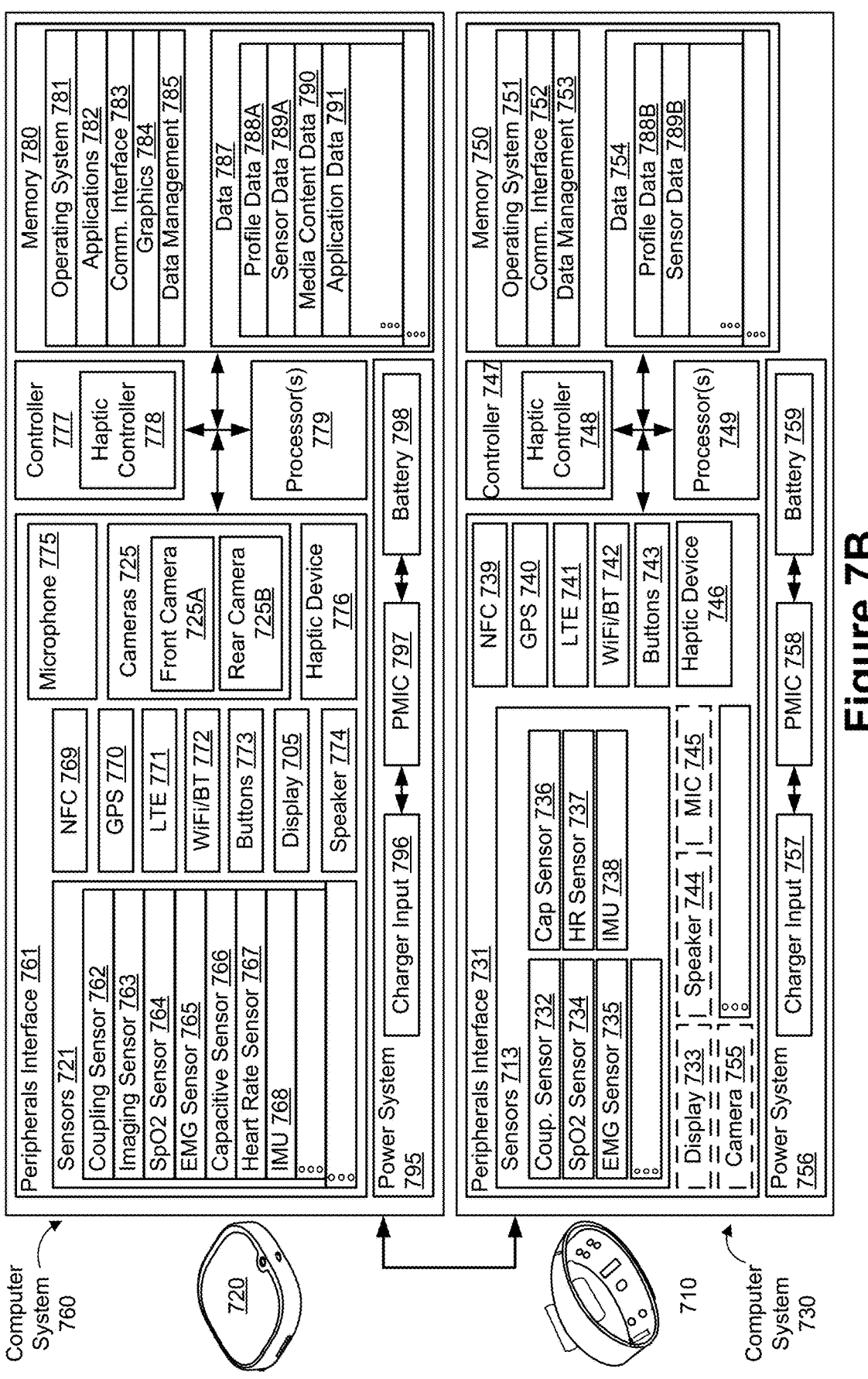

FIGS. 7A and 7B illustrate an example wrist-wearable device 700, in accordance with some embodiments. FIG. 7A illustrates components of the wrist-wearable device 700, which can be used individually or in combination, including combinations that include other electronic devices and/or electronic components.

FIG. 7A shows a wearable band 710 and a watch body 720 (or capsule) being coupled, as discussed below, to form the wrist-wearable device 700. The wrist-wearable device 700 can perform various functions and/or operations associated with navigating through user interfaces and selectively opening applications.

As will be described in more detail below, operations executed by the wrist-wearable device 700 can include (i) presenting content to a user (e.g., displaying visual content via a display 705); (ii) detecting (e.g., sensing) user input (e.g., sensing a touch on peripheral button 723 and/or at a touch screen of the display 705, a hand gesture detected by sensors (e.g., biopotential sensors)); (iii) sensing biometric data via one or more sensors 713 (e.g., neuromuscular signals, heart rate, temperature, or sleep); messaging (e.g., text, speech, or video); image capture via one or more imaging devices or cameras 725; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 720, independently in the wearable band 710, and/or via an electronic communication between the watch body 720 and the wearable band 710. In some embodiments, functions can be executed on the wrist-wearable device 700 while an AR environment is being presented (e.g., via one of the AR systems 600a to 600d). As the skilled artisan will appreciate upon reading the descriptions provided herein, the novel wearable devices described herein can be used with other types of AR environments.

The wearable band 710 can be configured to be worn by a user such that an inner (or inside) surface of the wearable structure 711 of the wearable band 710 is in contact with the user's skin. When worn by a user, sensors 713 contact the user's skin. The sensors 713 can sense biometric data such as a user's heart rate, saturated oxygen level, temperature, sweat level, neuromuscular-signal sensors, or a combination thereof. The sensors 713 can also sense data about a user's environment, including a user's motion, altitude, location, orientation, gait, acceleration, position, or a combination thereof. In some embodiments, the sensors 713 are configured to track a position and/or motion of the wearable band 710. The one or more sensors 713 can include any of the sensors defined above and/or discussed below with respect to FIG. 7B.

The one or more sensors 713 can be distributed on an inside and/or an outside surface of the wearable band 710. In some embodiments, the one or more sensors 713 are uniformly spaced along the wearable band 710. Alternatively, in some embodiments, the one or more sensors 713 are positioned at distinct points along the wearable band 710. As shown in FIG. 7A, the one or more sensors 713 can be the same or distinct. For example, in some embodiments, the one or more sensors 713 can be shaped as a pill (e.g., sensor 713a), an oval, a circle a square, an oblong (e.g., sensor 713c), and/or any other shape that maintains contact with the user's skin (e.g., such that neuromuscular signal and/or other biometric data can be accurately measured at the user's skin). In some embodiments, the one or more sensors 713 are aligned to form pairs of sensors (e.g., for sensing neuromuscular signals based on differential sensing within each respective sensor). For example, sensor 713b is aligned with an adjacent sensor to form sensor pair 714a, and sensor 713d is aligned with an adjacent sensor to form sensor pair 714b. In some embodiments, the wearable band 710 does not have a sensor pair. Alternatively, in some embodiments, the wearable band 710 has a predetermined number of sensor pairs (one pair of sensors, three pairs of sensors, four pairs of sensors, six pairs of sensors, or sixteen pairs of sensors).

The wearable band 710 can include any suitable number of sensors 713. In some embodiments, the amount and arrangements of sensors 713 depend on the particular application for which the wearable band 710 is used. For instance, a wearable band 710 configured as an armband, wristband, or chest-band may include a plurality of sensors 713 with a different number of sensors 713 and different arrangement for each use case, such as medical use cases, compared to gaming or general day-to-day use cases.

In accordance with some embodiments, the wearable band 710 further includes an electrical ground electrode and a shielding electrode. The electrical ground and shielding electrodes, like the sensors 713, can be distributed on the inside surface of the wearable band 710 such that they contact a portion of the user's skin. For example, the electrical ground and shielding electrodes can be at an inside surface of coupling mechanism 716 or an inside surface of a wearable structure 711. The electrical ground and shielding electrodes can be formed and/or use the same components as the sensors 713. In some embodiments, the wearable band 710 includes more than one electrical ground electrode and more than one shielding electrode.

The sensors 713 can be formed as part of the wearable structure 711 of the wearable band 710. In some embodiments, the sensors 713 are flush or substantially flush with the wearable structure 711 such that they do not extend beyond the surface of the wearable structure 711. While flush with the wearable structure 711, the sensors 713 are still configured to contact the user's skin (e.g., via a skin-contacting surface). Alternatively, in some embodiments, the sensors 713 extend beyond the wearable structure 711 a predetermined distance (e.g., 0.1 mm to 2 mm) to make contact and depress into the user's skin. In some embodiments, the sensors 713 are coupled to an actuator (not shown) configured to adjust an extension height (e.g., a distance from the surface of the wearable structure 711) of the sensors 713 such that the sensors 713 make contact and depress into the user's skin. In some embodiments, the actuators adjust the extension height between 0.01 mm to 1.2 mm. This allows the user to customize the positioning of the sensors 713 to improve the overall comfort of the wearable band 710 when worn while still allowing the sensors 713 to contact the user's skin. In some embodiments, the sensors 713 are indistinguishable from the wearable structure 711 when worn by the user.

The wearable structure 711 can be formed of an elastic material, elastomers, etc., configured to be stretched and fitted to be worn by the user. In some embodiments, the wearable structure 711 is a textile or woven fabric. As described above, the sensors 713 can be formed as part of a wearable structure 711. For example, the sensors 713 can be molded into the wearable structure 711 or be integrated into a woven fabric (e.g., the sensors 713 can be sewn into the fabric and mimic the pliability of fabric (e.g., the sensors 713 can be constructed from a series of woven strands of fabric)).

The wearable structure 711 can include flexible electronic connectors that interconnect the sensors 713, the electronic circuitry, and/or other electronic components (described below in reference to FIG. 7B) that are enclosed in the wearable band 710. In some embodiments, the flexible electronic connectors are configured to interconnect the sensors 713, the electronic circuitry, and/or other electronic components of the wearable band 710 with respective sensors and/or other electronic components of another electronic device (e.g., watch body 720). The flexible electronic connectors are configured to move with the wearable structure 711 such that the user adjustment to the wearable structure 711 (e.g., resizing, pulling, or folding) does not stress or strain the electrical coupling of components of the wearable band 710.

As described above, the wearable band 710 is configured to be worn by a user. In particular, the wearable band 710 can be shaped or otherwise manipulated to be worn by a user. For example, the wearable band 710 can be shaped to have a substantially circular shape such that it can be configured to be worn on the user's lower arm or wrist. Alternatively, the wearable band 710 can be shaped to be worn on another body part of the user, such as the user's upper arm (e.g., around a bicep), forearm, chest, legs, etc. The wearable band 710 can include a retaining mechanism 712 (e.g., a buckle or a hook and loop fastener) for securing the wearable band 710 to the user's wrist or other body part. While the wearable band 710 is worn by the user, the sensors 713 sense data (referred to as sensor data) from the user's skin. In particular, the sensors 713 of the wearable band 710 obtain (e.g., sense and record) neuromuscular signals.

The sensed data (e.g., sensed neuromuscular signals) can be used to detect and/or determine the user's intention to perform certain motor actions. In particular, the sensors 713 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 705 of the wrist-wearable device 700 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 713 can be used to provide a user with an enhanced interaction with a physical object (e.g., devices communicatively coupled with the wearable band 710) and/or a virtual object in an AR application generated by an AR system (e.g., user interface objects presented on the display 705 or another computing device (e.g., a smartphone)).

In some embodiments, the wearable band 710 includes one or more haptic devices 746 (FIG. 7B; e.g., a vibratory haptic actuator) that are configured to provide haptic feedback (e.g., a cutaneous and/or kinesthetic sensation) to the user's skin. The sensors 713 and/or the haptic devices 746 can be configured to operate in conjunction with multiple applications including, without limitation, health monitoring, social media, games, and AR (e.g., the applications associated with AR).

The wearable band 710 can also include a coupling mechanism 716 (e.g., a cradle or a shape of the coupling mechanism can correspond to the shape of the watch body 720 of the wrist-wearable device 700) for detachably coupling a capsule (e.g., a computing unit) or watch body 720 (via a coupling surface of the watch body 720) to the wearable band 710. In particular, the coupling mechanism 716 can be configured to receive a coupling surface proximate to the bottom side of the watch body 720 (e.g., a side opposite to a front side of the watch body 720 where the display 705 is located), such that a user can push the watch body 720 downward into the coupling mechanism 716 to attach the watch body 720 to the coupling mechanism 716. In some embodiments, the coupling mechanism 716 can be configured to receive a top side of the watch body 720 (e.g., a side proximate to the front side of the watch body 720 where the display 705 is located) that is pushed upward into the cradle, as opposed to being pushed downward into the coupling mechanism 716. In some embodiments, the coupling mechanism 716 is an integrated component of the wearable band 710 such that the wearable band 710 and the coupling mechanism 716 are a single unitary structure. In some embodiments, the coupling mechanism 716 is a type of frame or shell that allows the watch body 720 coupling surface to be retained within or on the wearable band 710 coupling mechanism 716 (e.g., a cradle, a tracker band, a support base, or a clasp).

The coupling mechanism 716 can allow for the watch body 720 to be detachably coupled to the wearable band 710 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 720 to the wearable band 710 and to decouple the watch body 720 from the wearable band 710. For example, a user can twist, slide, turn, push, pull, or rotate the watch body 720 relative to the wearable band 710, or a combination thereof, to attach the watch body 720 to the wearable band 710 and to detach the watch body 720 from the wearable band 710. Alternatively, as discussed below, in some embodiments, the watch body 720 can be decoupled from the wearable band 710 by actuation of the release mechanism 729.

The wearable band 710 can be coupled with a watch body 720 to increase the functionality of the wearable band 710 (e.g., converting the wearable band 710 into a wrist-wearable device 700, adding an additional computing unit and/or battery to increase computational resources and/or a battery life of the wearable band 710, or adding additional sensors to improve sensed data). As described above, the wearable band 710 (and the coupling mechanism 716) is configured to operate independently (e.g., execute functions independently) from watch body 720. For example, the coupling mechanism 716 can include one or more sensors 713 that contact a user's skin when the wearable band 710 is worn by the user and provide sensor data for determining control commands.

A user can detach the watch body 720 (or capsule) from the wearable band 710 in order to reduce the encumbrance of the wrist-wearable device 700 to the user. For embodiments in which the watch body 720 is removable, the watch body 720 can be referred to as a removable structure, such that in these embodiments the wrist-wearable device 700 includes a wearable portion (e.g., the wearable band 710) and a removable structure (the watch body 720).

Turning to the watch body 720, the watch body 720 can have a substantially rectangular or circular shape. The watch body 720 is configured to be worn by the user on their wrist or on another body part. More specifically, the watch body 720 is sized to be easily carried by the user, attached on a portion of the user's clothing, and/or coupled to the wearable band 710 (forming the wrist-wearable device 700). As described above, the watch body 720 can have a shape corresponding to the coupling mechanism 716 of the wearable band 710. In some embodiments, the watch body 720 includes a single release mechanism 729 or multiple release mechanisms (e.g., two release mechanisms 729 positioned on opposing sides of the watch body 720, such as spring-loaded buttons) for decoupling the watch body 720 and the wearable band 710. The release mechanism 729 can include, without limitation, a button, a knob, a plunger, a handle, a lever, a fastener, a clasp, a dial, a latch, or a combination thereof.

A user can actuate the release mechanism 729 by pushing, turning, lifting, depressing, shifting, or performing other actions on the release mechanism 729. Actuation of the release mechanism 729 can release (e.g., decouple) the watch body 720 from the coupling mechanism 716 of the wearable band 710, allowing the user to use the watch body 720 independently from wearable band 710 and vice versa. For example, decoupling the watch body 720 from the wearable band 710 can allow the user to capture images using rear-facing camera 725*b*. Although the coupling mechanism 716 is shown positioned at a corner of watch body 720, the release mechanism 729 can be positioned anywhere on watch body 720 that is convenient for the user to actuate. In addition, in some embodiments, the wearable band 710 can also include a respective release mechanism for decoupling the watch body 720 from the coupling mechanism 716. In some embodiments, the release mechanism 729 is optional and the watch body 720 can be decoupled from the coupling mechanism 716, as described above (e.g., via twisting or rotating).

The watch body 720 can include one or more peripheral buttons 723 and 727 for performing various operations at the watch body 720. For example, the peripheral buttons 723 and 727 can be used to turn on or wake (e.g., transition from a sleep state to an active state) the display 705, unlock the watch body 720, increase or decrease volume, increase or decrease brightness, interact with one or more applications, interact with one or more user interfaces. Additionally, or alternatively, in some embodiments, the display 705 operates as a touch screen and allows the user to provide one or more inputs for interacting with the watch body 720.

In some embodiments, the watch body 720 includes one or more sensors 721. The sensors 721 of the watch body 720 can be the same or distinct from the sensors 713 of the wearable band 710. The sensors 721 of the watch body 720 can be distributed on an inside and/or an outside surface of the watch body 720. In some embodiments, the sensors 721 are configured to contact a user's skin when the watch body 720 is worn by the user. For example, the sensors 721 can be placed on the bottom side of the watch body 720 and the coupling mechanism 716 can be a cradle with an opening that allows the bottom side of the watch body 720 to directly contact the user's skin. Alternatively, in some embodiments, the watch body 720 does not include sensors that are configured to contact the user's skin (e.g., including sensors internal and/or external to the watch body 720 that are configured to sense data of the watch body 720 and the watch body 720's surrounding environment). In some embodiments, the sensors 713 are configured to track a position and/or motion of the watch body 720.

The watch body 720 and the wearable band 710 can share data using a wired communication method (e.g., a Universal Asynchronous Receiver/Transmitter (UART) or a USB transceiver) and/or a wireless communication method (e.g., near-field communication or Bluetooth). For example, the watch body 720 and the wearable band 710 can share data sensed by the sensors 713 and 721, as well as application- and device-specific information (e.g., active and/or available applications), output devices (e.g., display or speakers), and/or input devices (e.g., touch screens, microphones, or imaging sensors).

In some embodiments, the watch body 720 can include, without limitation, a front-facing camera 725a and/or a rear-facing camera 725b, sensors 721 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 7B; imaging sensor 763), a touch sensor, a sweat sensor). In some embodiments, the watch body 720 can include one or more haptic devices 776 (FIG. 7B; a vibratory haptic actuator) that is configured to provide haptic feedback (e.g., a cutaneous and/or kinesthetic sensation) to the user. The sensors 721 and/or the haptic device 776 can also be configured to operate in conjunction with multiple applications, including, without limitation, health-monitoring applications, social media applications, game applications, and AR applications (e.g., the applications associated with AR).

As described above, the watch body 720 and the wearable band 710, when coupled, can form the wrist-wearable device 700. When coupled, the watch body 720 and wearable band 710 operate as a single device to execute functions (e.g., operations, detections, or communications) described herein. In some embodiments, each device is provided with particular instructions for performing the one or more operations of the wrist-wearable device 700. For example, in accordance with a determination that the watch body 720 does not include neuromuscular-signal sensors, the wearable band 710 can include alternative instructions for performing associated instructions (e.g., providing sensed neuromuscular-signal data to the watch body 720 via a different electronic device). Operations of the wrist-wearable device 700 can be performed by the watch body 720 alone or in conjunction with the wearable band 710 (e.g., via respective processors and/or hardware components) and vice versa. In some embodiments, operations of the wrist-wearable device 700, the watch body 720, and/or the wearable band 710 can be performed in conjunction with one or more processors and/or hardware components of another communicatively coupled device (e.g., FIGS. 9A-9B; the HIPD 900).

As described below with reference to the block diagram of FIG. 7B, the wearable band 710 and/or the watch body 720 can each include independent resources required to independently execute functions. For example, the wearable band 710 and/or the watch body 720 can each include a power source (e.g., a battery), a memory, data storage, a processor (e.g., a CPU), communications, a light source, and/or input/output devices.

FIG. 7B shows block diagrams of a computing system 730 corresponding to the wearable band 710 and a computing system 760 corresponding to the watch body 720, according to some embodiments. A computing system of the wrist-wearable device 700 includes a combination of components of the wearable band computing system 730 and the watch body computing system 760, in accordance with some embodiments.

The watch body 720 and/or the wearable band 710 can include one or more components shown in watch body computing system 760. In some embodiments, a single integrated circuit includes all or a substantial portion of the components of the watch body computing system 760 that are included in a single integrated circuit. Alternatively, in some embodiments, components of the watch body computing system 760 are included in a plurality of integrated circuits that are communicatively coupled. In some embodiments, the watch body computing system 760 is configured to couple (e.g., via a wired or wireless connection) with the wearable band computing system 730, which allows the computing systems to share components, distribute tasks, and/or perform other operations described herein (individually or as a single device).

The watch body computing system 760 can include one or more processors 779, a controller 777, a peripherals interface 761, a power system 795, and memory (e.g., a memory 780), each of which are defined above and described in more detail below.

The power system 795 can include a charger input 796, a power-management integrated circuit (PMIC) 797, and a battery 798, each of which are defined above. In some embodiments, a watch body 720 and a wearable band 710 can have respective charger inputs (e.g., charger inputs 796 and 757), respective batteries (e.g., batteries 798 and 759), and can share power with each other (e.g., the watch body 720 can power and/or charge the wearable band 710 and vice versa). Although watch body 720 and/or the wearable band 710 can include respective charger inputs, a single charger input can charge both devices when coupled. The watch body 720 and the wearable band 710 can receive a charge using a variety of techniques. In some embodiments, the watch body 720 and the wearable band 710 can use a wired charging assembly (e.g., power cords) to receive the charge. Alternatively, or in addition, the watch body 720 and/or the wearable band 710 can be configured for wireless charging. For example, a portable charging device can be designed to mate with a portion of watch body 720 and/or wearable band 710 and wirelessly deliver usable power to a battery of watch body 720 and/or wearable band 710. The watch body 720 and the wearable band 710 can have independent power systems (e.g., power system 795 and 756) to enable each to operate independently. The watch body 720 and wearable band 710 can also share power (e.g., one can charge the other) via respective PMICs (e.g., PMICs 797 and 758) that can share power over power and ground conductors and/or over wireless charging antennas.

In some embodiments, the peripherals interface 761 can include one or more sensors 721, many of which listed below are defined above. The sensors 721 can include one or more coupling sensors 762 for detecting when the watch body 720 is coupled with another electronic device (e.g., a wearable band 710). The sensors 721 can include imaging sensors 763 (one or more of the cameras 725 and/or separate imaging sensors 763 (e.g., thermal-imaging sensors)). In some embodiments, the sensors 721 include one or more SpO2 sensors 764. In some embodiments, the sensors 721 include one or more biopotential-signal sensors (e.g., EMG sensors 765, which may be disposed on a user-facing portion of the watch body 720 and/or the wearable band 710). In some embodiments, the sensors 721 include one or more capacitive sensors 766. In some embodiments, the sensors 721 include one or more heart rate sensors 767. In some embodiments, the sensors 721 include one or more IMUs 768. In some embodiments, one or more IMUs 768 can be configured to detect movement of a user's hand or other location that the watch body 720 is placed or held.

In some embodiments, the peripherals interface 761 includes an NFC component 769, a GPS component 770, a long-term evolution (LTE) component 771, and/or a Wi-Fi and/or Bluetooth communication component 772. In some embodiments, the peripherals interface 761 includes one or more buttons 773 (e.g., the peripheral buttons 723 and 727 in FIG. 7A), which, when selected by a user, cause operations to be performed at the watch body 720. In some embodiments, the peripherals interface 761 includes one or more indicators, such as a light-emitting diode (LED), to provide a user with visual indicators (e.g., message received, low battery, an active microphone, and/or a camera).

The watch body 720 can include at least one display 705 for displaying visual representations of information or data to the user, including user-interface elements and/or three-dimensional (3D) virtual objects. The display can also include a touch screen for inputting user inputs, such as touch gestures, swipe gestures, and the like. The watch body 720 can include at least one speaker 774 and at least one microphone 775 for providing audio signals to the user and receiving audio input from the user. The user can provide user inputs through the microphone 775 and can also receive audio output from the speaker 774 as part of a haptic event provided by the haptic controller 778. The watch body 720 can include at least one camera 725, including a front-facing camera 725a and a rear-facing camera 725b. The cameras 725 can include ultra-wide-angle cameras, wide-angle cameras, fish-eye cameras, spherical cameras, telephoto cameras, depth-sensing cameras, or other types of cameras.

The watch body computing system 760 can include one or more haptic controllers 778 and associated componentry (e.g., haptic devices 776) for providing haptic events at the watch body 720 (e.g., a vibrating sensation or audio output in response to an event at the watch body 720). The haptic controllers 778 can communicate with one or more haptic devices 776, such as electroacoustic devices, including a speaker of the one or more speakers 774 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 778 can provide haptic events to respective haptic actuators that are capable of being sensed by a user of the watch body 720. In some embodiments, the one or more haptic controllers 778 can receive input signals from an application of the applications 782.

In some embodiments, the computer system 730 and/or the computer system 760 can include memory 780, which can be controlled by a memory controller of the one or more controllers 777 and/or one or more processors 779. In some embodiments, software components stored in the memory 780 include one or more applications 782 configured to perform operations at the watch body 720. In some embodiments, the one or more applications 782 include games, word processors, messaging applications, calling applications, web browsers, social media applications, media streaming applications, financial applications, calendars, clocks, etc. In some embodiments, software components stored in the memory 780 include one or more communication interface modules 783 as defined above. In some embodiments, software components stored in the memory

780 include one or more graphics modules 784 for rendering, encoding, and/or decoding audio and/or visual data; and one or more data management modules 785 for collecting, organizing, and/or providing access to the data 787 stored in memory 780. In some embodiments, one or more of applications 782 and/or one or more modules can work in conjunction with one another to perform various tasks at the watch body 720.

In some embodiments, software components stored in the memory 780 can include one or more operating systems 781 (e.g., a Linux-based operating system, an Android operating system, etc.). The memory 780 can also include data 787. The data 787 can include profile data 788A, sensor data 789A, media content data 790, and/or application data 791.

It should be appreciated that the watch body computing system 760 is an example of a computing system within the watch body 720, and that the watch body 720 can have more or fewer components than shown in the watch body computing system 760, combine two or more components, and/or have a different configuration and/or arrangement of the components. The various components shown in watch body computing system 760 are implemented in hardware, software, firmware, or a combination thereof, including one or more signal processing and/or application-specific integrated circuits.

Turning to the wearable band computing system 730, one or more components that can be included in the wearable band 710 are shown. The wearable band computing system 730 can include more or fewer components than shown in the watch body computing system 760, combine two or more components, and/or have a different configuration and/or arrangement of some or all of the components. In some embodiments, all, or a substantial portion of the components of the wearable band computing system 730 are included in a single integrated circuit. Alternatively, in some embodiments, components of the wearable band computing system 730 are included in a plurality of integrated circuits that are communicatively coupled. As described above, in some embodiments, the wearable band computing system 730 is configured to couple (e.g., via a wired or wireless connection) with the watch body computing system 760, which allows the computing systems to share components, distribute tasks, and/or perform other operations described herein (individually or as a single device).

The wearable band computing system 730, similar to the watch body computing system 760, can include one or more processors 749, one or more controllers 747 (including one or more haptics controller 748), a peripherals interface 731 that can include one or more sensors 713 and other peripheral devices, power source (e.g., a power system 756), and memory (e.g., a memory 750) that includes an operating system (e.g., an operating system 751), data (e.g., data 754 including profile data 788B, sensor data 789B, etc.), and one or more modules (e.g., a communications interface module 752, a data management module 753, etc.).

The one or more sensors 713 can be analogous to sensors 721 of the computer system 760 in light of the definitions above. For example, sensors 713 can include one or more coupling sensors 732, one or more SpO2 sensors 734, one or more EMG sensors 735, one or more capacitive sensors 736, one or more heart rate sensors 737, and one or more IMU sensors 738.

The peripherals interface 731 can also include other components analogous to those included in the peripheral interface 761 of the computer system 760, including an NFC component 739, a GPS component 740, an LTE component 741, a Wi-Fi and/or Bluetooth communication component 742, and/or one or more haptic devices 776 as described above in reference to peripherals interface 761. In some embodiments, the peripherals interface 731 includes one or more buttons 743, a display 733, a speaker 744, a microphone 745, and a camera 755. In some embodiments, the peripherals interface 731 includes one or more indicators, such as an LED.

It should be appreciated that the wearable band computing system 730 is an example of a computing system within the wearable band 710, and that the wearable band 710 can have more or fewer components than shown in the wearable band computing system 730, combine two or more components, and/or have a different configuration and/or arrangement of the components. The various components shown in wearable band computing system 730 can be implemented in one or a combination of hardware, software, and firmware, including one or more signal processing and/or application-specific integrated circuits.

The wrist-wearable device 700 with respect to FIG. 7A is an example of the wearable band 710 and the watch body 720 coupled, so the wrist-wearable device 700 will be understood to include the components shown and described for the wearable band computing system 730 and the watch body computing system 760. In some embodiments, wrist-wearable device 700 has a split architecture (e.g., a split mechanical architecture or a split electrical architecture) between the watch body 720 and the wearable band 710. In other words, all of the components shown in the wearable band computing system 730 and the watch body computing system 760 can be housed or otherwise disposed in a combined watch device 700, or within individual components of the watch body 720, wearable band 710, and/or portions thereof (e.g., a coupling mechanism 716 of the wearable band 710).

The techniques described above can be used with any device for sensing neuromuscular signals, including the arm-wearable devices of FIG. 7A-7B, but could also be used with other types of wearable devices for sensing neuromuscular signals (such as body-wearable or head-wearable devices that might have neuromuscular sensors closer to the brain or spinal column).

In some embodiments, a wrist-wearable device 700 can be used in conjunction with a head-wearable device described below (e.g., AR device 800 and VR device 810) and/or an HIPD 900, and the wrist-wearable device 700 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 700 can also be used in conjunction with a wearable garment, such as smart textile-based garment 1000 described below in reference to FIGS. 10A-10C. Having thus described example wrist-wearable device, attention will now be turned to example head-wearable devices, such AR device 800 and VR device 810.

Example Head-Wearable Devices

FIGS. 8A, 8B-1, 8B-2, and 8C show example head-wearable devices, in accordance with some embodiments. Head-wearable devices can include, but are not limited to, AR devices 800 (e.g., AR or smart eyewear devices, such as smart glasses, smart monocles, smart contacts, etc.), VR devices 810 (e.g., VR headsets or head-mounted displays (HMDs)), or other ocularly coupled devices. The AR devices 800 and the VR devices 810 are instances of the virtual-reality headset 650 described in reference to FIGS.

1A and 1B herein, such that the head-wearable device should be understood to have the features of the AR devices 800 and/or the VR devices 810 and vice versa. The AR devices 800 and the VR devices 810 can perform various functions and/or operations associated with navigating through user interfaces and selectively opening applications, as well as the functions and/or operations described above with reference to FIGS. 1A to 5.

Figure 8A:
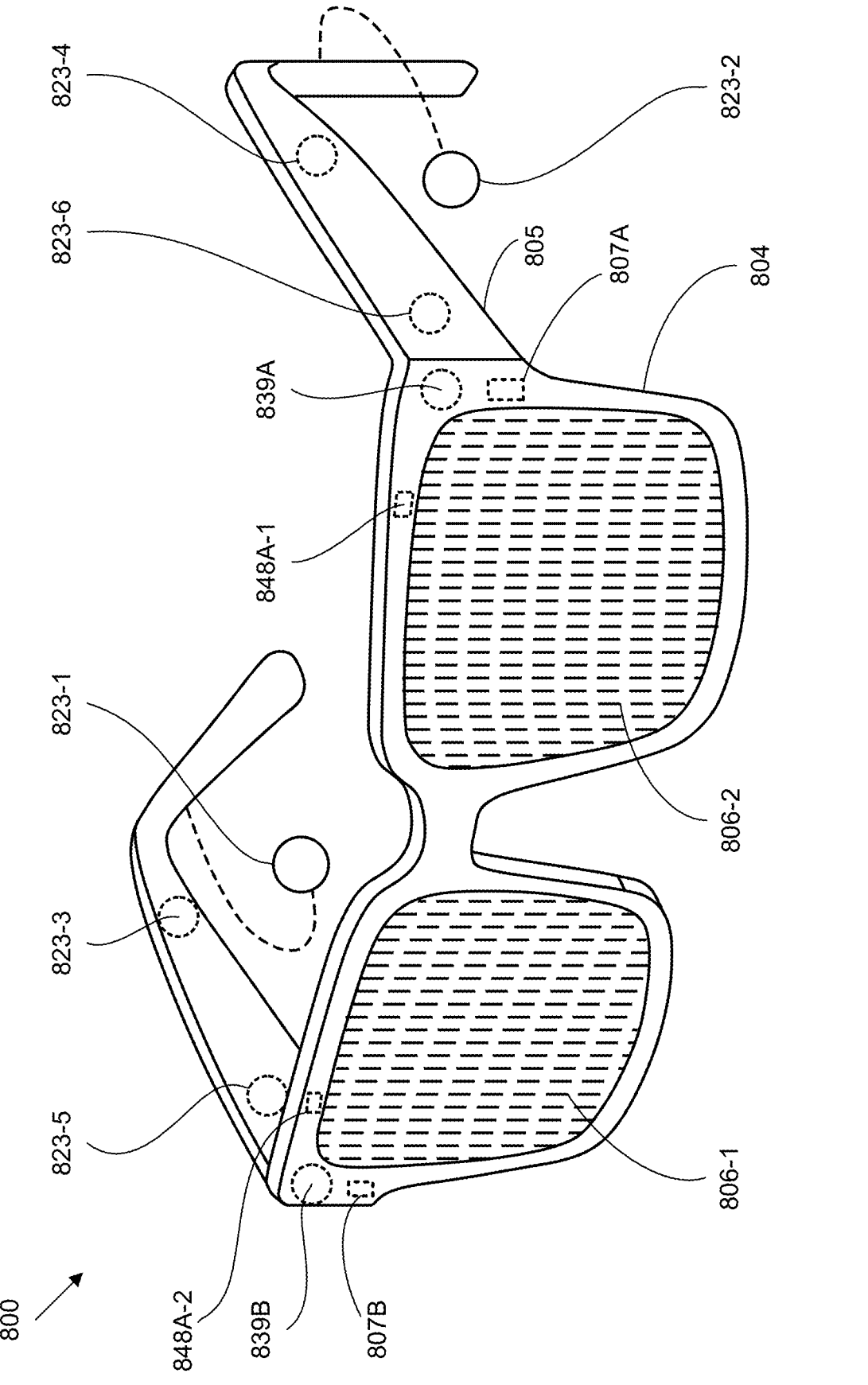
Figures 1, 8B:
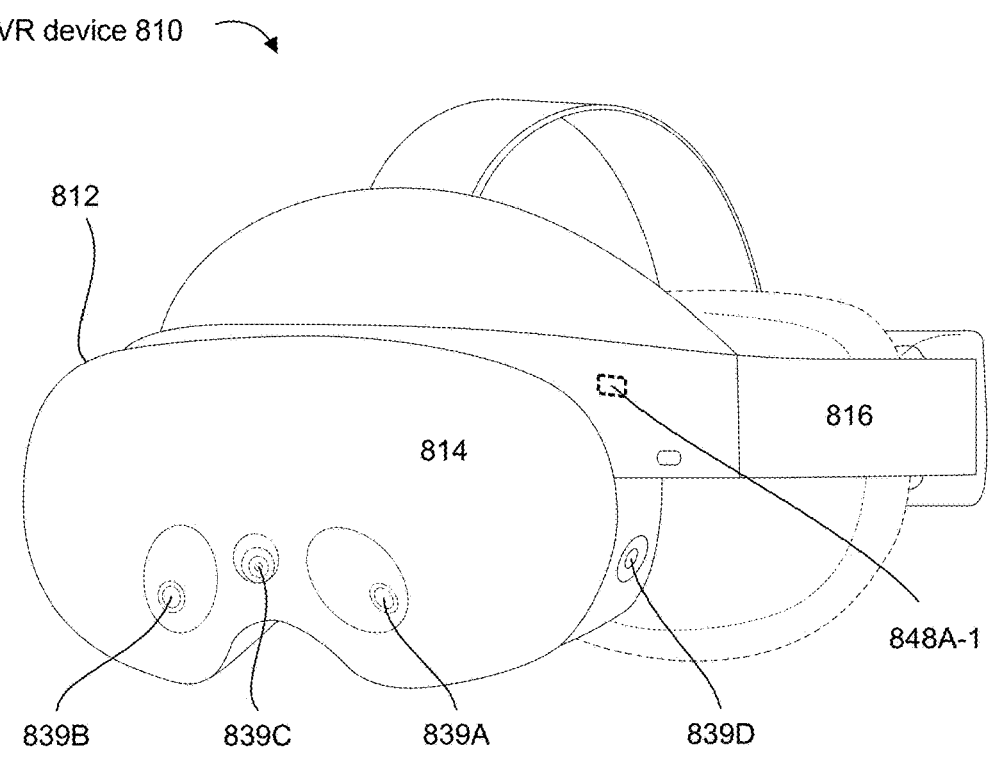
Figures 2, 8B:
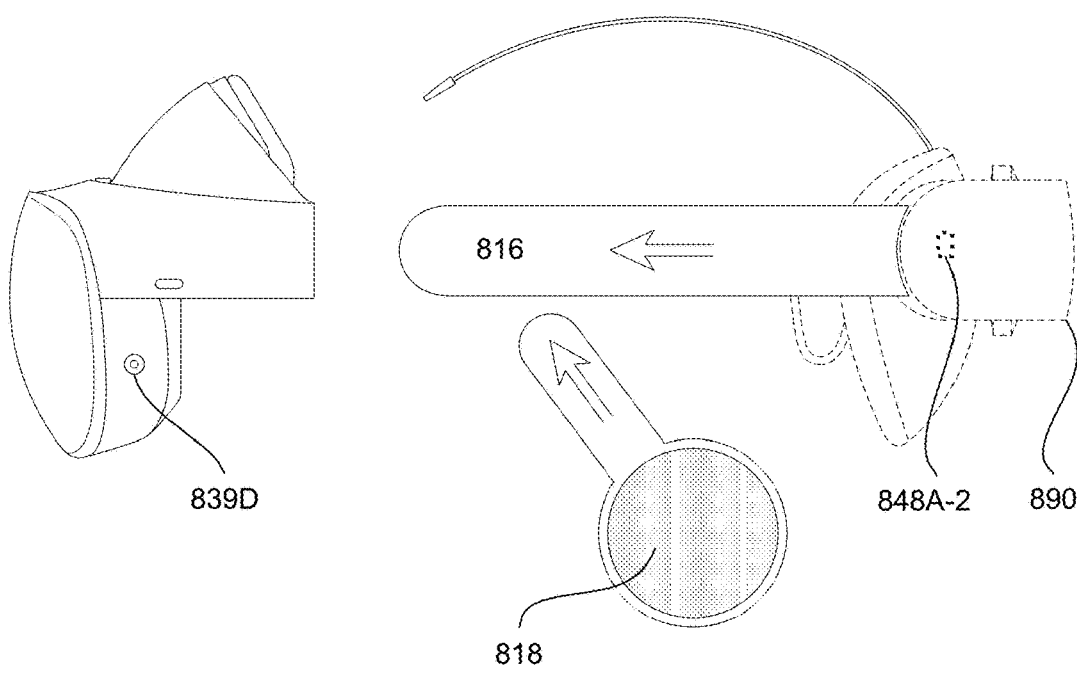

In some embodiments, an AR system (e.g., FIGS. 6A-6D-2; AR systems 600a-600d) includes an AR device 800 (as shown in FIG. 8A) and/or VR device 810 (as shown in FIGS. 8B-1-B-2). In some embodiments, the AR device 800 and the VR device 810 can include one or more analogous components (e.g., components for presenting interactive AR environments, such as processors, memory, and/or presentation devices, including one or more displays and/or one or more waveguides), some of which are described in more detail with respect to FIG. 8C. The head-wearable devices can use display projectors (e.g., display projector assemblies 807A and 807B) and/or waveguides for projecting representations of data to a user. Some embodiments of head-wearable devices do not include displays.

FIG. 8A shows an example visual depiction of the AR device 800 (e.g., which may also be described herein as augmented-reality glasses and/or smart glasses). The AR device 800 can work in conjunction with additional electronic components that are not shown in FIGS. 8A, such as a wearable accessory device and/or an intermediary processing device, in electronic communication or otherwise configured to be used in conjunction with the AR device 800. In some embodiments, the wearable accessory device and/or the intermediary processing device may be configured to couple with the AR device 800 via a coupling mechanism in electronic communication with a coupling sensor 824, where the coupling sensor 824 can detect when an electronic device becomes physically or electronically coupled with the AR device 800. In some embodiments, the AR device 800 can be configured to couple to a housing (e.g., a portion of frame 804 or temple arms 805), which may include one or more additional coupling mechanisms configured to couple with additional accessory devices. The components shown in FIG. 8A can be implemented in hardware, software, firmware, or a combination thereof, including one or more signal-processing components and/or application-specific integrated circuits (ASICs).

The AR device 800 includes mechanical glasses components, including a frame 804 configured to hold one or more lenses (e.g., one or both lenses 806-1 and 806-2). One of ordinary skill in the art will appreciate that the AR device 800 can include additional mechanical components, such as hinges configured to allow portions of the frame 804 of the AR device 800 to be folded and unfolded, a bridge configured to span the gap between the lenses 806-1 and 806-2 and rest on the user's nose, nose pads configured to rest on the bridge of the nose and provide support for the AR device 800, earpieces configured to rest on the user's ears and provide additional support for the AR device 800, temple arms 805 configured to extend from the hinges to the earpieces of the AR device 800, and the like. One of ordinary skill in the art will further appreciate that some examples of the AR device 800 can include none of the mechanical components described herein. For example, smart contact lenses configured to present AR to users may not include any components of the AR device 800.

The lenses 806-1 and 806-2 can be individual displays or display devices (e.g., a waveguide for projected representations). The lenses 806-1 and 806-2 may act together or independently to present an image or series of images to a user. In some embodiments, the lenses 806-1 and 806-2 can operate in conjunction with one or more display projector assemblies 807A and 807B to present image data to a user. While the AR device 800 includes two displays, embodiments of this disclosure may be implemented in AR devices with a single near-eye display (NED) or more than two NEDs.

The AR device 800 includes electronic components, many of which will be described in more detail below with respect to FIG. 8C. Some example electronic components are illustrated in FIG. 8A, including sensors 823-1, 823-2, 823-3, 823-4, 823-5, and 823-6, which can be distributed along a substantial portion of the frame 804 of the AR device 800. The different types of sensors are described below in reference to FIG. 8C. The AR device 800 also includes a left camera 839A and a right camera 839B, which are located on different sides of the frame 804. And the eyewear device includes one or more processors 848A and 848B (e.g., an integral microprocessor, such as an ASIC) that is embedded into a portion of the frame 804.

FIGS. 8B-1 and 8B-2 show an example visual depiction of the VR device 810 (e.g., a head-mounted display (HMD) 812, also referred to herein as an AR headset, a head-wearable device, or a VR headset). The HMD 812 includes a front body 814 and a frame 816 (e.g., a strap or band) shaped to fit around a user's head. In some embodiments, the front body 814 and/or the frame 816 includes one or more electronic elements for facilitating presentation of and/or interactions with an AR and/or VR system (e.g., displays, processors (e.g., processor 848A-1), IMUs, tracking emitters or detectors, or sensors). In some embodiments, the HMD 812 includes output audio transducers (e.g., an audio transducer 818-1), as shown in FIG. 8B-2. In some embodiments, one or more components, such as the output audio transducer(s) 818 and the frame 816, can be configured to attach and detach (e.g., are detachably attachable) to the HMD 812 (e.g., a portion or all of the frame 816 and/or the output audio transducer 818), as shown in FIG. 8B-2. In some embodiments, coupling a detachable component to the HMD 812 causes the detachable component to come into electronic communication with the HMD 812. The VR device 810 includes electronic components, many of which will be described in more detail below with respect to FIG. 8C.

FIGS. 8B-1 and 8B-2 also show that the VR device 810 having one or more cameras, such as the left camera 839A and the right camera 839B, which can be analogous to the left and right cameras on the frame 804 of the AR device 800. In some embodiments, the VR device 810 includes one or more additional cameras (e.g., cameras 839C and 839D), which can be configured to augment image data obtained by the cameras 839A and 839B by providing more information. For example, the camera 839C can be used to supply color information that is not discerned by cameras 839A and 839B. In some embodiments, one or more of the cameras 839A to 839D can include an optional IR cut filter configured to remove IR light from being received at the respective camera sensors.

The VR device 810 can include a housing 890 storing one or more components of the VR device 810 and/or additional components of the VR device 810. The housing 890 can be a modular electronic device configured to couple with the VR device 810 (or an AR device 800) and supplement and/or extend the capabilities of the VR device 810 (or an AR device 800). For example, the housing 890 can include additional sensors, cameras, power sources, and processors (e.g., processor 848A-2). to improve and/or increase the functionality of the VR device 810. Examples of the different components included in the housing 890 are described below in reference to FIG. 8C.

Alternatively, or in addition, in some embodiments, the head-wearable device, such as the VR device 810 and/or the AR device 800, includes, or is communicatively coupled to, another external device (e.g., a paired device), such as an HIPD 9 (discussed below in reference to FIGS. 9A-9B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 900, an optional neckband, and/or a wearable accessory device) with the head-wearable devices (e.g., an AR device 800 and/or a VR device 810) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 900) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 900, can process information generated by one or more of its sensors and/or information provided by other communicatively coupled devices. For example, a head-wearable device can include an IMU, and the intermediary processing device (a neckband and/or an HIPD 900) can compute all inertial and spatial calculations from the IMUs located on the head-wearable device. Additional examples of processing performed by a communicatively coupled device, such as the HIPD 900, are provided below in reference to FIGS. 9A and 9B.

AR systems may include a variety of types of visual feedback mechanisms. For example, display devices in the AR devices 800 and/or the VR devices 810 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 800 and/or the VR device 810 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 800 and the VR device 810, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 800 and/or the VR device 810 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 700, an HIPD 900, smart textile-based garment 1000), and/or other devices described herein.

Figure 8C:
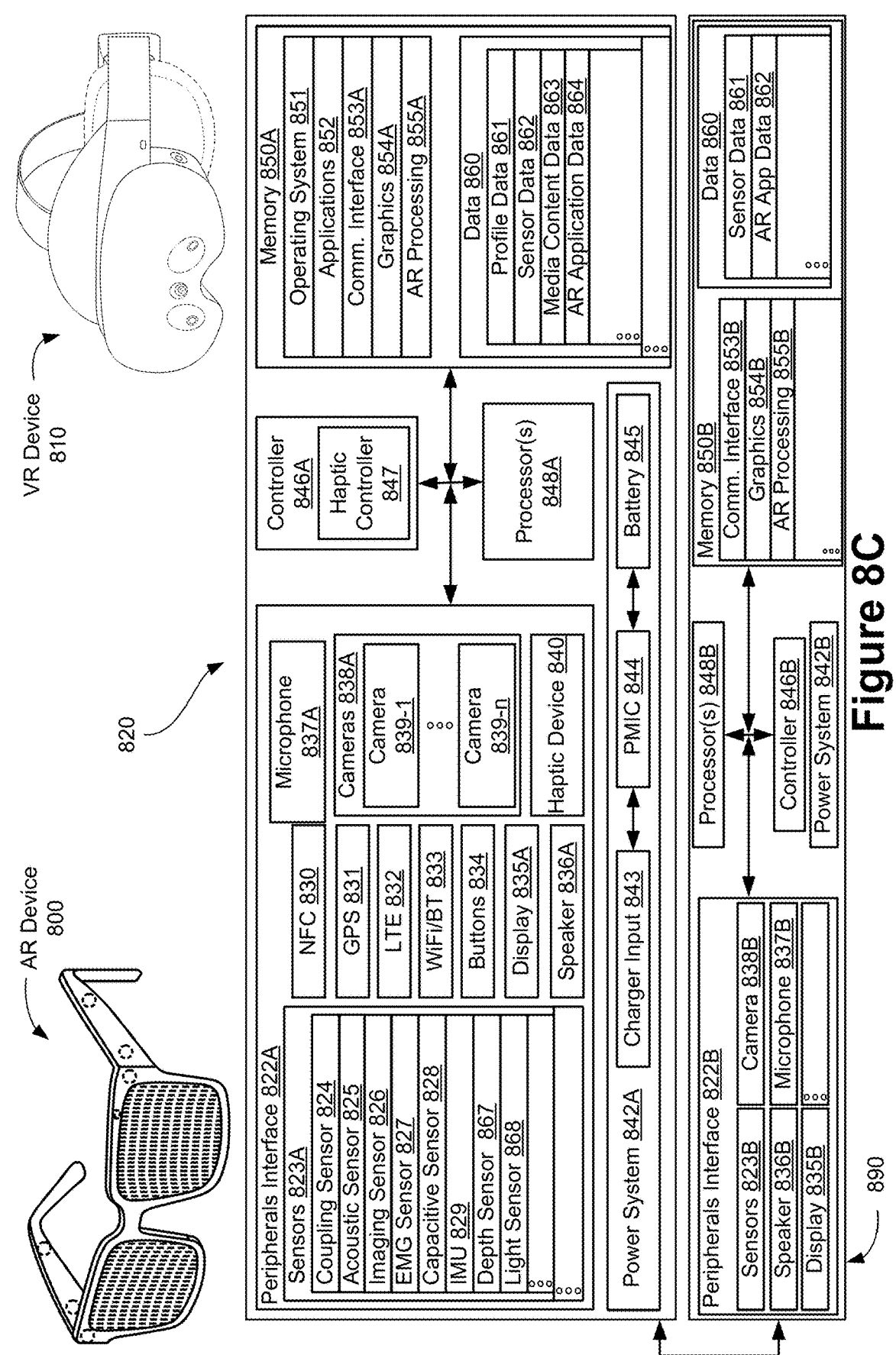

FIG. 8C illustrates a computing system 820 and an optional housing 890, each of which shows components that can be included in a head-wearable device (e.g., the AR device 800 and/or the VR device 810). In some embodiments, more or fewer components can be included in the optional housing 890 depending on practical restraints of the respective head-wearable device being described. Additionally or alternatively, the optional housing 890 can include additional components to expand and/or augment the functionality of a head-wearable device.

In some embodiments, the computing system 820 and/or the optional housing 890 can include one or more peripheral interfaces 822A and 822B, one or more power systems 842A and 842B (including charger input 843, PMIC 844, and battery 845), one or more controllers 846A and 846B (including one or more haptic controllers 847), one or more processors 848A and 848B (as defined above, including any of the examples provided), and memory 850A and 850B, which can all be in electronic communication with each other. For example, the one or more processors 848A and/or 848B can be configured to execute instructions stored in the memory 850A and/or 850B, which can cause a controller of the one or more controllers 846A and/or 846B to cause operations to be performed at one or more peripheral devices of the peripherals interfaces 822A and/or 822B. In some embodiments, each operation described can occur based on electrical power provided by the power system 842A and/or 842B.

In some embodiments, the peripherals interface 822A can include one or more devices configured to be part of the computing system 820, many of which have been defined above and/or described with respect to wrist-wearable devices shown in FIGS. 7A and 7B. For example, the peripherals interface can include one or more sensors 823A. Some example sensors include one or more coupling sensors 824, one or more acoustic sensors 825, one or more imaging sensors 826, one or more EMG sensors 827, one or more capacitive sensors 828, and/or one or more IMUs 829. In some embodiments, the sensors 823A further include depth sensors 867, light sensors 868, and/or any other types of sensors defined above or described with respect to any other embodiments discussed herein.

In some embodiments, the peripherals interface can include one or more additional peripheral devices, including one or more NFC devices 830, one or more GPS devices 831, one or more LTE devices 832, one or more Wi-Fi and/or Bluetooth devices 833, one or more buttons 834 (e.g., including buttons that are slidable or otherwise adjustable), one or more displays 835A, one or more speakers 836A, one or more microphones 837A, one or more cameras 838A (e.g., including the first camera 839-1 through nth camera 839-n, which are analogous to the left camera 839A and/or the right camera 839B), one or more haptic devices 840, and/or any other types of peripheral devices defined above or described with respect to any other embodiments discussed herein.

The head-wearable devices can include a variety of types of visual feedback mechanisms (e.g., presentation devices). For example, display devices in the AR device 800 and/or the VR device 810 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 835A can be coupled to each of the lenses 806-1 and 806-2 of the AR device 800. The displays 835A coupled to each of the lenses 806-1 and 806-2 can act together or independently to present an image or series of images to a user. In some embodiments, the AR device 800 and/or the VR device 810 includes a single display 835A (e.g., a near-eye display) or more than two displays 835A.

In some embodiments, a first set of one or more displays 835A can be used to present an augmented-reality environment, and a second set of one or more display devices 835A can be used to present a VR environment. In some embodiments, one or more waveguides are used in conjunction with presenting AR content to the user of the AR device 800 and/or the VR device 810 (e.g., as a means of delivering light from a display projector assembly and/or one or more displays 835A to the user's eyes). In some embodiments, one or more waveguides are fully or partially integrated into the AR device 800 and/or the VR device 810. Additionally, or alternatively, to display screens, some AR systems include one or more projection systems. For example, display devices in the AR device 800 and/or the VR device 810 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 835A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 835A for presenting information to users. For example, an external display 835A can be used to show a current battery level, network activity (e.g., connected, disconnected), current activity (e.g., playing a game, in a call, in a meeting, or watching a movie), and/or other relevant information. In some embodiments, the external displays 835A can be used to communicate with others. For example, a user of the head-wearable device can cause the external displays 835A to present a "do not disturb" notification. The external displays 835A can also be used by the user to share any information captured by the one or more components of the peripherals interface 822A and/or generated by the head-wearable device (e.g., during operation and/or performance of one or more applications).

The memory 850A can include instructions and/or data executable by one or more processors 848A (and/or processors 848B of the housing 890) and/or a memory controller of the one or more controllers 846A (and/or controller 846B of the housing 890). The memory 850A can include one or more operating systems 851, one or more applications 852, one or more communication interface modules 853A, one or more graphics modules 854A, one or more AR processing modules 855A, and/or any other types of modules or components defined above or described with respect to any other embodiments discussed herein.

The data 860 stored in memory 850A can be used in conjunction with one or more of the applications and/or programs discussed above. The data 860 can include profile data 861, sensor data 862, media content data 863, AR application data 864, and/or any other types of data defined above or described with respect to any other embodiments discussed herein.

In some embodiments, the controller 846A of the head-wearable devices processes information generated by the sensors 823A on the head-wearable devices and/or another component of the head-wearable devices and/or communicatively coupled with the head-wearable devices (e.g., components of the housing 890, such as components of peripherals interface 822B). For example, the controller 846A can process information from the acoustic sensors 825 and/or image sensors 826. For each detected sound, the controller 846A can perform a direction of arrival (DOA) estimation to estimate a direction from which the detected sound arrived at a head-wearable device. As one or more of the acoustic sensors 825 detect sounds, the controller 846A can populate an audio data set with the information (e.g., represented by sensor data 862).

In some embodiments, a physical electronic connector can convey information between the head-wearable devices and another electronic device, and/or between one or more processors 848A of the head-wearable devices and the controller 846A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 900) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 800 and/or the VR device 810 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 8B-1 and 8B-2 show the VR device 810 having cameras 839A-839D, which can be used to provide depth information for creating a voxel field and a 2D mesh to provide object information to the user to avoid collisions.

The optional housing 890 can include analogous components to those describe above with respect to the computing system 820. For example, the optional housing 890 can include a respective peripherals interface 822B, including more or fewer components to those described above with respect to the peripherals interface 822A. As described above, the components of the optional housing 890 can be used to augment and/or expand on the functionality of the head-wearable devices. For example, the optional housing 890 can include respective sensors 823B, speakers 836B, displays 835B, microphones 837B, cameras 838B, and/or other components to capture and/or present data. Similarly, the optional housing 890 can include one or more processors 848B, controllers 846B, and/or memory 850B (including respective communication interface modules 853B, one or more graphics modules 854B, one or more AR processing modules 855B) that can be used individually and/or in conjunction with the components of the computing system 820.

The techniques described above in FIGS. 8A-8C can be used with different head-wearable devices. In some embodiments, the head-wearable devices (e.g., the AR device 800 and/or the VR device 810) can be used in conjunction with one or more wearable devices such as a wrist-wearable device 700 (or components thereof) and/or a smart textile-based garment 1000 (FIGS. 10A-10C), as well as an HIPD 900. Having thus described example the head-wearable devices, attention will now be turned to example handheld intermediary processing devices, such as HIPD 900.

Example Handheld Intermediary Processing Devices

Figure 9A:
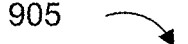
FIGS. 9A-9B illustrate an example handheld intermediary processing device, in accordance with some embodiments.
Figure 9A:
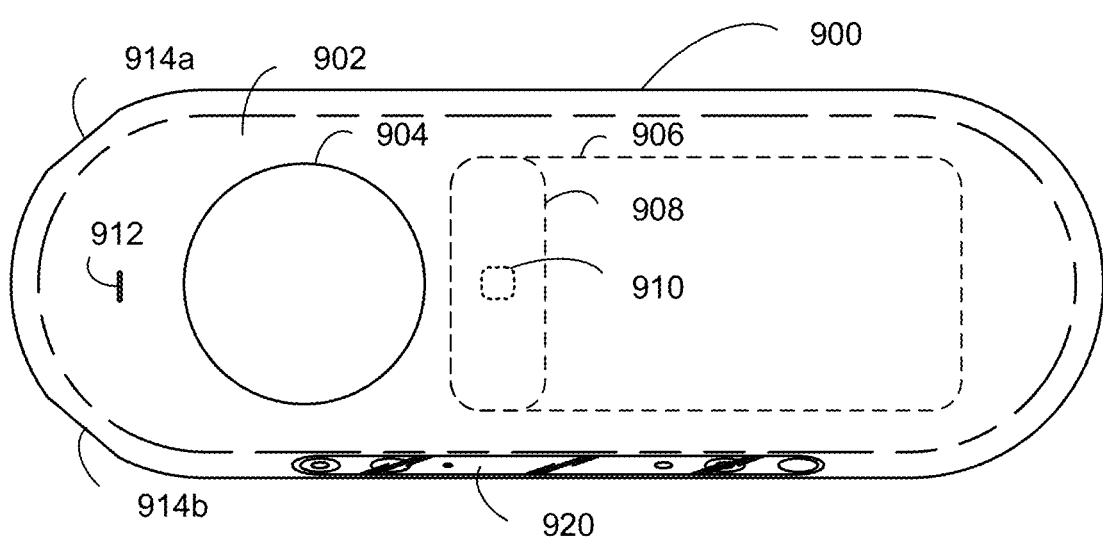
Figure 9A:
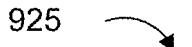
Figure 9A:
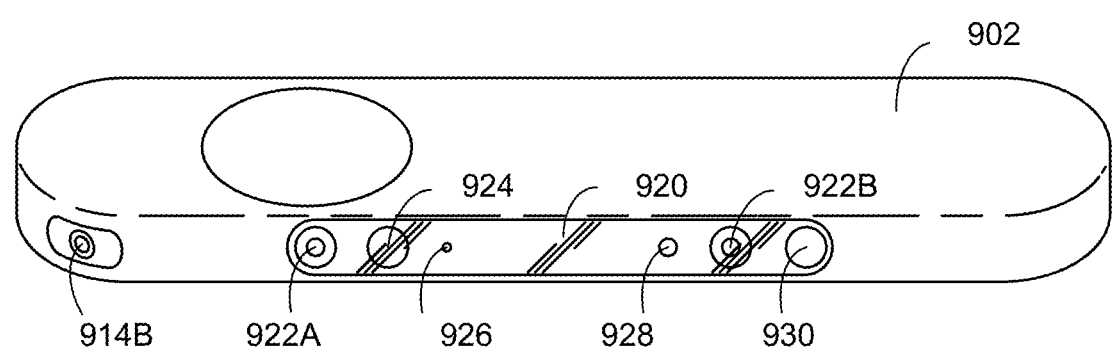
Figure 9B:
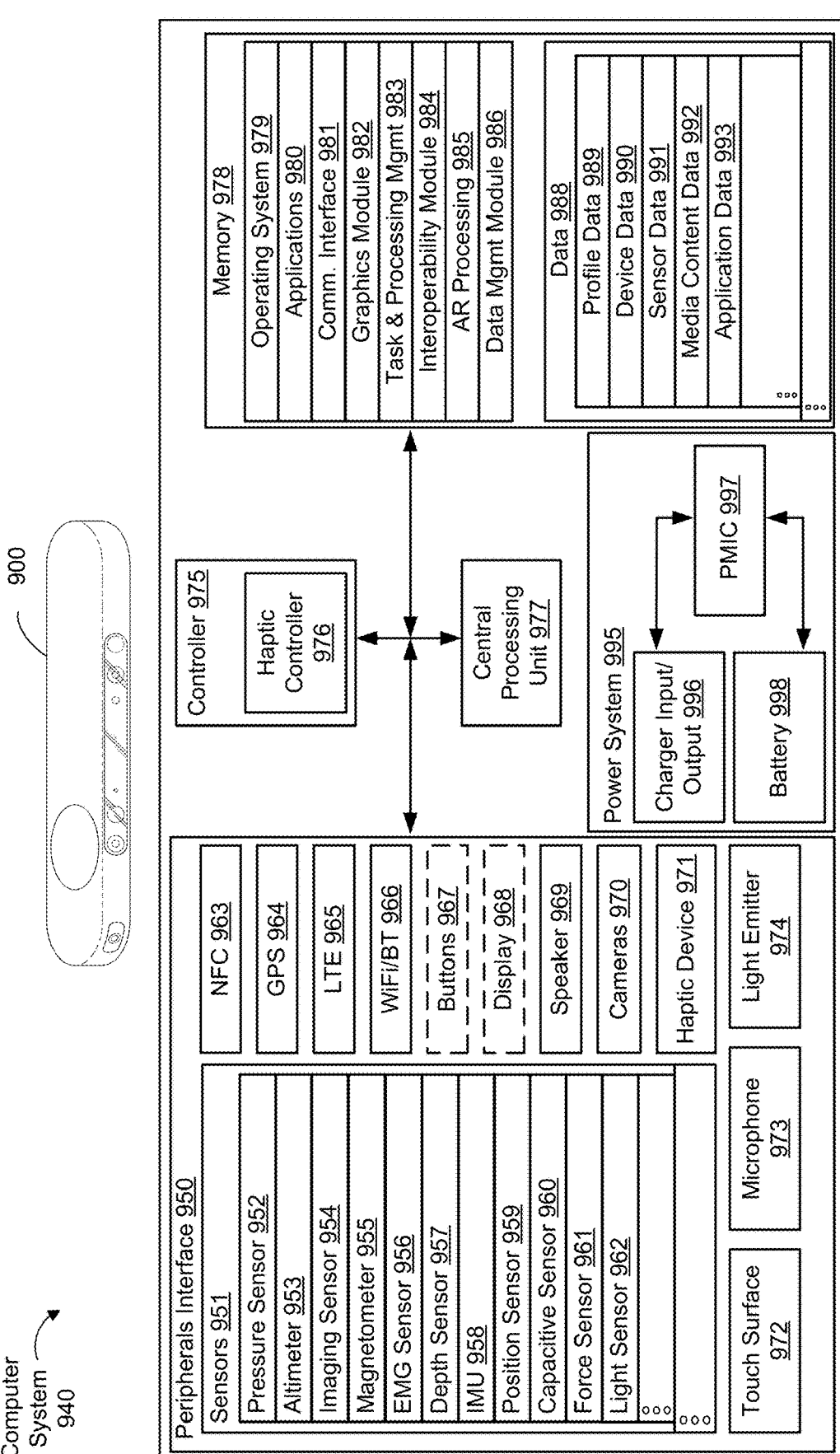

FIGS. 9A and 9B illustrate an example handheld intermediary processing device (HIPD) 900, in accordance with some embodiments. The HIPD 900 can perform various functions and/or operations associated with navigating through user interfaces and selectively opening applications, as well as the functions and/or operations described above with reference to FIGS. 1A to 5. In some embodiments, tracking is performed by the HIPD 900 in a similar manner as described previously with respect to the handheld controller 300 (e.g., the HIPD 900 includes one or more light sources and is tracked via the headset 650).

FIG. 9A shows a top view 905 and a side view 925 of the HIPD 900. The HIPD 900 is configured to communicatively couple with one or more wearable devices (or other electronic devices) associated with a user. For example, the HIPD 900 is configured to communicatively couple with a user's wrist-wearable device 700 (or components thereof, such as the watch body 720 and the wearable band 710), AR device 800, and/or VR device 810. The HIPD 900 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 900 can successfully be communicatively coupled with an electronic device, such as a wearable device).

The HIPD 900 can perform various functions independently and/or in conjunction with one or more wearable devices (e.g., wrist-wearable device 700, AR device 800, and/or VR device 810). The HIPD 900 is configured to increase and/or improve the functionality of communicatively coupled devices, such as the wearable devices. The HIPD 900 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to FIGS. 1A to 5. Additionally, as will be described in more detail below, functionality and/or operations of the HIPD 900 can include, without limitation, task offloading and/or handoffs, thermals offloading and/or handoffs, 6 degrees of freedom (6DoF) raycasting and/or gaming (e.g., using imaging devices or cameras 914A and 914B, which can be used for simultaneous localization and mapping (SLAM), and/or with other image processing techniques), portable charging; messaging, image capturing via one or more imaging devices or cameras (e.g., cameras 922A and 922B), sensing user input (e.g., sensing a touch on a multitouch input surface 902), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 900 and/or in communication between the HIPD 900 and another wearable device described herein. In some embodiments, functions can be executed on the HIPD 900 in conjunction with an AR environment. As the skilled artisan will appreciate upon reading the descriptions provided herein, the novel HIPD 900 described herein can be used with any type of suitable AR environment.

While the HIPD 900 is communicatively coupled with a wearable device and/or other electronic device, the HIPD 900 is configured to perform one or more operations initiated at the wearable device and/or the other electronic device. In particular, one or more operations of the wearable device and/or the other electronic device can be offloaded to the HIPD 900 to be performed. The HIPD 900 performs one or more operations of the wearable device and/or the other electronic device and provides data corresponding to the completed operations to the wearable device and/or the other electronic device. For example, a user can initiate a video stream using the AR device 800 and back-end tasks associated with performing the video stream (e.g., video rendering) can be offloaded to the HIPD 900, which the HIPD 900 performs and provides corresponding data to the AR device 800 to perform remaining front-end tasks associated with the video stream (e.g., presenting the rendered video data via a display of the AR device 800). In this way, the HIPD 900, which has more computational resources and greater thermal headroom than a wearable device can perform computationally intensive tasks for the wearable device, improving performance of an operation performed by the wearable device.

The HIPD 900 includes a multi-touch input surface 902 on a first side (e.g., a front surface) that is configured to detect one or more user inputs. In particular, the multi-touch input surface 902 can detect single-tap inputs, multi-tap inputs, swipe gestures and/or inputs, force-based and/or pressure-based touch inputs, held taps, and the like. The multi-touch input surface 902 is configured to detect capacitive touch inputs and/or force (and/or pressure) touch inputs. The multi-touch input surface 902 includes a first touch-input surface 904 defined by a surface depression, and a second touch-input surface 906 defined by a substantially planar portion. The first touch-input surface 904 can be disposed adjacent to the second touch-input surface 906. In some embodiments, the first touch-input surface 904 and the second touch-input surface 906 can be different dimensions, shapes, and/or cover different portions of the multi-touch input surface 902. For example, the first touch-input surface 904 can be substantially circular and the second touch-input surface 906 is substantially rectangular. In some embodiments, the surface depression of the multi-touch input surface 902 is configured to guide user handling of the HIPD 900. In particular, the surface depression is configured such that the user holds the HIPD 900 upright when held in a single hand (e.g., such that the using imaging devices or cameras 914A and 914B are pointed toward a ceiling or the sky). Additionally, the surface depression is configured such that the user's thumb rests within the first touch-input surface 904.

In some embodiments, the different touch-input surfaces include a plurality of touch-input zones. For example, the second touch-input surface 906 includes at least a first touch-input zone 908 within a second touch-input zone 906 and a third touch-input zone 910 within the first touch-input zone 908. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 908 causes the HIPD 900 to perform a first command and a user input detected within the second touch-input zone 906 causes the HIPD 900 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 908 can be configured to detect force touch inputs (e.g., a magnitude at which the user presses down) and capacitive touch inputs, and the second touch-input zone 906 can be configured to detect capacitive touch inputs.

The HIPD 900 includes one or more sensors 951 for sensing data used in the performance of one or more operations and/or functions. For example, the HIPD 900 can include an IMU that is used in conjunction with cameras 914 for 3-dimensional object manipulation (e.g., enlarging, moving, destroying, etc. an object) in an AR or VR environment. Non-limiting examples of the sensors 951 included in the HIPD 900 include a light sensor, a magnetometer, a depth sensor, a pressure sensor, and a force sensor. Additional examples of the sensors 951 are provided below in reference to FIG. 9B.

The HIPD 900 can include one or more light indicators 912 to provide one or more notifications to the user. In some embodiments, the light indicators are LEDs or other types of illumination devices. The light indicators 912 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 904. The light indicators can be illuminated in different colors and/or patterns to provide the user with one or more notifications and/or information about the device. For example, a light indicator positioned around the first touch-input surface 904 can flash when the user receives a notification (e.g., a message), change red when the HIPD 900 is out of power, operate as a progress bar (e.g., a light ring that is closed when a task is completed (e.g., 0% to 100%)), operates as a volume indicator, etc.).

In some embodiments, the HIPD 900 includes one or more additional sensors on another surface. For example, as shown FIG. 9A, HIPD 900 includes a set of one or more sensors (e.g., sensor set 920) on an edge of the HIPD 900. The sensor set 920, when positioned on an edge of the of the HIPD 900, can be pe positioned at a predetermined tilt angle (e.g., 26 degrees), which allows the sensor set 920 to be angled toward the user when placed on a desk or other flat surface. Alternatively, in some embodiments, the sensor set 920 is positioned on a surface opposite the multi-touch input surface 902 (e.g., a back surface). The one or more sensors of the sensor set 920 are discussed in detail below.

The side view 925 of the of the HIPD 900 shows the sensor set 920 and camera 914B. The sensor set 920 includes one or more cameras 922A and 922B, a depth projector 924, an ambient light sensor 928, and a depth receiver 930. In some embodiments, the sensor set 920 includes a light indicator 926. The light indicator 926 can operate as a privacy indicator to let the user and/or those around them know that a camera and/or microphone is active. The sensor set 920 is configured to capture a user's facial expression such that the user can puppet a custom avatar (e.g., showing emotions, such as smiles, laughter, etc., on the avatar or a digital representation of the user). The sensor set 920 can be configured as a side stereo RGB system, a rear indirect Time-of-Flight (iToF) system, or a rear stereo RGB system. As the skilled artisan will appreciate upon reading the descriptions provided herein, the novel HIPD 900 described herein can use different sensor set 920 configurations and/or sensor set 920 placement.

In some embodiments, the HIPD 900 includes one or more haptic devices 971 (FIG. 9B; e.g., a vibratory haptic actuator) that are configured to provide haptic feedback (e.g., kinesthetic sensation). The sensors 951, and/or the haptic devices 971 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 900 is configured to operate without a display. However, in optional embodiments, the HIPD 900 can include a display 968 (FIG. 9B). The HIPD 900 can also income one or more optional peripheral buttons 967 (FIG. 9B). For example, the peripheral buttons 967 can be used to turn on or turn off the HIPD 900. Further, the HIPD 900 housing can be formed of polymers and/or elastomer elastomers. The HIPD 900 can be configured to have a non-slip surface to allow the HIPD 900 to be placed on a surface without requiring a user to watch over the HIPD 900. In other words, the HIPD 900 is designed such that it would not easily slide off a surfaces. In some embodiments, the HIPD 900 include one or magnets to couple the HIPD 900 to another surface. This allows the user to mount the HIPD 900 to different surfaces and provide the user with greater flexibility in use of the HIPD 900.

As described above, the HIPD 900 can distribute and/or provide instructions for performing the one or more tasks at the HIPD 900 and/or a communicatively coupled device. For example, the HIPD 900 can identify one or more back-end tasks to be performed by the HIPD 900 and one or more front-end tasks to be performed by a communicatively coupled device. While the HIPD 900 is configured to offload and/or handoff tasks of a communicatively coupled device, the HIPD 900 can perform both back-end and front-end tasks (e.g., via one or more processors, such as CPU 977; FIG. 9B). The HIPD 900 can, without limitation, can be used to perform augmenting calling (e.g., receiving and/or sending 3D or 2.5D live volumetric calls, live digital human representation calls, and/or avatar calls), discreet messaging. 6DoF portrait/landscape gaming, AR/VR object manipulation, AR/VR content display (e.g., presenting content via a virtual display), and/or other AR/VR interactions. The HIPD 900 can perform the above operations alone or in conjunction with a wearable device (or other communicatively coupled electronic device).

FIG. 9B shows block diagrams of a computing system 940 of the HIPD 900, in accordance with some embodiments. The HIPD 900, described in detail above, can include one or more components shown in HIPD computing system 940. The HIPD 900 will be understood to include the components shown and described below for the HIPD computing system 940. In some embodiments, all, or a substantial portion of the components of the HIPD computing system 940 are included in a single integrated circuit. Alternatively, in some embodiments, components of the HIPD computing system 940 are included in a plurality of integrated circuits that are communicatively coupled.

The HIPD computing system 940 can include a processor (e.g., a CPU 977, a GPU, and/or a CPU with integrated graphics), a controller 975, a peripherals interface 950 that includes one or more sensors 951 and other peripheral devices, a power source (e.g., a power system 995), and memory (e.g., a memory 978) that includes an operating system (e.g., an operating system 979), data (e.g., data 988), one or more applications (e.g., applications 980), and one or more modules (e.g., a communications interface module 981, a graphics module 982, a task and processing management module 983, an interoperability module 984, an AR processing module 985, a data management module 986, etc.). The HIPD computing system 940 further includes a power system 995 that includes a charger input and output 996, a PMIC 997, and a battery 998, all of which are defined above.

In some embodiments, the peripherals interface 950 can include one or more sensors 951. The sensors 951 can include analogous sensors to those described above in reference to FIG. 7B. For example, the sensors 951 can include imaging sensors 954, (optional) EMG sensors 956, IMUs 958, and capacitive sensors 960. In some embodiments, the sensors 951 can include one or more pressure sensor 952 for sensing pressure data, an altimeter 953 for sensing an altitude of the HIPD 900, a magnetometer 955 for sensing a magnetic field, a depth sensor 957 (or a time-of flight sensor) for determining a difference between the camera and the subject of an image, a position sensor 959 (e.g., a flexible position sensor) for sensing a relative displacement or position change of a portion of the HIPD 900, a force sensor 961 for sensing a force applied to a portion of the HIPD 900, and a light sensor 962 (e.g., an ambient light sensor) for detecting an amount of lighting. The sensors 951 can include one or more sensors not shown in FIG. 9B.

Analogous to the peripherals described above in reference to FIGS. 7B, the peripherals interface 950 can also include an NFC component 963, a GPS component 964, an LTE component 965, a Wi-Fi and/or Bluetooth communication component 966, a speaker 969, a haptic device 971, and a microphone 973. As described above in reference to FIG. 9A, the HIPD 900 can optionally include a display 968 and/or one or more buttons 967. The peripherals interface 950 can further include one or more cameras 970, touch surfaces 972, and/or one or more light emitters 974. The multi-touch input surface 902 described above in reference to FIG. 9A is an example of touch surface 972. The light emitters 974 can be one or more LEDs, lasers, etc. and can be used to project or present information to a user. For example, the light emitters 974 can include light indicators 912 and 926 described above in reference to FIG. 9A. The cameras 970 (e.g., cameras 914A, 914B, and 922 described above in FIG. 9A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 970 can be used for SLAM; 6 DoF ray casting, gaming, object manipulation, and/or other rendering; facial recognition and facial expression recognition, etc.

Similar to the watch body computing system 760 and the watch band computing system 730 described above in reference to FIG. 7B, the HIPD computing system 940 can include one or more haptic controllers 976 and associated componentry (e.g., haptic devices 971) for providing haptic events at the HIPD 900.

Memory 978 can include high-speed random-access memory and/or non-volatile memory, such as one or more magnetic disk storage devices, flash memory devices, or other non-volatile solid-state memory devices. Access to the memory 978 by other components of the HIPD 900, such as the one or more processors and the peripherals interface 950, can be controlled by a memory controller of the controllers 975.

In some embodiments, software components stored in the memory 978 include one or more operating systems 979, one or more applications 980, one or more communication interface modules 981, one or more graphics modules 982, one or more data management modules 985, which are analogous to the software components described above in reference to FIG. 7B.

In some embodiments, software components stored in the memory 978 include a task and processing management module 983 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 983 uses data 988 (e.g., device data 990) to distribute the one or more front-end and/or back-end tasks based on communicatively coupled devices' computing resources, available power, thermal headroom, ongoing operations, and/or other factors. For example, the task and processing management module 983 can cause the performance of one or more back-end tasks (of an operation performed at communicatively coupled AR device 800) at the HIPD 900 in accordance with a determination that the operation is utilizing a predetermined amount (e.g., at least 70%) of computing resources available at the AR device 800.

In some embodiments, software components stored in the memory 978 include an interoperability module 984 for exchanging and utilizing information received and/or provided to distinct communicatively coupled devices. The interoperability module 984 allows for different systems, devices, and/or applications to connect and communicate in a coordinated way without user input. In some embodiments, software components stored in the memory 978 include an AR module 985 that is configured to process signals based at least on sensor data for use in an AR and/or VR environment. For example, the AR processing module 985 can be used for 3D object manipulation, gesture recognition, facial and facial expression, recognition, etc.

The memory 978 can also include data 987, including structured data. In some embodiments, the data 987 can include profile data 989, device data 989 (including device data of one or more devices communicatively coupled with the HIPD 900, such as device type, hardware, software, configurations, etc.), sensor data 991, media content data 992, and application data 993.

It should be appreciated that the HIPD computing system 940 is an example of a computing system within the HIPD 900, and that the HIPD 900 can have more or fewer components than shown in the HIPD computing system 940, combine two or more components, and/or have a different configuration and/or arrangement of the components. The various components shown in HIPD computing system 940 are implemented in hardware, software, firmware, or a combination thereof, including one or more signal processing and/or application-specific integrated circuits.

Figures 10A, 10B:
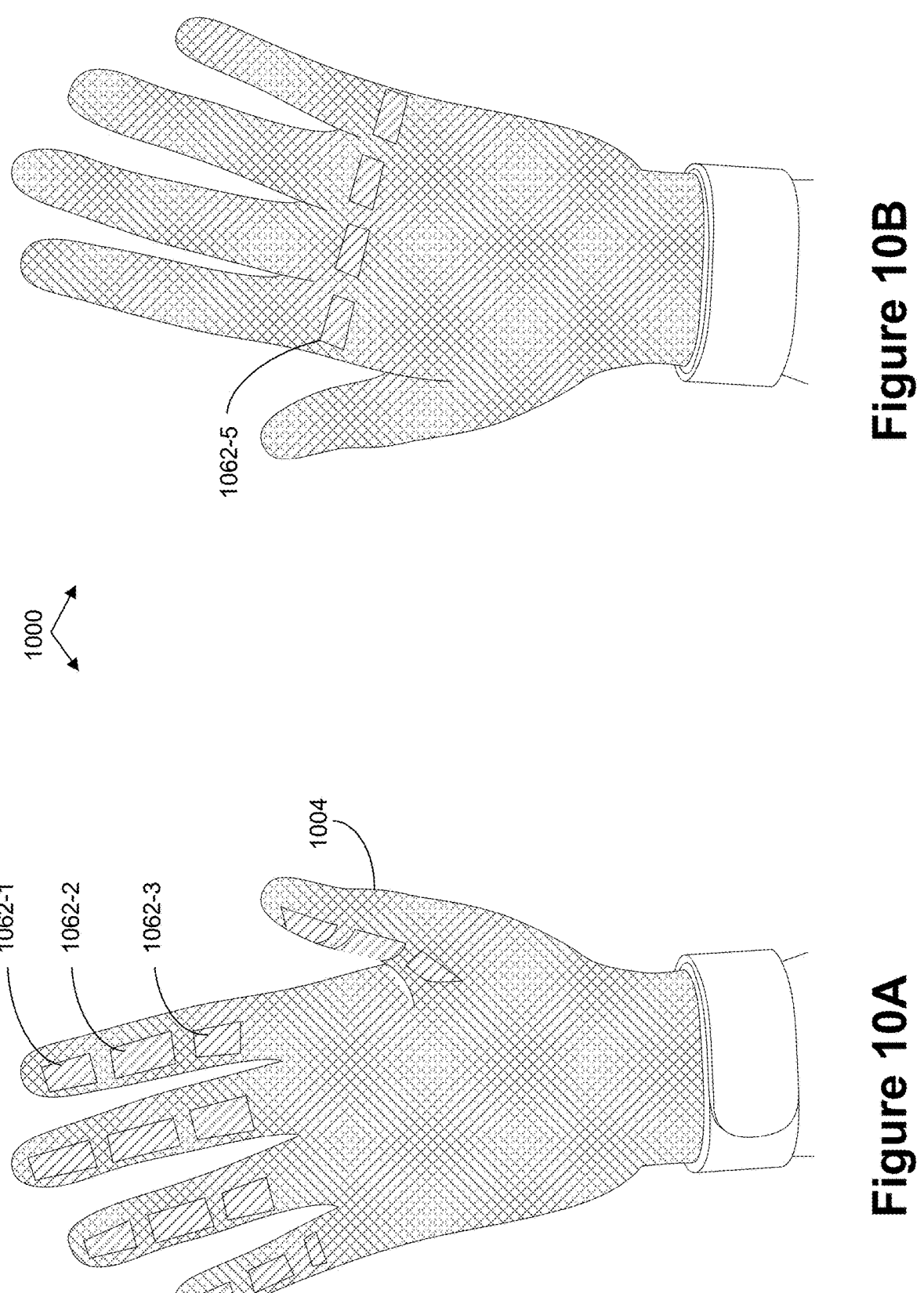
FIGS. 10A-10C illustrate an example smart textile-based garment, in accordance with some embodiments.
Figure 10C:
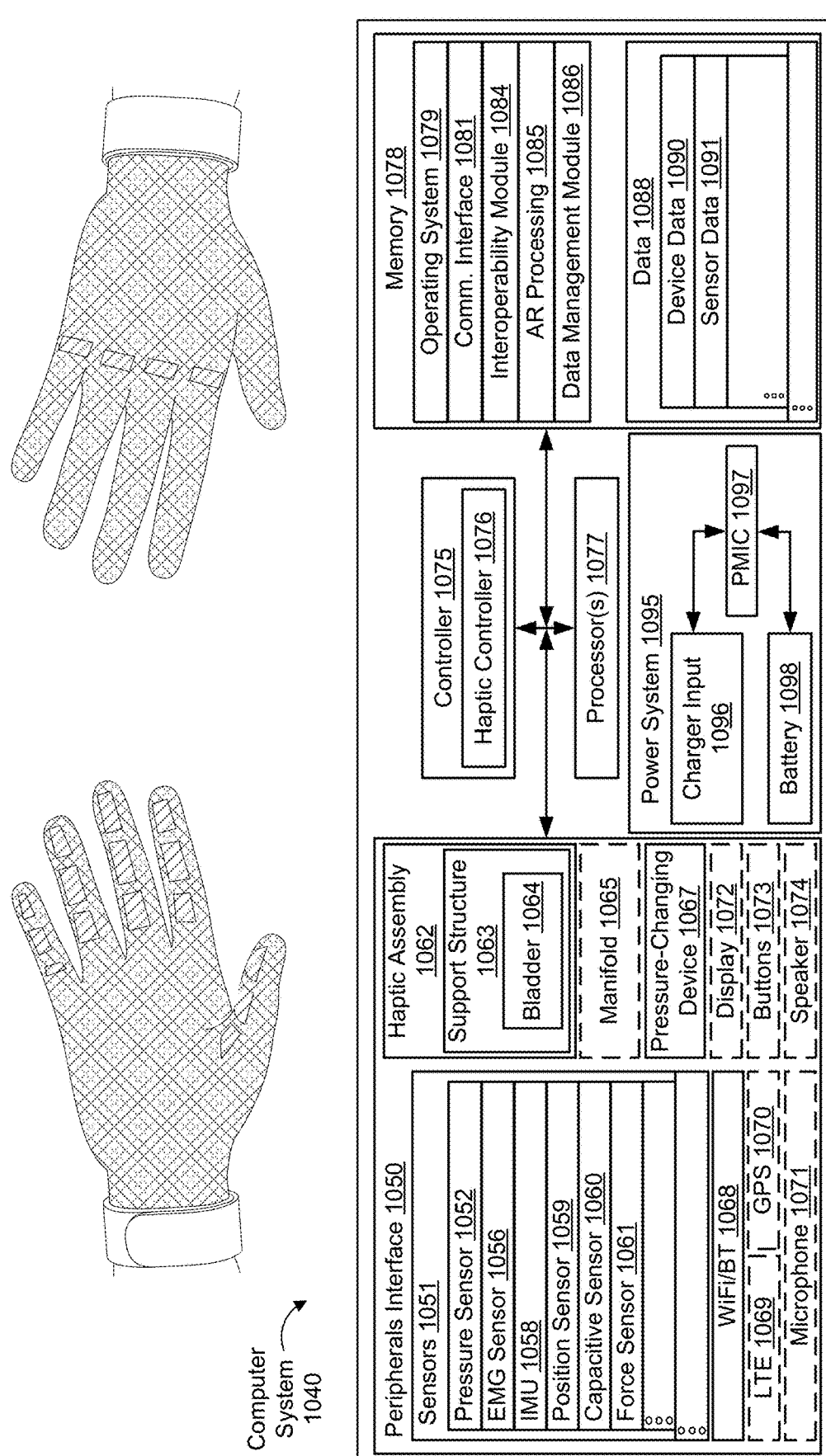

The techniques described above in FIG. 9A-9B can be used with any device used as a human-machine interface controller. In some embodiments, an HIPD 900 can be used in conjunction with one or more wearable device such as a head-wearable device (e.g., AR device 800 and VR device 810) and/or a wrist-wearable device 700 (or components thereof). In some embodiments, an HIPD 900 can also be used in conjunction with a wearable garment, such as smart textile-based garment 1000 (FIGS. 10A-10C). Having thus described example HIPD 900, attention will now be turned to example feedback devices, such as smart textile-based garment 1000.

Example Smart Textile-Based Garments

FIGS. 10A and 10B illustrate an example smart textile-based garment, in accordance with some embodiments. The smart textile-based garment 1000 (e.g., wearable gloves, a shirt, a headband, a wristbands, socks, etc.) is configured to communicatively couple with one or more electronic devices, such as a wrist-wearable device 700, a head-wearable device, an HIPD 900, a laptop, tablet, and/or other computing devices. The smart textile-based garment 1000 can perform various functions and/or operations associated with navigating through user interfaces and selectively opening applications, as well as the functions and/or operations described above with reference to FIGS. 1A to 5.

The smart textile-based garment 1000 can be part of an AR system, such as AR system 600d described above in reference to FIGS. 6D-1 and 6D-2. The smart textile-based garment 1000 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1000 receives instructions from a communicatively coupled device (e.g., the wrist-wearable device 700, a head-wearable device, and HIPD 900, etc.) for causing the performance of a feedback response. Alternatively, or in addition, in some embodiments, the smart textile-based garment 1000 determines one or more feedback responses to provide a user. The smart textile-based garment 1000 can determine the one or more feedback responses based on sensor data captured by one or more of its sensors (e.g., sensors 1051; FIG. 10C) or communicatively coupled sensors (e.g., sensors of a wrist-wearable device 700, a head-wearable device, an HIPD 900, and/or other computing device).

Non-limiting examples of the feedback determined by the smart textile-based garment 1000 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1000 can include respective feedback devices (e.g., a haptic device or assembly 1062 or other feedback devices or assemblies) to provide the feedback responses to the user. Similarly, the smart textile-based garment 1000 can communicatively couple with another device (and/or the other device's feedback devices) to coordinate the feedback provided to the user. For example, a VR device 810 can present an AR environment to a user and as the user interacts with objects within the AR environment, such as a virtual cup, the smart textile-based garment 1000 provides respective response to the user. In particular, the smart textile-based garment 1000 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 1000 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1A to 5.

FIG. 10A shows one or more haptic assemblies 1062 (e.g., first through fourth haptic assemblies 1062-1 through 1062-4) on a portion of the smart textile-based garment 1000 adjacent to a palmar side of the user's hand and FIG. 10B shows additional haptic assemblies (e.g., a fifth haptic assembly 1062-5) on a portion of the smart textile-based garment 1000 adjacent to a dorsal side of the user's hand. In some embodiments, the haptic assemblies 1062 include a mechanism that, at a minimum, provide resistance when a respective haptic assembly 1062 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1062 described can transition between a first pressurized state and a second pressurized state to provide haptic feedback to the user. Structures of haptic assemblies 1062 can be integrated into various devices configured to be in contact or proximity to a user's skin, including, but not limited to devices such as glove worn devices, body worn clothing device, headset devices. Each of the haptic assemblies 1062 can be included in or physically coupled to a garment component 1004 of the smart textile-based garment 1000. For example, each of the haptic assemblies 1062-1, 1062-2, 1062-3 . . . 1062-N are physically coupled to the garment 1004 are configured to contact respective phalanges of a user's thumb and fingers.

Due to the ever-changing nature of artificial-reality, the haptic assemblies 1062 may be required to transition between the multiple states hundreds, or perhaps thousands of times, during a single use. Thus, the haptic assemblies 1062 described herein are durable and designed to quickly transition from state to state. To provide some context, in a first pressurized state, the haptic assemblies 1062 do not impede free movement of a portion of the wearer's body. For example, one or more haptic assemblies 1062 incorporated into a glove are made from flexible materials that do not impede free movement of the wearer's hand and fingers (e.g., an electrostatic-zipping actuator). The haptic assemblies 1062 are configured to conform to a shape of the portion of the wearer's body when in the first pressurized state. However, once in a second pressurized state, the haptic assemblies 1062 can be configured to restrict and/or impede free movement of the portion of the wearer's body (e.g., appendages of the user's hand). For example, the respective haptic assembly 1062 (or multiple respective haptic assemblies) can restrict movement of a wearer's finger (e.g., prevent the finger from curling or extending) when the haptic assembly 1062 is in the second pressurized state. Moreover, once in the second pressurized state, the haptic assemblies 1062 may take different shapes, with some haptic assemblies 1062 configured to take a planar, rigid shape (e.g., flat and rigid), while some other haptic assemblies 1062 are configured to curve or bend, at least partially.

The smart textile-based garment 1000 can be one of a plurality of devices in an AR system (e.g., AR systems of FIGS. 6A-6D-2). For example, a user can wear a pair of gloves (e.g., a first type of smart textile-based garment 1000), wear a haptics component of a wrist-wearable device 700 (FIGS. 7A-7B), wear a headband (e.g., a second type of smart textile-based garment 1000), hold an HIPD 900, etc. As explained above, the haptic assemblies 1062 are configured to provide haptic simulations to a wearer of the smart textile-based garments 1000. The garment 1004 of each smart textile-based garment 1000 can be one of various articles of clothing (e.g., gloves, socks, shirts, pants, etc.). Thus, a user may wear multiple smart textile-based garments 1000 that are each configured to provide haptic stimulations to respective parts of the body where the smart textile-based garments 1000 are being worn. Although the smart textile-based garment 1000 are described as an individual device, in some embodiments, the smart textile-based garment 1000 can be combined with other wearable devices described herein. For example, the smart textile-based garment 1000 can form part of a VR device 810 (e.g., a headband portion).

FIG. 10C shows block diagrams of a computing system 1040 of the haptic assemblies 1062, in accordance with some embodiments. The computing system 1040 can include one or more peripheral interfaces 1050, one or more power systems 1095 (including charger input 1096, PMIC 1097, and battery 1098), one or more controllers 1075 (including one or more haptic controllers 1076), one or more processors 1077 (as defined above, including any of the examples provided), and memory 1078, which can all be in electronic communication with each other. For example, the one or more processors 1077 can be configured to execute instructions stored in the memory 1078, which can cause a controller of the one or more controllers 1075 to cause operations to be performed at one or more peripheral devices of the peripherals interface 1050. In some embodiments, each operation described can occur based on electrical power provided by the power system 1095.

In some embodiments, the peripherals interface 1050 can include one or more devices configured to be part of the computing system 1040, many of which have been defined above and/or described with respect to wrist-wearable devices shown in FIGS. 7A-7B. For example, the peripherals interface 1050 can include one or more sensors 1051, such as one or more pressure sensors 1052, one or more EMG sensors 1056, one or more IMUs 1058, one or more position sensors 1059, one or more capacitive sensors 1060, one or more force sensors 1061; and/or any other types of sensors defined above or described with respect to any other embodiments discussed herein. In some embodiments, the peripherals interface can include one or more additional peripheral devices, including one or more Wi-Fi and/or Bluetooth devices 1068, an LTE component 1069, a GPS component 1070, a microphone 1071, one or more haptic assemblies 1062, one or more support structures 1063 (which can include one or more bladders 1064, one or more manifolds 1065, one or more pressure-changing devices 1067, one or more displays 1072, one or more buttons 1073, one or more speakers 1074, and/or any other types of peripheral devices defined above or described with respect to any other embodiments discussed herein. In some embodiments, computing system 1040 includes more or fewer components than those shown in FIG. 10C.

In some embodiments, each haptic assembly 1062 includes a support structure 1063 and at least one bladder 1064. The bladder 1064 (e.g., a membrane) is a sealed, inflatable pocket made from a durable and puncture-resistant material, such as thermoplastic polyurethane (TPU), a flexible polymer, or the like. The bladder 1064 contains a medium (e.g., a fluid such as air, inert gas, or even a liquid) that can be added to or removed from the bladder 1064 to change pressure (e.g., fluid pressure) inside the bladder 1064. The support structure 1063 is made from a material that is stronger and stiffer than the material of the bladder 1064. A respective support structure 1063 coupled to a respective bladder 1064 is configured to reinforce the respective bladder 1064 as the respective bladder changes shape and size due to changes in pressure (e.g., fluid pressure) inside the bladder. The above example haptic assembly 1062 is non-limiting. The haptic assembly 1062 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1000 also includes a haptic controller 1076 and a pressure-changing device 1067. Alternatively, in some embodiments, the computing system 1040 is communicatively coupled with a haptic controller 1076 and/or pressure-changing device 1067 (e.g., in electronic communication with one or more processors 1077 of the computing system 1040). The haptic controller 1076 is configured to control operation of the pressure-changing device 1067, and in turn operation of the smart textile-based garments 1000. For example, the haptic controller 1076 sends one or more signals to the pressure-changing device 1067 to activate the pressure-changing device 1067 (e.g., turn it on and off). The one or more signals can specify a desired pressure (e.g., pounds per square inch) to be output by the pressure-changing device 1067. Generation of the one or more signals, and in turn the pressure output by the pressure-changing device 1067, can be based on information collected by sensors 1051 of the smart textile-based garment 1000 and/or other communicatively coupled device. For example, the haptic controller 1076 can provide one or more
signals, based on collected sensor data, to cause the pres-
sure-changing device 1067 to increase the pressure (e.g.,
fluid pressure) inside a first haptic assembly 1062 at a first
time, and provide one or more additional signals, based on
additional sensor data, to the pressure-changing device
1067, to cause the pressure-changing device 1067 to further
increase the pressure inside a second haptic assembly 1062
at a second time after the first time. Further, the haptic
controller 1076 can provide one or more signals to cause the
pressure-changing device 1067 to inflate one or more blad-
ders 1064 in a first portion of a smart textile-based garment
1000 (e.g., a first finger), while one or more bladders 1064
in a second portion of the smart textile-based garment 1000
(e.g., a second finger) remain unchanged. Additionally, the
haptic controller 1076 can provide one or more signals to
cause the pressure-changing device 1067 to inflate one or
more bladders 1064 in a first smart textile-based garment
1000 to a first pressure and inflate one or more other
bladders 1064 in the first smart textile-based garment 1000
to a second pressure different from the first pressure.
Depending on the number of smart textile-based garments
1000 serviced by the pressure-changing device 1067, and
the number of bladders therein, many different inflation
configurations can be achieved through the one or more
signals, and the examples above are not meant to be limiting.

The smart textile-based garment 1000 may include an
optional manifold 1065 between the pressure-changing
device 1067, the haptic assemblies 1062, and/or other por-
tions of the smart textile-based garment 1000. The manifold
1065 may include one or more valves (not shown) that
pneumatically couple each of the haptic assemblies 1062
with the pressure-changing device 1067 via tubing. In some
embodiments, the manifold 1065 is in communication with
the controller 1075, and the controller 1075 controls the one
or more valves of the manifold 1065 (e.g., the controller
generates one or more control signals). The manifold 1065
is configured to switchably couple the pressure-changing
device 1067 with one or more haptic assemblies 1062 of the
smart textile-based garment 1000. In some embodiments,
one or more smart textile-based garments 1000 or other
haptic devices can be coupled in a network of haptic devices,
and the manifold 1065 can distribute the fluid between the
coupled smart textile-based garments 1000.

In some embodiments, instead of using the manifold 1065
to pneumatically couple the pressure-changing device 1067
with the haptic assemblies 1062, the smart textile-based
garment 1000 may include multiple pressure-changing
devices 1067, where each pressure-changing device 1067 is
pneumatically coupled directly with a single (or multiple)
haptic assembly 1062. In some embodiments, the pressure-
changing device 1067 and the optional manifold 1065 can be
configured as part of one or more of the smart textile-based
garments 1000 (not illustrated) while, in other embodiments,
the pressure-changing device 1067 and the optional mani-
fold 1065 can be configured as external to the smart textile-
based garments 1000. In some embodiments, a single pres-
sure-changing device 1067 can be shared by multiple smart
textile-based garments 1000 or other haptic devices. In some
embodiments, the pressure-changing device 1067 is a pneu-
matic device, hydraulic device, a pneudraulic device, or
some other device capable of adding and removing a
medium (e.g., fluid, liquid, or gas) from the one or more
haptic assemblies 1062.

The memory 1078 includes instructions and data, some or
all of which may be stored as non-transitory computer-
readable storage media within the memory 1078. For example, the memory 1078 can include one or more oper-
ating systems 1079, one or more communication interface
applications 1081, one or more interoperability modules
1084, one or more AR processing applications 1085, one or
more data-management modules 1086, and/or any other
types of data defined above or described with respect to
FIGS. 7A-9B.

The memory 1078 also includes data 1088, which can be
used in conjunction with one or more of the applications
discussed above. The data 1088 can include device data
1090, sensor data 1091, and/or any other types of data
defined above or described with respect to FIGS. 7A-9B.

The different components of the computing system 1040
(and the smart textile-based garment 1000) shown in FIGS.
10A-10C can be coupled via a wired connection (e.g., via
busing). Alternatively, one or more of the devices shown in
FIGS. 10A-10C may be wirelessly connected (e.g., via
short-range communication signals).

Any data collection performed by the devices described
herein and/or any devices configured to perform or cause the
performance of the different embodiments described above
in reference to any of the Figures, hereinafter the "devices,"
is done with user consent and in a manner that is consistent
with all applicable privacy laws. Users are given options to
allow the devices to collect data, as well as the option to
limit or deny collection of data by the devices. A user is able
to opt-in or opt-out of any data collection at any time.
Further, users are given the option to request the removal of
any collected data.

EXAMPLE EMBODIMENTS

Various embodiments of the example systems, devices,
and methods described herein will now be discussed in more
detail below. One of skill in the are will understand that the
example embodiments described below are not the only
embodiments enabled by this disclosure, and that various
alternative permutations of the described AR systems may
be suitable for performing one or more of the sets of
operations described herein. For ease of description, the
following embodiments are described in terms of the sys-
tems and devices described above with respect to FIGS. 1A
to 10C.

(A1) A handheld controller for an artificial-reality system
is described herein (e.g., the handheld controller 300 of
the artificial-reality system 100 shown in FIGS. 2A-2E
and 3). The handheld controller includes a top cover
(e.g., the top cover 200) having a surface (e.g., the
surface 205) surrounded by a perimeter (e.g., the perim-
eter 210). In some embodiments, the perimeter of the
surface includes a digit-occluded region (e.g., the digit-
occluded region 275) on which a digit of a user who is
holding the handheld controller 300 can be placed and
a different region (e.g., the different region 285) sepa-
rated from the digit-occluded region.

The handheld controller includes a first illumination
source disposed within the digit-occluded region at a first
position along the perimeter of the top cover, the first
position being visible to a camera of the artificial-reality
system while the handheld controller has one of a first set of
orientations.

The handheld controller includes a second illumination
source disposed within the digit-occluded region at a second
position along the perimeter of the top cover, the second
position being visible to the camera of the artificial-reality
system while the handheld controller has one of a second set
of orientations, the second position being different from the first position. For example, the handheld controller 300 includes the second illumination source disposed within the digit-occluded region at the position 234 along the perimeter 210, which may be selected such that it is visible to the camera 110 while the handheld controller 300 is in one of a second set of orientations (e.g., when the user is holding the handheld controller flat while operating the thumbstick 430).

And the handheld controller includes a third illumination source disposed within the different region at a third position on the surface (e.g., the illumination source at position 244), the third position being away and distinct from the perimeter, where the first position is located to be visible to the camera of the artificial-reality system while the digit of the user is at least partially occluding the second position from the camera of the artificial-reality system, and the second position is located to be visible to the camera of the artificial-reality system while the digit of the user is at least partially occluding the first position from the camera of the artificial-reality system. For example, while the user is interacting with the buttons 435 of the handheld controller 300 such that the user is at least partially occluding the digit-occluded region 275 (including the illumination source located at the position 232), the illumination source located at the position 242 is positioned so as to be visible to the camera of the artificial-reality system 100.

(A2) In some embodiments of A1, wherein the first, second, and third illumination sources are part of a plurality of illumination sources disposed at respective positions within the digit-occluded region or the different region of the top cover, and adjacent illumination sources of the plurality of illumination sources are separated from one another by at least a blur-reducing separation distance. For example, the illumination source 112C and the illumination source 113A are separated by a blur-reducing separation distance 115a.

(A3) In some embodiments of A2, adjacent illumination sources of the plurality of illumination sources disposed within the digit-occluded region are separated from one another by at least a first blur-reducing separation distance, adjacent illumination sources of the plurality of illumination sources disposed within the different region are separated from one another by at least a second blur-reducing separation distance, and the first blur-reducing separation distance is distinct from the second blur-reducing separation distance. For example, the adjacent illumination sources at positions 232 and 234 disposed within the digit-occluded region 275 are separated by a first blur-reducing separation distance, and the adjacent illumination sources at the positions 222 and 224 disposed within the different region 285 are separated by at least a second blur-reducing distance.

(A4) In some embodiments of A2 or A3, adjacent illumination sources of the plurality of illumination sources positioned along the perimeter of the top cover are separated from one another by at least a first blur-reducing separation distance, adjacent illumination sources of the plurality of illumination sources disposed within the surface of the top cover are separated from one another by at least a second blur-reducing separation distance, and the first blur-reducing separation distance is distinct from the second blur-reducing separation distance. For example, the blur-reducing separation distance 115c between the illumination sources 112A and 112B on the perimeter 210 of the handheld controller 300 in FIG. 1B is different than the blur-reducing separation distance 115b between the illumination sources 113A and 113B on the surface 205 of handheld controller 300.

(A5) In some embodiments of any one of A1 to A4, the handheld controller includes at least one additional illumination source disposed along the perimeter of the top cover at an additional position within the different region. For example, the illumination source located at the first position 222 is located on the perimeter 210 of the handheld controller 300 in the different region 285 that is separated from the digit-occluded region 275.

(A6) In some embodiments of any one of A1 to A5, the handheld controller 300 further includes at least one additional illumination source disposed on the surface of the top cover in the different region (e.g., one or both of the illumination sources 113A and 113B).

(A7) In some embodiments of any one of A1 to A6, the handheld controller 300 further includes at least one additional illumination source disposed on the surface of the top cover in the different region. For example, the handheld controller 300 in FIG. 2A includes a third illumination source disposed within the different region 285 at a third position 244 that is different than the illumination source located at the second position 234 in the different region 285.

(A8) In some embodiments of any one of A1 to A7, the third position is closer to a pressable button of the handheld controller compared to the first and second positions.

(A9) In some embodiments of any one of A1 to A8, the perimeter is rounded while extending downward from the surface of the top cover. For example, the perimeter 210 is shown in FIG. 2A as being rounded and extending downward from the top cover 200.

(A10) In some embodiments of A9, the first illumination source is positioned at an angle that aligns with the rounded perimeter. For example, the first illumination source located at the position 232 may be positioned at an angle that aligns with the rounded perimeter 210.

(A11) In some embodiments of any one of A1 to A10, wherein the second and third positions are visible to the camera of the artificial-reality system while the digit of the user is within the digit-occluded region. For example, the illumination sources located at the second and third positions 234 and 244 are selected such that they are visible to the camera 110 while the handheld controller 300 is in one of the one of a second set of orientations.

(A12) In some embodiments of any one of A1 to A11, the surface is transparent to light emitted by the first, second and third illumination sources at corresponding positions. As described with respect to FIGS. 1A-1B and 2A-2E, the first, second, and/or third illumination sources may be configured to emit IR light, and the top cover 200 of the handheld controller 300 may be opaque to a user and transparent to some subset of non-visible ranges of wavelengths (e.g., IR light).

(A13) In some embodiments of any one of A1 to A12, the surface of the top cover includes a flat surface adjacent to a first portion of the perimeter of the top cover and an angled surface extending at an angle away from the flat surface to a second portion of the perimeter of the top cover, and the first position and the second position are disposed at the angled surface and the third position is disposed at the flat surface. As shown in FIG. 2A, the first and second positions 232 and 234 are disposed along the angled surface 250 of the handheld controller

300, and the fourth position 242 may correspond to a third position disposed on the flat surface 260.

(A14) In some embodiments of any one of A1 to A13, two or more of the first illumination source, the second illumination source and the third illumination source are configured to provide data to the camera of the artificial-reality system, which is a position-tracking camera configured to monitor the data to allow the artificial-reality system to determine, in part, a current position of the handheld controller in a three-dimensional space. For example, the position-tracking camera 110 is configured to monitor a current position of the handheld controller 300.

(A15) In some embodiments of any one of A1 to A14, the first, second and third positions are selected such that at least two of the positions are visible to the camera at a greatest number of orientations of the handheld controller relative to the camera in a three-dimensional space (e.g., the arrangement of illumination sources of the handheld controller 300 in FIG. 1B).

(A16) In some embodiments of any one of A1 to A15, further comprising a pressable button, wherein at least one of the first, second and third illumination sources is adjacent to the pressable button and is positioned away from the digit-occluded region. For example, the illumination source located at the position 242 is located adjacent to one of the buttons 435 (e.g., a "B" button), and is also positioned away from the digit-occluded region 275.

(A17) In some embodiments of any one of A1 to A16, the surface comprises a flat portion and an angled portion contiguous with the flat portion and angled relative to the flat portion, wherein the digit-occluded region is partially in the angled portion and partially in the flat portion. That is, the digit-occluded region 275 includes a portion of the flat surface 260 and a portion of the rounded perimeter 210.

(A18) In some embodiments of any one of A1 to A17, wherein at least one of the first, second, and third illumination sources is located in the angled portion away from the digit-occluded region (e.g., one or both of the illumination source at the positions 222 and 224).

(B1) In some embodiments, a handheld controller for an artificial-reality system is provided (e.g., the handheld controller 300 shown in FIGS. 2A to 2E). The handheld controller includes a top cover including by a perimeter, a flat surface adjacent to a portion of the perimeter of the top cover, and an angled surface extending at an angle and away from the flat surface to a different portion of the perimeter of the top cover. For example, the top cover 200 of the handheld controller 300 includes the perimeter 210, where the flat surface 260 is adjacent to the perimeter 210, and the angled surface 250 extends at an angle away from the flat surface 260. The handheld controller includes a first illumination source positioned at the portion of the perimeter of the top cover or at the different portion of the perimeter of the top cover, to be visible to a camera of the artificial-reality system. The handheld controller includes a second illumination source positioned at the flat surface of the top cover, to be visible to the camera of the artificial-reality system (e.g., the second illumination source is located at the position 242 at the flat surface 260 of the top cover 200). And the handheld controller includes a third illumination source positioned at an angled surface of the top cover, to be visible to the camera of the artificial-reality system (e.g., the third illumination source positioned at the position 244 at the angled surface 250).

(B2) In some embodiments of B1, the angled surface has a digit-occluded region that is occluded from the camera of the artificial-reality system when a digit of a user who is holding the handheld controller is at or near the digit-occluded region. For example, the handheld controller 300 has a surface 205 that includes a digit-occluded region 275.

(B3) In some embodiments of B2, the handheld controller further includes at least one additional illumination source positioned at the angled surface and away from the digit-occluded region. For example, the illumination source located at the position 242 is at the surface 205 in the different region 285, which is away from the digit-occluded region 275.

(B4) In some embodiments of B2 or B3, the handheld controller further includes at least one additional illumination source positioned along the perimeter of the top cover and in the digit-occluded region (e.g., illumination sources at the positions 232 and 234).

(B5) In some embodiments of any one of B2 to B4, the third illumination source is positioned to be away from the digit-occlusion region. For example, the third illumination source located at the position 244 in FIG. 2A is positioned away from the digit-occluded region 275.

(B6) In some embodiments of any one of B1 to B5, the handheld controller further includes a pressable button, where at least one of the first, second and third illumination sources is adjacent to the pressable button and is positioned away from the digit-occluded region.

(B7) In some embodiments of any one of B1 to B6, the perimeter is rounded while extending downward from the surface of the top cover. For example, the perimeter 210 is shown as being rounded and/or chamfered downward from the surface 205.

(B8) In some embodiments of B7, the first illumination source is positioned tangential to the rounded perimeter. For example, the first illumination source of the controller 300 is located at the first position 232, which is at and tangential to the perimeter 210 of the top cover 200.

(B9) In some embodiments of any one of B1 to B8, the handheld controller further includes a thumbstick and a pressable button (e.g., the thumbstick 430 and the buttons 435), where the second illumination source is positioned between the thumbstick and the pressable button, the thumbstick being configured to be moved by a digit of the user who is holding the handheld controller to provide control signals to the artificial-reality system based on the position of the thumbstick.

(B10) In some embodiments of any one of B1 to B9, the perimeter, the angled surface and the flat surface are transparent to radiation emitted by the first, second and third illumination sources at corresponding positions (e.g., the angled surface 250 and the flat surface 260 may be made of IR transparent material configured to be transparent to IR light emitted by the illumination sources located at any of the positions 222, 224, 226, 232, 242, and/or 244 on the surface 205 and the perimeter 210 of the top cover 200).

(B11) In some embodiments of any one of B1 to B10, the first, second and/or third illumination sources are configured to provide data to the camera of artificial-reality system which is configured to determine a position of the handheld controller in a three-dimensional space relative to the camera based on data received from the first, second and/or third illumination sources. For example, the perimeter LEDs 112 and the surface LEDs 113 shown in FIG. 1B are configured to provide data to the cameras 110A and 110B

(B12) In some embodiments of any one of B1 to B11, the handheld controller further includes a pressable button, where at least one of the first, second and third illumination sources is adjacent to the pressable button and is positioned on the flat surface of the top cover. For example, the illumination sources at the positions 242 and 244 in FIG. 2A are located closer to the buttons 435.

(B13) In some embodiments of any one of B1 to B12, at least two of the first, second and third illumination sources are positioned to be visible to the camera at a greatest number of orientations of the handheld controller relative to the camera in a three-dimensional space.

(C1) In some embodiments, a handheld controller for an artificial-reality system is provided. The handheld controller includes a top cover having a surface surrounded by a perimeter (e.g., the perimeter 210 in FIG. 2A), the surface having a digit-occluded region on which a digit of a user who is holding the handheld controller can be placed (e.g., the digit-occluded region 275) and a different region separated from the digit-occluded region (e.g., the different region 285). The handheld controller includes a first illumination source disposed within the digit-occluded region at a first position along the perimeter of the top cover (e.g., the illumination source at the position 232 on the perimeter 210 in the digit-occluded region 275). The handheld controller includes a second illumination source disposed within the different region at a second position on the surface (e.g., the illumination source at the position 244). And the handheld controller includes a third illumination source disposed on a lower portion of the handheld controller. For example, the illumination source 204 is positioned at a location on the handle 202 of the handheld controller 300.

(C2) In some embodiments of C1, the lower portion of the handheld controller comprises a handle of the handheld controller. For example, the handheld controller 300 includes a handle 202.

(C3) In some embodiments of C1 or C2, the first position is visible to a camera of the artificial-reality system while the handheld controller has one of a first set of orientations.

(C4) In some embodiments of any one of C1 to C3, the second position is visible to the camera of the artificial-reality system while the handheld controller has one of a second set of orientations, the second position being different from the first position.

(C5) In some embodiments of any one of C1 to C4, the handheld controller includes a fourth illumination source disposed within the different region at a third position on the surface, the third position being away and distinct from the perimeter (e.g., the illumination source positioned at the position 242).

(C6) In some embodiments of any one of C1 to C5, the first position is located to be visible to the camera of the artificial-reality system while the digit of the user is at least partially occluding the second position from the camera of the artificial-reality system, and the second position is located to be visible to the camera of the artificial-reality system while the digit of the user is at least partially occluding the first position from the camera of the artificial-reality system.

(D1) In some embodiments, a handheld controller for an artificial-reality system is provided. The handheld controller includes a top cover including by a perimeter, a flat surface adjacent to a portion of the perimeter of the top cover (e.g., the flat surface 260), and an angled surface extending at an angle and away from the flat surface to a different portion of the perimeter of the top cover (e.g., the angled surface 250). The handheld controller includes a first illumination source positioned at the flat surface of the top cover, to be visible to the camera of the artificial-reality system (e.g., the illumination source located at the position 242). The handheld controller includes a second illumination source positioned at an angled surface of the top cover, to be visible to the camera of the artificial-reality system (e.g., the illumination source located at the position 244). And the handheld controller includes a third illumination source positioned at a lower portion of the handheld controller (e.g., the illumination source 204 positioned on the handle 202 of the handheld controller 300).

(D2) In some embodiments of D1, the lower portion of the handheld controller comprises a handle of the handheld controller. For example, the handheld controller 300 includes a handle 202.

(D3) In some embodiments of D1 or D2, the handheld controller includes a fourth illumination source positioned at the portion of the perimeter of the top cover or at the different portion of the perimeter of the top cover, to be visible to a camera of the artificial-reality system (e.g., the illumination source at the position 224 on the perimeter 210 in the different region 285).

(D4) In some embodiments of any one of D1 to D3, the angled surface has a digit-occluded region that is occluded from the camera of the artificial-reality system when a digit of a user who is holding the handheld controller is at or near the digit-occluded region (e.g., the digit-occluded region 275).

(D5) In some embodiments of any one of D1 to D4, the handheld controller includes at least one additional illumination source positioned at the angled surface and away from the digit-occluded region (e.g., the illumination source positioned at the position 224).

(D6) In some embodiments of any one of D1 to D5, the handheld controller includes at least one additional illumination source positioned along the perimeter of the top cover and in the digit-occluded region (e.g., the illumination sources at the positions 232 and 244).

(E1) In some embodiments, an artificial-reality system is provided (e.g., the artificial-reality system 100). The artificial-reality system includes a headset (e.g., the virtual-reality headset 650, the VR device 810). The artificial-reality system includes a camera in communication with the headset. And the artificial-reality system includes a handheld controller of any one of A1 to D6.

(F1) In some embodiments, a non-transitory computer-readable storage medium having instructions stored thereupon is provided. The instructions, when executed by the artificial-reality system of E1, cause the artificial-reality system to utilize data from the camera viewing the handheld controller to make positional determinations for the handheld controller based on the data received from the first, second and/or third illumination sources.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology. There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

As used herein, the term "about" is relative to the actual value stated, as will be appreciated by those of skill in the art, and allows for approximations, inaccuracies, and limits of measurement under the relevant circumstances.

As used herein, the term "comprising" indicates the presence of the specified integer(s), but allows for the possibility of other integers, unspecified. This term does not imply any particular proportion of the specified integers. Variations of the word "comprising," such as "comprise" and "comprises," have correspondingly similar meanings.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope of the present disclosure. In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A handheld controller for an artificial-reality system, the handheld controller comprising:

a top cover having a surface surrounded by a perimeter, the surface having a digit-occluded region on which a digit of a user who is holding the handheld controller can be placed and a different region separated from the digit-occluded region;

a first illumination source disposed within the digit-occluded region at a first position along the perimeter of the top cover, the first position being visible to a camera of the artificial-reality system while the handheld controller has one of a first set of orientations;

a second illumination source disposed within the digit-occluded region at a second position along the perimeter of the top cover, the second position being visible to the camera of the artificial-reality system while the handheld controller has one of a second set of orientations, the second position being different from the first position; and a third illumination source disposed within the different region at a third position on the surface, the third position being away and distinct from the perimeter, wherein:

the first position is located to be visible to the camera of the artificial-reality system while the digit of the user is at least partially occluding the second position from the camera of the artificial-reality system, the second position is located to be visible to the camera of the artificial-reality system while the digit of the user is at least partially occluding the first position from the camera of the artificial-reality system, and the third position is located to be visible to the camera of the artificial-reality system while the digit of the user is within the digit-occluded region.

2. The handheld controller of claim 1, wherein the first, second, and third illumination sources are part of a plurality of illumination sources disposed at respective positions within the digit-occluded region or the different region of the top cover, and adjacent illumination sources of the plurality of illumination sources are separated from one another by at least a blur-reducing separation distance.

3. The handheld controller of claim 2, wherein:

adjacent illumination sources of the plurality of illumination sources disposed within the digit-occluded region are separated from one another by at least a first blur-reducing separation distance, adjacent illumination sources of the plurality of illumination sources disposed within the different region are separated from one another by at least a second blur-reducing separation distance, and the first blur-reducing separation distance is distinct from the second blur-reducing separation distance.

4. The handheld controller of claim 2, wherein:

adjacent illumination sources of the plurality of illumination sources positioned along the perimeter of the top cover are separated from one another by at least a first blur-reducing separation distance, adjacent illumination sources of the plurality of illumination sources disposed within the surface of the top cover are separated from one another by at least a second blur-reducing separation distance, and the first blur-reducing separation distance is distinct from the second blur-reducing separation distance.

5. The handheld controller of claim 1, further comprising at least one additional illumination source disposed along the perimeter of the top cover at an additional position within the different region.

6. The handheld controller of claim 1, further comprising at least one additional illumination source disposed on the surface of the top cover in the different region.

7. The handheld controller of claim 1, further comprising a thumbstick, wherein the third position is closer to the thumbstick compared to the first and second positions.

8. The handheld controller of claim 1, wherein the third position is closer to a pressable button of the handheld controller compared to the first and second positions.

9. The handheld controller of claim 1, wherein the perimeter is rounded while extending downward from the surface of the top cover.

10. The handheld controller of claim 9, wherein the first illumination source is positioned at an angle that aligns with the rounded perimeter.

11. The handheld controller of claim 1, wherein the second is visible to the camera of the artificial-reality system while the digit of the user is within the digit-occluded region.

12. The handheld controller of claim 1, wherein the surface is transparent to light emitted by the first, second, and third illumination sources at corresponding positions.

13. The handheld controller of claim 1, wherein:

the surface of the top cover includes a flat surface adjacent to a first portion of the perimeter of the top cover and an angled surface extending at an angle away from the flat surface to a second portion of the perimeter of the top cover, and the first position and the second position are disposed at the angled surface and the third position is disposed at the flat surface.

14. The handheld controller of claim 1, wherein two or more of the first illumination source, the second illumination source and the third illumination source are configured to provide data to the camera of the artificial-reality system, which is a position-tracking camera configured to monitor the data to allow the artificial-reality system to determine, in part, a current position of the handheld controller in a three-dimensional space.

15. The handheld controller of claim 1, wherein the first, second, and third positions are selected such that at least two of the positions are visible to the camera at a greatest number of orientations of the handheld controller relative to the camera in a three-dimensional space.

16. The handheld controller of claim 1, further comprising a pressable button, wherein at least one of the first, second, and third illumination sources is adjacent to the pressable button and is positioned away from the digit-occluded region.

17. The handheld controller of claim 1, wherein the surface comprises a flat portion and an angled portion contiguous with the flat portion and angled relative to the flat portion, wherein the digit-occluded region is partially in the angled portion and partially in the flat portion.

18. The handheld controller of claim 17, wherein at least one of the first, second, and third illumination sources is located in the angled portion away from the digit-occluded region.

* * * * *